(12) United States Patent
Amini et al.

(10) Patent No.: US 11,836,343 B2
(45) Date of Patent: Dec. 5, 2023

(54) DEVICE, METHOD, AND GRAPHICAL USER INTERFACE FOR DISPLAYING USER INTERFACES AND USER INTERFACE OVERLAY ELEMENTS

(71) Applicant: Apple Inc., Cupertino, CA (US)

(72) Inventors: Mani Amini, San Francisco, CA (US); Wan Si Wan, Sunnyvale, CA (US); Eric Lance Wilson, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/566,096

(22) Filed: Dec. 30, 2021

(65) Prior Publication Data

US 2022/0121358 A1    Apr. 21, 2022

Related U.S. Application Data

(63) Continuation of application No. 16/830,045, filed on Mar. 25, 2020, now Pat. No. 11,275,502.

(60) Provisional application No. 62/853,563, filed on May 28, 2019, provisional application No. 62/834,265, filed on Apr. 15, 2019.

(51) Int. Cl.
| | |
|---|---|
| *G06F 3/048* | (2013.01) |
| *G06F 3/04886* | (2022.01) |
| *G06F 3/041* | (2006.01) |
| *G06F 3/0484* | (2022.01) |

(52) U.S. Cl.
CPC ........ *G06F 3/04886* (2013.01); *G06F 3/0412* (2013.01); *G06F 3/0416* (2013.01); *G06F 3/0484* (2013.01)

(58) Field of Classification Search
CPC .......................... G06F 3/0484; G06F 3/04886
See application file for complete search history.

(56) References Cited

U.S. PATENT DOCUMENTS

| | | | |
|---|---|---|---|
| 10,319,116 B1* | 6/2019 | C .......................... | G09G 5/377 |
| 2005/0212824 A1* | 9/2005 | Marcinkiewicz .... | G09G 3/3406 |
| | | | 345/690 |
| 2010/0081475 A1 | 4/2010 | Chiang et al. | |
| 2015/0067588 A1 | 3/2015 | Shim et al. | |
| 2015/0067601 A1 | 3/2015 | Bernstein et al. | |
| 2015/0347858 A1* | 12/2015 | Johnson .............. | G06F 3/04845 |
| | | | 382/311 |
| 2016/0092081 A1 | 3/2016 | Reichle | |

(Continued)

*Primary Examiner* — Claudia Dragoescu
(74) *Attorney, Agent, or Firm* — Fernando & Partners, LLP

(57) ABSTRACT

A method includes: displaying a first display region in a full-screen view that includes a first type of component displayed with a first set of display properties; detecting a first user input to display a second display region; and, in response to detecting the first user input: in accordance with a determination that the first user input corresponds to a request to display the second display region in the full-screen view, displaying the second display region in the full-screen view that includes the first type of component displayed with the first set of display properties; and in accordance with a determination that the first user input corresponds to a request to display the second display region in a partial-screen view, displaying the second display region in the partial-screen view that includes the first type of component displayed with a second set of display properties.

19 Claims, 62 Drawing Sheets
(4 of 62 Drawing Sheet(s) Filed in Color)

(56) References Cited

U.S. PATENT DOCUMENTS

2016/0259413 A1   9/2016  Anzures et al.
2017/0052759 A1   2/2017  Chaudhri et al.
2018/0088966 A1   3/2018  Chourasiya

* cited by examiner

In response to detecting the first user input, and in accordance with a determination that the first user input corresponds to a request to display the second display region in a partial-screen view, display the second display region in the partial-screen view, wherein the first type of component in the second display region is displayed with a second set of display properties that is different from the first set of display properties ⟶ 1014

(E)

Display, on the display device, the first display region in the partial-screen view, wherein the first type of component in the first display region is displayed with the second set of display properties that is different from the first set of display properties ⟶ 1030

An edge of the second display region in the partial-screen view is adjacent to an edge of the first display region in the partial-screen view ⟶ 1032

Display, on the display device, a divider region separating the first display region and the second display region, wherein the divider region is displayed with the first set of display properties ⟶ 1034

(F)

Detect a second user input, via the one or more inputs devices, to display the first display region in the full-screen view; and
In response to detecting the second user input:
　　Display, on the display device, the first display region in the full-screen view, wherein the first type of component in the first display region is displayed with the first set of display properties; and
　　Display, on the display device, the second display region in the partial-screen view overlaid on the first display region, wherein the first type of component in the second display region is displayed with the second set of display properties ⟶ 1036

Figure 10C

Detect a second user input, via the one or more inputs devices, to display a third display region in the partial-screen view; and
In response to detecting the second user input, display, on the display device, displaying, on the display device, the third display region in the partial-screen view, wherein the first type of component in the third display region is displayed with the second set of display properties that is different from the first set of display properties  ⎯ 1038

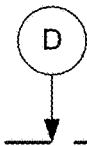

Detect a second user input, via the one or more inputs devices, to display the first display region in the partial-screen view; and
In response to detecting the second user input, display, on the display device, displaying, on the display device, the first display region in the partial-screen view, wherein the first type of component in the first display region is displayed with the second set of display properties that is different from the first set of display properties while maintaining display of the second display region in the partial-screen view on the display device  ⎯ 1040

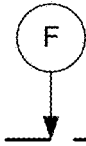

Detect a second user input, via the one or more inputs devices, to display the first display region in the full-screen view; and
In response to detecting the second user input:
Display, on the display device, the first display region in the full-screen view, wherein the first type of component in the first display region is displayed with the first set of display properties; and
Cease display of the second display region on the display device  ⎯ 1042

Figure 10D

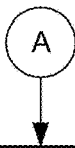

In response to detecting the change in one or more of the brightness setting of the display device and the detected ambient light detected by the device, change a respective display property of the first set of display properties of the first user interface element relative to the second set of display properties of the second user interface element in order to change a relative degree of contrast between the first user interface element and the second user interface element ⟵ 1316

The change to the respective display property of the first set of display properties of the first user interface element causes the relative degree of contrast between the first user interface element and the second user interface element to decrease in accordance with a determination that the change corresponds to a decrease in one or more of the brightness setting of the display device and the ambient light detected by the device ⟵ 1318

The change to the respective display property of the first set of display properties of the first user interface element causes the relative degree of contrast between the first user interface element and the second user interface element to increase in accordance with a determination that the change corresponds to a decrease in one or more of the brightness setting of the display device and the ambient light detected by the device ⟵ 1320

The change to the respective display property of the first set of display properties of the first user interface element causes the relative degree of contrast between the first user interface element and the second user interface element to decrease in accordance with a determination that the change corresponds to an increase in one or more of the brightness setting of the display device and the ambient light detected by the device ⟵ 1322

The change to the respective display property of the first set of display properties of the first user interface element causes the relative degree of contrast between the first user interface element and the second user interface element to increase in accordance with a determination that the change corresponds to an increase in one or more of the brightness setting of the display device and the ambient light detected by the device ⟵ 1324

Figure 13B

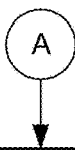

In response to detecting the change in one or more of the brightness setting of the display device and the detected ambient light detected by the device, change a respective display property of the first set of display properties of the first user interface element relative to the second set of display properties of the second user interface element in order to change a relative degree of contrast between the first user interface element and the second user interface element ~1316

The change to the respective display property of the first set of display properties of the first user interface element causes the relative degree of contrast of a light colored region to decrease relative to darker portions of the user interface by reducing a brightness of the light colored region relative to the darker portions of the user interface ~1326

The change to the respective display property of the first set of display properties of the first user interface element causes the relative degree of contrast of a dark colored region to increase relative to darker portions of the user interface by increasing a brightness of the dark colored region relative to the darker portions of the user interface ~1328

A magnitude of the change to the relative degree of contrast between the first user interface element and the second user interface element is based at least in part on a size of the first user interface element ~1330

A magnitude of the change to the relative degree of contrast between the first user interface element and the second user interface element is based at least in part on a magnitude of change in the respective display property ~1332

A magnitude of the change to the relative degree of contrast between the first user interface element and the second user interface element is based at least in part on a type of content associated with the first user interface element ~1334

Figure 13C

DEVICE, METHOD, AND GRAPHICAL USER INTERFACE FOR DISPLAYING USER INTERFACES AND USER INTERFACE OVERLAY ELEMENTS

CROSS-REFERENCE TO RELATED APPLICATIONS

This application is a continuation application of and claims priority to U.S. patent application Ser. No. 16/830,045, filed on Mar. 25, 2020, which claims priority to U.S. Provisional Patent App. No. 62/834,265, filed on Apr. 15, 2019, and U.S. Provisional Patent App. No. 62/853,563, filed on May 28, 2019, which are hereby incorporated by reference in their entireties.

BACKGROUND

Using inputs for manipulating user interfaces of an electronic device has become ubiquitous. For example, the electronic device uses peripheral-type inputs (e.g., a touchscreen input, mouse, keyboard) in order to affect the display of one or more user interfaces.

However, many of these inputs provide limited and inefficient control for manipulating the user interface. Accordingly, repetitive, complex, and/or cumbersome inputs or input types may be needed to manipulate the user interface in order for the electronic device to perform a particular operation.

SUMMARY

Accordingly, there is a need for electronic devices with faster, more efficient methods and interfaces for navigating and manipulating user interfaces. Such methods and interfaces optionally complement or replace conventional methods for navigating and manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touchscreen" or "touchscreen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display device, and one or more input devices. The method includes: displaying, via the display device, a first display region in a full-screen view, wherein a first type of component in the first display region is displayed with a first set of display properties; while displaying the first display region in the full-screen view, detecting, via the one or more input devices, a first user input to display a second display region; and, in response to detecting the first user input: in accordance with a determination that the first user input corresponds to a request to display the second display region in the full-screen view, displaying, via the display device, the second display region in the full-screen view, wherein the first type of component in the second display region is displayed with the first set of display properties; and in accordance with a determination that the first user input corresponds to a request to display the second display region in a partial-screen view, displaying, via the display device, the second display region in the partial-screen view, wherein the first type of component in the second display region is displayed with a second set of display properties that is different from the first set of display properties.

In accordance with some embodiments, a method is performed at a device with one or more processors, non-transitory memory, and a display device. The method includes: displaying, via the display device, background content; displaying, via the display device, a user interface overlay element that is overlaid on the background content, wherein an appearance of the user interface overlay element is based at least in part on a portion of the background content under the overlay element; detecting an input that changes the background content underlying the user interface overlay element; and in response to detecting the input that changes the portion of the background content underlying the user interface overlay element, updating the appearance of the user interface overlay element based on background visual property values of the portion of the background content that is under the user interface overlay element, including: in accordance with a determination that the portion of the background content under the user interface overlay element has background visual property values in a first range of background visual property values, displaying the user interface overlay element with overlay visual property values in a first range of overlay visual property values that are selected so as to maintain at least a threshold amount of difference between the first range of overlay visual property values and the first range of background visual property values; and in accordance with a determination that the portion of the background content under the user interface overlay element has background visual property values in a second range of background visual property values that is different from the first range of background visual property values, displaying the user interface overlay element with overlay visual property values in a second range of overlay visual property values that is outside of the first range of overlay visual property values.

In accordance with some embodiments, a method is performed at a device with one or more processors, non-transitory memory, and a display device. The method includes: displaying, via the display device, a user interface including a first user interface element with a first set of display properties and a second user interface element with a second set of display properties; detecting a change in one or more of a brightness setting of the display device and an ambient light detected by the device; and in response to detecting the change in one or more of the brightness setting of the display device and the detected ambient light detected by the device, changing a respective display property of the first set of display properties of the first user interface element relative to the second set of display properties of the second user interface element in order to change a relative degree of contrast between the first user interface element and the second user interface element.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

FIGS. 10A-10E illustrate a flow diagram of a method of applying different sets of display properties to components of display regions based on their respective layers in accordance with some embodiments.

FIGS. 13A-13D illustrate a flow diagram of a method of changing an appearance of a first user interface element in order to change a relative degree of contrast between the first user interface element and a second user interface element in response to detecting a change in lighting conditions in accordance with some embodiments.

DESCRIPTION OF EMBODIMENTS

Figure 1A:
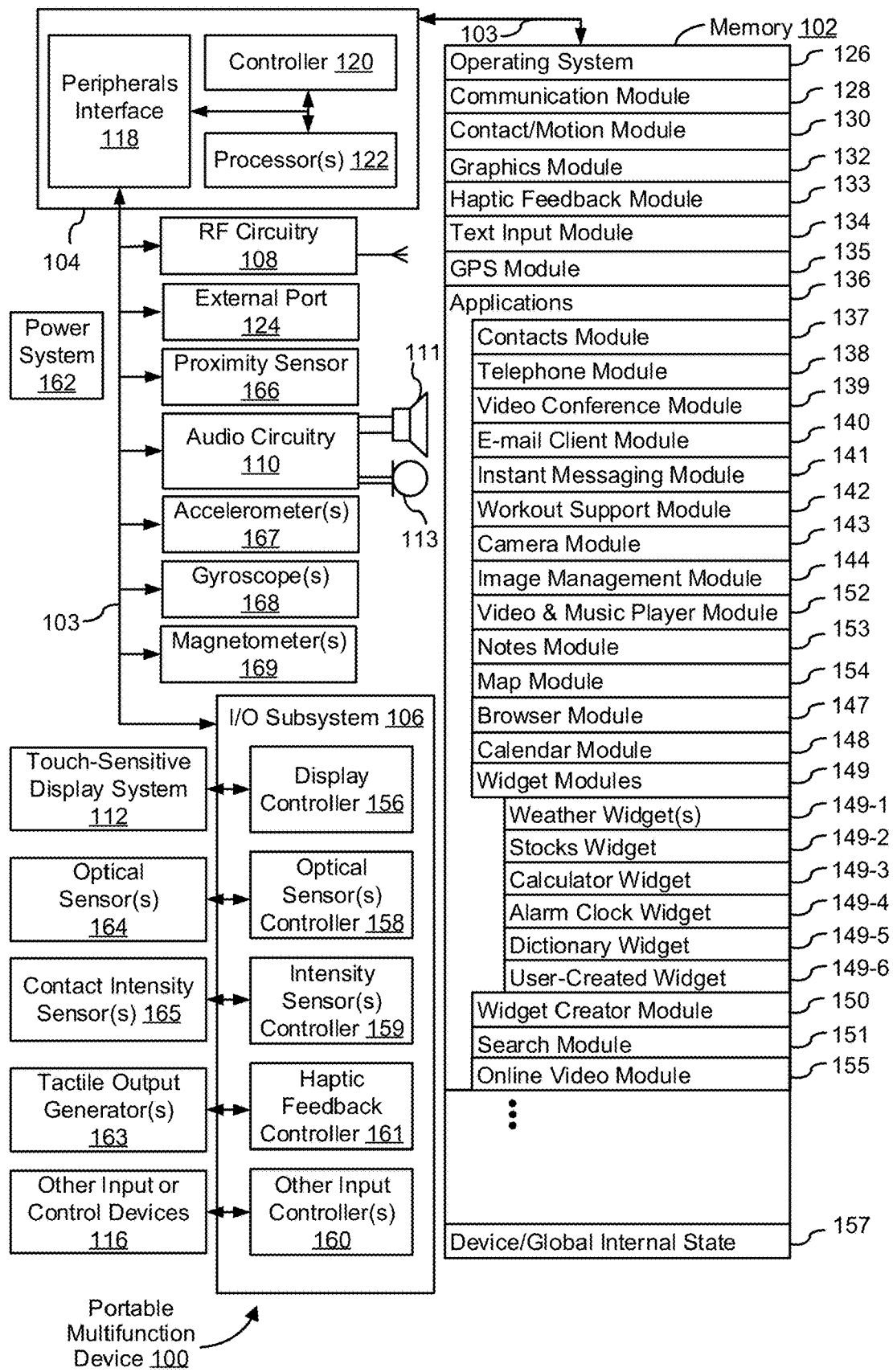
FIG. 1A is a block diagram illustrating a portable multifunction device with a touch-sensitive display in accordance with some embodiments.

According to some embodiments, disclosed herein is a method of applying different display properties to components of display regions based on their respective layers (while in dark mode). In turn, the method maintains a z-order hierarchy of display regions (e.g., display containers associated with app windows, pop/slide over panes, etc.) while in dark mode by presenting components associated with the display regions (e.g., affordance background, icon background, application window background, icon bar background, title bar background, etc.) with different display properties based on respective layer designations. This provides an efficient mechanism for a user to distinguish between layered and types of components therein, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

According to some embodiments, disclosed herein is a method of dynamically changing the appearance of user interface (UI) overlay elements based on underlying content and, optionally, a particular appearance function for the overlay visual property values of the user interface overlay element. This provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

According to some embodiments, disclosed herein is a method of changing an appearance of a first user interface element in order to change a relative degree of contrast between the first user interface element and a second user interface element in response to detecting a change in lighting conditions. As such, in some embodiments, the method acts to compress the contrast range between a foreground user interface element (e.g., the first user interface element) and a background user interface element (e.g., the second user interface element) by adjusting at least a display property of the foreground interface element based on the current lighting conditions (e.g., screen brightness, ambient lighting conditions, and/or display type).

Due to low screen brightness and/or low ambient lighting conditions, the contrast may be too low to distinguish between a black background and a gray user interface element (e.g., a button platter, icon platter, content region, and/or the like). Furthermore, under these conditions, users may often experience the deleterious "jelly" effect when scrolling (e.g., while in the dark display mode). The "jelly" effect occurs due to the delayed response associated with black pixels when using an organic light-emitting diode (OLED) display (either passive-matrix OLED (PMOLED) or active-matrix OLED (AMOLED) variants). To combat these problems, the gray user interface element region may be boosted or brightened to increase contrast against the black background. In a similar vein, due to high screen brightness and/or high ambient lighting conditions, the contrast may be too great between a black background and a gray user interface element (e.g., a button platter, icon platter, content region, and/or the like), which may strain a user's eyes. To combat this problem, the brightness associated with the gray user interface element may be reduced against the black background. As another problem, due to low screen brightness and/or low ambient lighting conditions, the contrast may be too high between a black background and bright/white blocks of content, which may strain a user's eyes. To combat this problem, the brightness associated with the bright/white blocks of content may be reduced against the black background.

Figure 11A:
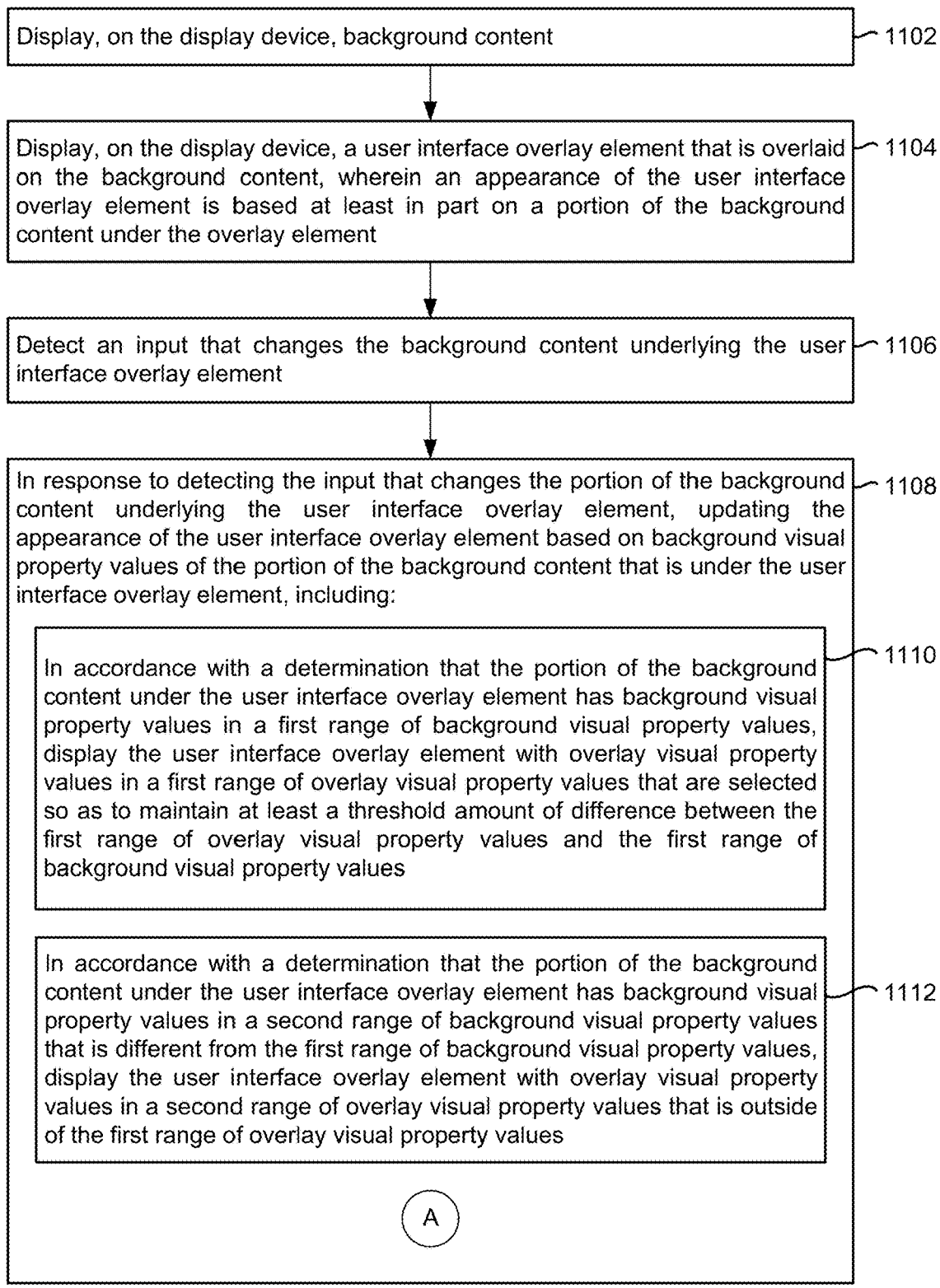
FIGS. 11A-11C illustrate a flow diagram of a method of changing the appearance of user interface overlay elements based at least in part on underlying background content in accordance with some embodiments.
Figure 11B:
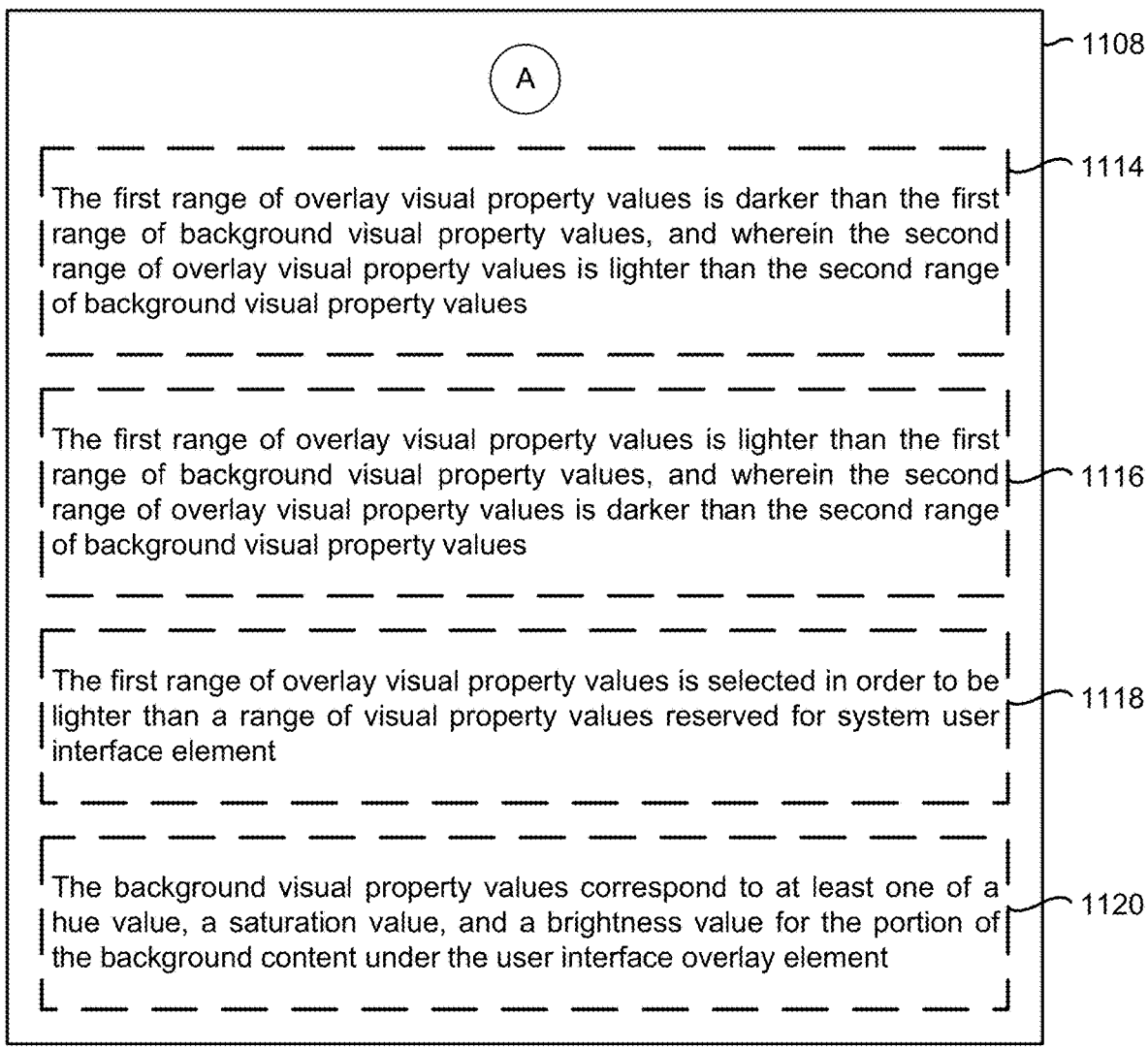
Figure 11C:
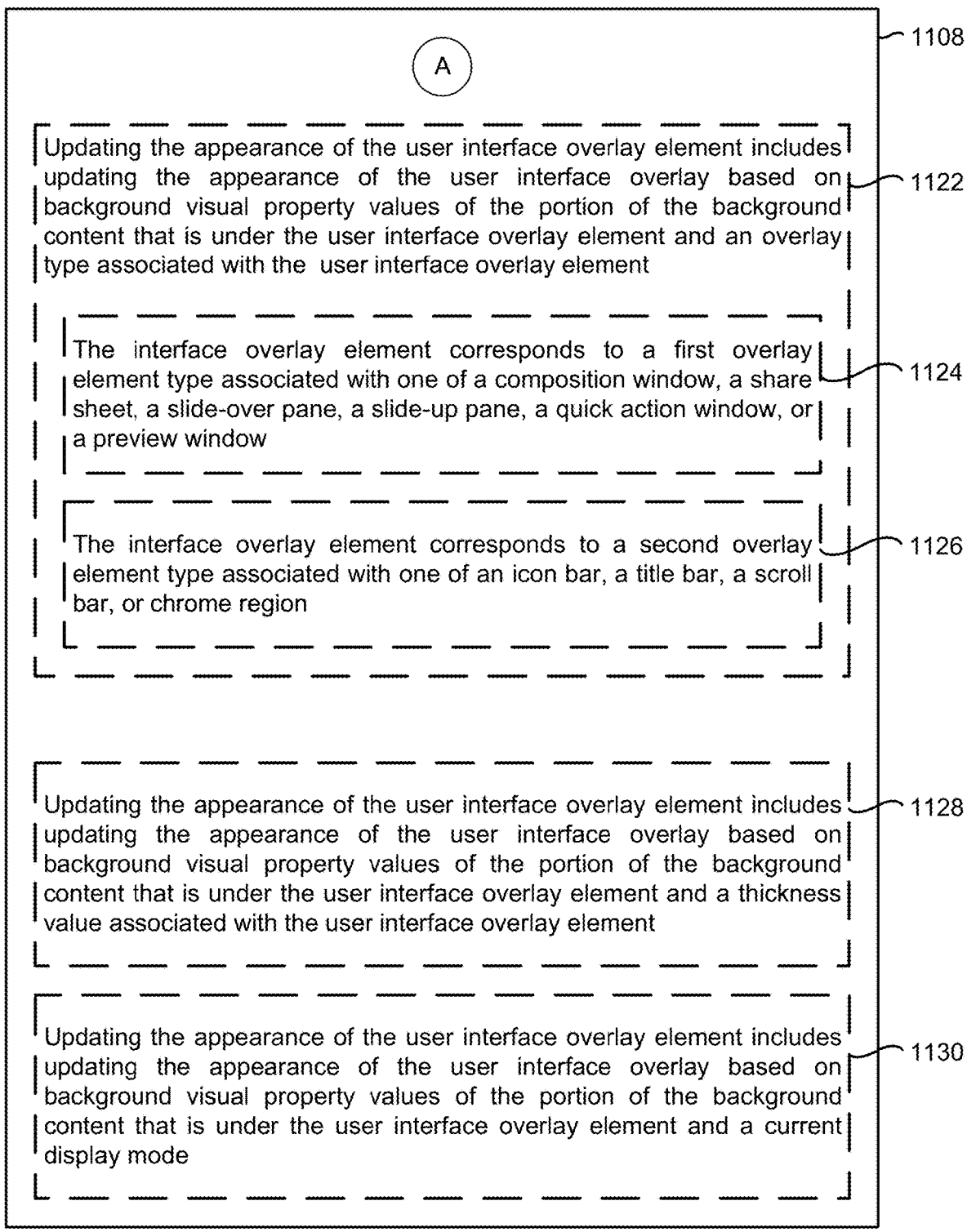

Below, FIGS. 1A and 1B, 2-3, and 4A-4B provide a description of example devices. FIGS. 5A-5T and 6A-6I illustrate example user interfaces for navigating and manipulating user interfaces displayed according to a dark display mode. FIGS. 9A-9D illustrate example user interfaces for changing the appearance of user interface overlay elements. FIGS. 12A-12I illustrate example user interfaces for changing an appearance of a first user interface element in order to change a relative degree of contrast between the first user interface element and a second user interface element in response to detecting a change in ambient light detected by an electronic device. FIGS. 10A-10E illustrate a flow diagram of a method of applying different sets of display properties to components of display regions. The user interfaces in FIGS. 5A-5T and 6A-6I are used to illustrate the process in FIGS. 10A-10E. FIGS. 11A-11C illustrate a flow diagram of a method of changing the appearance of user interface overlay elements based at least in part on underlying background content. The graphical representations in FIG. 7, the flowchart in FIGS. 8A-8C, and the user interfaces in FIGS. 9A-9D are used to illustrate the process in FIGS. 11A-11C. FIGS. 13A-13D illustrate a flow diagram of a method of changing an appearance of a first user interface element in order to change a relative degree of contrast between the first user interface element and a second user interface element in response to detecting a change in lighting conditions. The user interfaces in FIGS. 12A-12I are used to illustrate the process in FIGS. 13A-13D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touchscreen displays and/or touchpads), are, optionally, used. It should also be understood that, in some embodiments, the device is not a portable communications device, but is a desktop computer with a touch-sensitive surface (e.g., a touchscreen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating a portable multifunction device 100 with a touch-sensitive display system 112 in accordance with some embodiments. The touch-sensitive display system 112 is sometimes called a "touchscreen," for convenience, and is sometimes simply called a touch-sensitive display. The device 100 includes a memory 102 (which optionally includes one or more computer readable storage mediums), a memory controller 122, one or more processing units (CPUs) 120, a peripherals interface 118, an RF circuitry 108, audio circuitry 110, a speaker 111, a microphone 113, an input/output (I/O) subsystem 106, other input or control devices 116, and an external port 124. The device 100 optionally includes one or more optical sensors 164. The device 100 optionally includes one or more intensity sensors 165 for detecting intensity of contacts on the device 100 (e.g., a touch-sensitive surface such as the touch-sensitive display system 112 of the device 100). The device 100 optionally includes one or more tactile output generators 163 for generating tactile outputs on the device 100 (e.g., generating tactile outputs on a touch-sensitive surface such as the touch-sensitive display system 112 of the device 100 or a touchpad 355 of a device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

The memory 102 optionally includes high-speed random-access memory and optionally also includes non-volatile memory, such as one or more magnetic disk storage devices, flash memory devices, or other non-volatile solid-state memory devices. Access to the memory 102 by other components of the device 100, such as the one or more CPUs 120 and the peripherals interface 118, is, optionally, controlled by the memory controller 122.

The peripherals interface 118 can be used to couple input and output peripherals of the device to the one or more CPUs 120 and the memory 102. The one or more CPUs 120 run or execute various software programs and/or sets of instructions stored in the memory 102 to perform various functions for the device 100 and to process data.

In some embodiments, the peripherals interface 118, the one or more CPUs 120, and the memory controller 122 are, optionally, implemented on a single chip, such as a chip 104. In some other embodiments, they are, optionally, implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data is, optionally, retrieved from and/or transmitted to the memory 102 and/or the RF circuitry 108 by the peripherals interface 118. In some embodiments, the audio circuitry 110 also includes a headset jack (e.g., a headset jack 212 in FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch-sensitive display system 112 and the other input or control devices 116, with the peripherals interface 118. The I/O subsystem 106 optionally includes a display controller 156, an optical sensor controller 158, an intensity sensor controller 159, a haptic feedback controller 161, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate embodiments, the one or more input controllers 160 are, optionally, coupled with any (or none) of the following: a keyboard, infrared port, USB port, stylus, and/or a pointer device such as a mouse. The one or more buttons (e.g., buttons 208 in FIG. 2) optionally include an up/down button for volume control of the speaker 111 and/or the microphone 113. The one or more buttons optionally include a push button (e.g., a push button 206 in FIG. 2).

The touch-sensitive display system 112 provides an input interface and an output interface between the device and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some embodiments, some or all of the visual output corresponds to user-interface objects.

The touch-sensitive display system 112 has a touch-sensitive surface, sensor or set of sensors that accepts input from the user based on haptic/tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example embodiment, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other embodiments. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112. In an example embodiment, projected mutual capacitance sensing technology is used, such as that found in the iPhone®, iPod Touch®, and iPad® from Apple Inc. of Cupertino, Calif.

The touch-sensitive display system 112 optionally has a video resolution in excess of 100 dpi. In some embodiments, the touchscreen video resolution is in excess of 400 dpi (e.g., 500 dpi, 800 dpi, or greater). The user optionally makes contact with the touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touchscreen. In some embodiments, the device translates the rough finger-based input into a precise pointer/cursor position or command for performing the actions desired by the user.

In some embodiments, in addition to the touchscreen, the device 100 optionally includes a touchpad for activating or deactivating particular functions. In some embodiments, the touchpad is a touch-sensitive area of the device that, unlike the touchscreen, does not display visual output. The touchpad is, optionally, a touch-sensitive surface that is separate from the touch-sensitive display system 112 or an extension of the touch-sensitive surface formed by the touchscreen.

The device 100 also includes a power system 162 for powering the various components. The power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 optionally also includes one or more optical sensors 164. FIG. 1A shows an optical sensor coupled with the optical sensor controller 158 in the I/O subsystem 106. The one or more optical sensors 164 optionally include charge-coupled device (CCD) or complementary metal-oxide semiconductor (CMOS) phototransistors. The one or more optical sensors 164 receive light from the environment, projected through one or more lens, and converts the light to data representing an image. In conjunction with an imaging module 143 (also called a camera module), The one or more optical sensors 164 optionally capture still images and/or video. In some embodiments, an optical sensor is located on the back of the device 100, opposite the touch-sensitive display system 112 on the front of the device 100, so that the touchscreen is enabled for use as a viewfinder for still and/or video image acquisition. In some embodiments, another optical sensor is located on the front of the device 100 so that the user's image is obtained (e.g., for selfies, for videoconferencing while the user views the other video conference participants on the touchscreen, etc.).

The device 100 optionally also includes one or more contact intensity sensors 165. FIG. 1A shows a contact intensity sensor coupled with the intensity sensor controller 159 in the I/O subsystem 106. The one or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The one or more contact intensity sensors 165 receive contact intensity information (e.g., pressure information or a proxy for pressure information) from the environment. In some embodiments, at least one contact intensity sensor is collocated with, or proximate to, a touch-sensitive surface (e.g., the touch-sensitive display system 112). In some embodiments, at least one contact intensity sensor is located on the back of the device 100, opposite the touchscreen display system 112, which is located on the front of the device 100.

The device 100 optionally also includes one or more proximity sensors 166. FIG. 1A shows proximity sensor 166 coupled with peripherals interface 118. Alternately, a proximity sensor 166 is coupled with the input controller 160 in the I/O subsystem 106. In some embodiments, the proximity sensor 166 turns off and disables the touch-sensitive display system 112 when the device 100 is placed near the user's ear (e.g., when the user is making a phone call).

The device 100 optionally also includes one or more tactile output generators 163. FIG. 1A shows a tactile output generator coupled with haptic feedback controller 161 in I/O subsystem 106. The one or more tactile output generators 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). one or more tactile output generators 163 receive tactile feedback generation instructions from the haptic feedback module 133 and generates tactile outputs on the device 100 that are capable of being sensed by a user of the device 100. In some embodiments, at least one tactile output generator is collocated with, or proximate to, a touch-sensitive surface (e.g., the touch-sensitive display system 112) and, optionally, generates a tactile output by moving the touch-sensitive surface vertically (e.g., in/out of a surface of the device 100) or laterally (e.g., back and forth in the same plane as a surface of the device 100). In some embodiments, at least one tactile output generator sensor is located on the back of the device 100, opposite the touch-sensitive display system 112, which is located on the front of the device 100.

The device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows the sensors 167, 168, and 169 coupled with the peripherals interface 118. Alternately, the sensors 167, 168, and 169 are, optionally, coupled with an input controller 160 in the I/O subsystem 106. In some embodiments, information is displayed on the touchscreen display in a portrait view or a landscape view based on an analysis of data received from the one or more accelerometers. The device 100 optionally includes a GPS (or GLONASS or other global navigation system) receiver for obtaining information concerning the location of the device 100.

Figure 3:
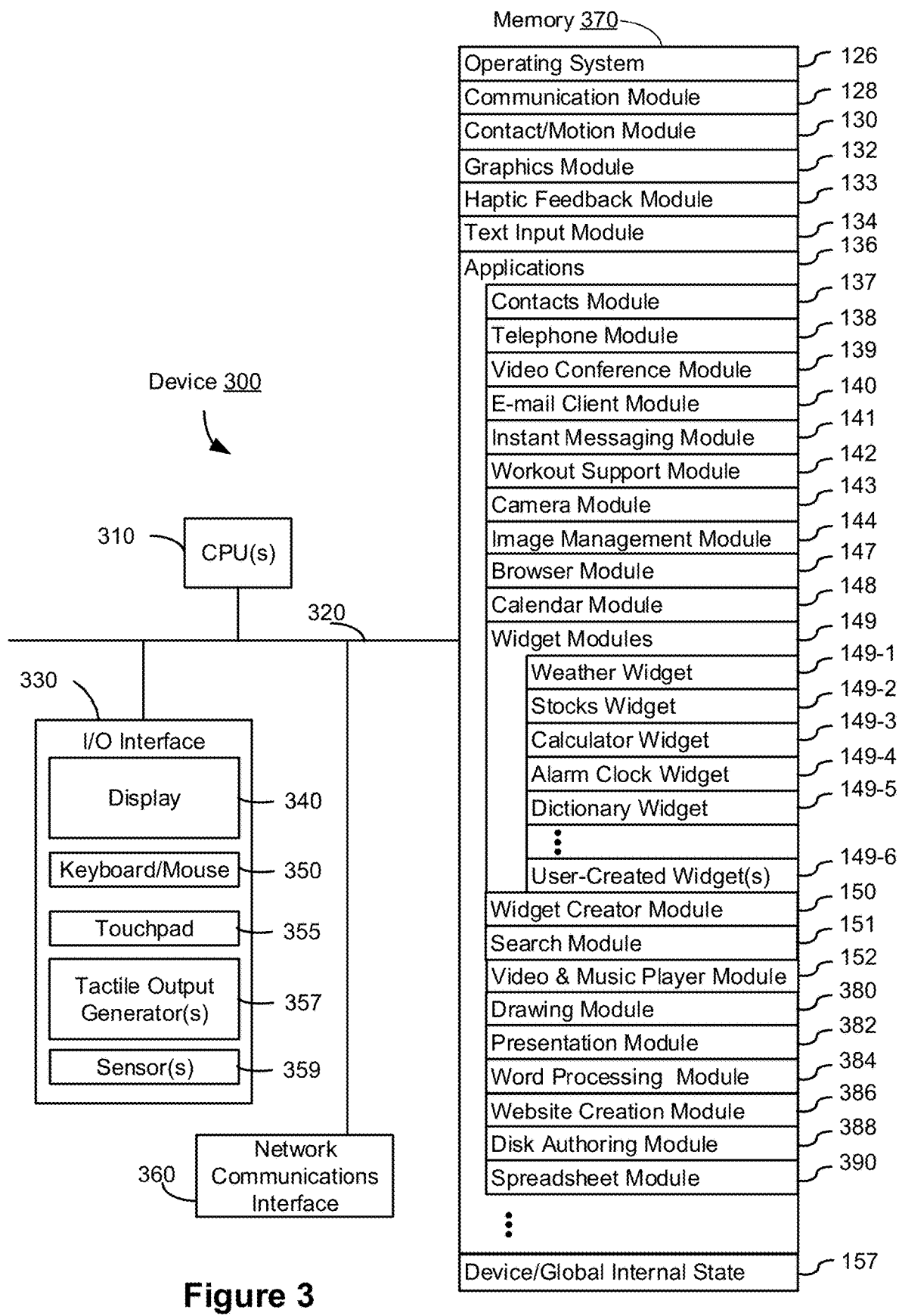
FIG. 3 is a block diagram of an example multifunction device with a display and a touch-sensitive surface in accordance with some embodiments.

In some embodiments, the software components stored in the memory 102 include an operating system 126, a communication module (or set of instructions) 128, a contact/motion module (or set of instructions) 130, a graphics module (or set of instructions) 132, a haptic feedback module (or set of instructions) 133, a text input module (or set of instructions) 134, a Global Positioning System (GPS) module (or set of instructions) 135, and applications (or sets of instructions) 136. Furthermore, in some embodiments, the memory 102 stores a device/global internal state 157, as shown in FIGS. 1A and 3. The device/global internal state 157 includes one or more of: active application state, indicating which applications, if any, are currently active; display state, indicating what applications, views or other information occupy various regions of the touch-sensitive display system 112; sensor state, including information obtained from the device's various sensors and the other input or control devices 116; and location and/or positional information concerning the device's location and/or attitude.

The operating system 126 (e.g., iOS, DARWIN, RTXC, LINUX, UNIX, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or external port 124. The one or more external ports 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

The contact/motion module 130 optionally detects contact with the touch-sensitive display system 112 (in conjunction with the display controller 156) and other touch-sensitive devices (e.g., a touchpad or physical click wheel). The contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, the contact/motion module 130 and the display controller 156 detect contact on a touchpad.

The contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

The graphics module 132 includes various known software components for rendering and displaying graphics on the touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic is, optionally, assigned a corresponding code. The graphics module 132 receives, from applications etc., one or more codes specifying graphics to be displayed along with, if necessary, coordinate data and other graphic property data, and then generates screen image data to output to the display controller 156.

The haptic feedback module 133 includes various software components for generating instructions used by the one or more tactile output generators 163 to produce tactile outputs at one or more locations on the device 100 in response to user interactions with the device 100.

The text input module 134, which is, optionally, a component of the graphics module 132, provides soft keyboards for entering text in various applications (e.g., a contacts module 137, an e-mail client module 140, an IM module 141, a browser 147, and any other application that needs text input).

The GPS module 135 determines the location of the device and provides this information for use in various applications (e.g., to a telephone module 138 for use in location-based dialing, to a camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a browser module 147;
- a calendar module 148;
- widget modules 149, which optionally include one or more of: a weather widget 149-1, a stocks widget 149-2, a calculator widget 149-3, an alarm clock widget 149-4, a dictionary widget 149-5, and other widgets obtained by the user, as well as a user-created widget 149-6;
- a widget creator module 150 for making the user-created widgets 149-6;
- a search module 151;
- a video and music player module 152, which is, optionally, made up of a video player module and a music player module;
- a notes module 153;
- a map module 154; and/or
- an online video module 155.

Examples of other applications 136 that are, optionally, stored in the memory 102 include other word processing applications, other image editing applications, drawing applications, presentation applications, JAVA-enabled applications, encryption, digital rights management, voice recognition, and voice replication.

In conjunction with the touch-sensitive display system 112, the display controller 156, the contact module 130, the graphics module 132, and the text input module 134, the contacts module 137 includes executable instructions to manage an address book or contact list (e.g., stored in the application internal state 192 of the contacts module 137 in the memory 102 or a memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by the telephone module 138, the video conferencing module 139, the e-mail client module 140, or the IM module 141; and so forth.

In conjunction with the RF circuitry 108, the audio circuitry 110, the speaker 111, the microphone 113, the touch-sensitive display system 112, the display controller 156, the contact module 130, the graphics module 132, and the text input module 134, the telephone module 138 includes executable instructions to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with the RF circuitry 108, the audio circuitry 110, the speaker 111, the microphone 113, the touch-sensitive display system 112, the display controller 156, the one or more optical sensors 164, the optical sensor controller 158, the contact module 130, the graphics module 132, the text input module 134, the contact list 137, and the telephone module 138, the video conferencing module 139 includes executable instructions to initiate, conduct, and terminate a video conference between a user and one or more other participants in accordance with user instructions.

In conjunction with the RF circuitry 108, the touch-sensitive display system 112, the display controller 156, the contact module 130, the graphics module 132, and the text input module 134, the e-mail client module 140 includes executable instructions to create, send, receive, and manage e-mail in response to user instructions. In conjunction with the image management module 144, the e-mail client module 140 makes it very easy to create and send e-mails with still or video images taken with the camera module 143.

In conjunction with the RF circuitry 108, the touch-sensitive display system 112, the display controller 156, the contact module 130, the graphics module 132, and the text input module 134, the IM module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with the RF circuitry 108, the touch-sensitive display system 112, the display controller 156, the contact module 130, the graphics module 132, the text input module 134, the GPS module 135, and the map module 154, the workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with the touch-sensitive display system 112, the display controller 156, the one or more optical sensors 164, the optical sensor controller 158, the contact module 130, the graphics module 132, and the image management module 144, the camera module 143 includes executable instructions to capture still images or video (including a video stream) and store them into the memory 102, modify characteristics of a still image or video, and/or delete a still image or video from the memory 102.

In conjunction with the touch-sensitive display system 112, the display controller 156, the contact module 130, the graphics module 132, the text input module 134, and the camera module 143, the image management module 144 includes executable instructions to arrange, modify (e.g., edit), or otherwise manipulate, label, delete, present (e.g., in a digital slide show or album), and store still and/or video images.

In conjunction with the RF circuitry 108, the touch-sensitive display system 112, the display controller 156, the contact module 130, the graphics module 132, and the text input module 134, the browser module 147 includes executable instructions to browse the Internet in accordance with user instructions, including searching, linking to, receiving, and displaying web pages or portions thereof, as well as attachments and other files linked to web pages.

In conjunction with the RF circuitry 108, the touch-sensitive display system 112, the display controller 156, the contact module 130, the graphics module 132, the text input module 134, the e-mail client module 140, and the browser module 147, the calendar module 148 includes executable instructions to create, display, modify, and store calendars and data associated with calendars (e.g., calendar entries, to do lists, etc.) in accordance with user instructions.

In conjunction with the RF circuitry 108, the touch-sensitive display system 112, the display controller 156, the contact module 130, the graphics module 132, the text input module 134, and the browser module 147, the widget modules 149 are mini-applications that are, optionally, downloaded and used by a user (e.g., the weather widget 149-1, the stocks widget 149-2, the calculator widget 149-3, the alarm clock widget 149-4, and the dictionary widget 149-5) or created by the user (e.g., the user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., YAHOO! Widgets).

In conjunction with the RF circuitry 108 the, touch-sensitive display system 112, the display controller 156, the contact module 130, the graphics module 132, the text input module 134, and the browser module 147, the widget creator module 150 includes executable instructions to create widgets (e.g., turning a user-specified portion of a web page into a widget).

In conjunction with the touch-sensitive display system 112, the display controller 156, the contact module 130, the graphics module 132, and the text input module 134, the search module 151 includes executable instructions to search for text, music, sound, image, video, and/or other files in the memory 102 that match one or more search criteria (e.g., one or more user-specified search terms) in accordance with user instructions.

In conjunction with the touch-sensitive display system 112, the display controller 156, the contact module 130, the graphics module 132, the audio circuitry 110, the speaker 111, the RF circuitry 108, and the browser module 147, the video and music player module 152 includes executable instructions that allow the user to download and play back recorded music and other sound files stored in one or more file formats, such as MP3 or AAC files, and executable instructions to display, present or otherwise play back videos (e.g., on the touch-sensitive display system 112, or on an external display connected wirelessly or via the one or more external ports 124). In some embodiments, the device 100 optionally includes the functionality of an MP3 player, such as an iPod (trademark of Apple Inc. of Cupertino, Calif.).

In conjunction with touch-sensitive the display system 112, the display controller 156, the contact module 130, the graphics module 132, and the text input module 134, the notes module 153 includes executable instructions to create and manage notes, to do lists, and the like in accordance with user instructions.

In conjunction with the RF circuitry 108, the touch-sensitive display system 112, the display controller 156, the contact module 130, the graphics module 132, the text input module 134, the GPS module 135, and the browser module 147, the map module 154 includes executable instructions to receive, display, modify, and store maps and data associated with maps (e.g., driving directions; data on stores and other points of interest at or near a particular location; and other location-based data) in accordance with user instructions.

In conjunction with the touch-sensitive display system 112, the display controller 156, the contact module 130, the graphics module 132, the audio circuitry 110, the speaker 111, the RF circuitry 108, the text input module 134, the e-mail client module 140, and the browser module 147, the online video module 155 includes executable instructions that allow the user to access, browse, receive (e.g., by streaming and/or download), play back (e.g., on the touchscreen 112, or on an external display connected wirelessly or via the one or more external ports 124), send an e-mail with a link to a particular online video, and otherwise manage online videos in one or more file formats, such as H.264. In some embodiments, the instant messaging module 141, rather than the e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 102 optionally stores a subset of the modules and data structures identified above. Furthermore, the memory 102 optionally stores additional modules and data structures not described above.

In some embodiments, the device 100 is a device where operation of a predefined set of functions on the device is performed exclusively through a touchscreen and/or a touchpad. By using a touchscreen and/or a touchpad as the primary input control device for operation of the device 100, the number of physical input control devices (such as push buttons, dials, and the like) on the device 100 is, optionally, reduced.

The predefined set of functions that are performed exclusively through a touchscreen and/or a touchpad optionally include navigation between user interfaces. In some embodiments, the touchpad, when touched by the user, navigates the device 100 to a main, home, or root menu from any user interface that is displayed on the device 100. In such embodiments, a "menu button" is implemented using a touchpad. In some other embodiments, the menu button is a physical push button or other physical input control device instead of a touchpad.

Figure 1B:
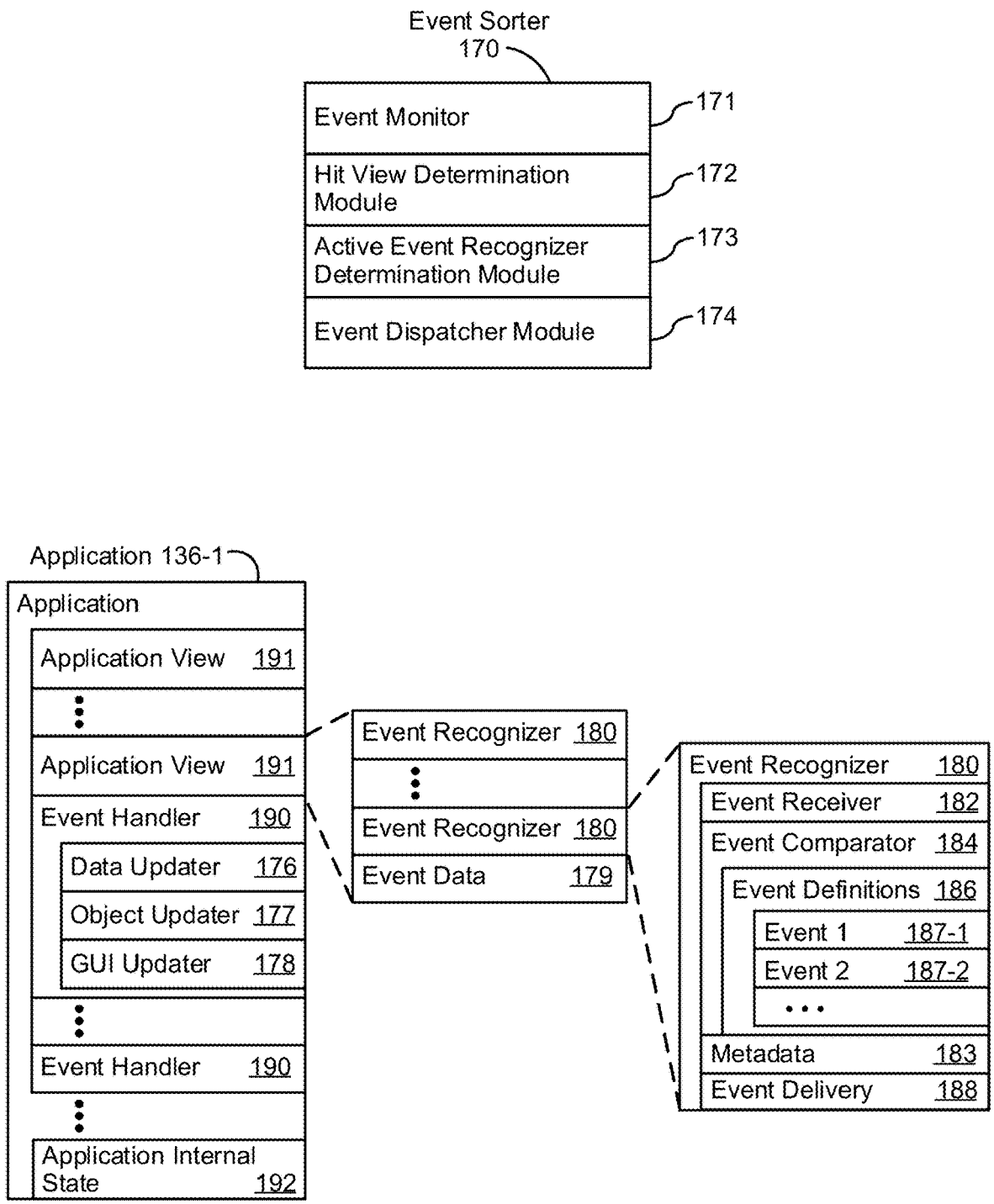
FIG. 1B is a block diagram illustrating example components for event handling in accordance with some embodiments.

FIG. 1B is a block diagram illustrating example components for event handling in accordance with some embodiments. In some embodiments, the memory 102 (in FIG. 1A) or 370 (FIG. 3) includes an event sorter 170 (e.g., in the operating system 126) and a respective application 136-1 (e.g., any of the aforementioned applications 136, 137-155, 380-390).

The event sorter 170 receives event information and determines the application 136-1 and the application view 191 of the application 136-1 to which to deliver the event information. The event sorter 170 includes an event monitor 171 and an event dispatcher module 174. In some embodiments, the application 136-1 includes an application internal state 192, which indicates the current application view(s) displayed on the touch-sensitive display system 112 when the application is active or executing. In some embodiments, the device/global internal state 157 is used by the event sorter 170 to determine which application(s) is (are) currently active, and the application internal state 192 is used by the event sorter 170 to determine the application views 191 to which to deliver event information.

In some embodiments, the application internal state 192 includes additional information, such as one or more of: resume information to be used when the application 136-1 resumes execution, user interface state information that indicates information being displayed or that is ready for display by the application 136-1, a state queue for enabling the user to go back to a prior state or view of the application 136-1, and a redo/undo queue of previous actions taken by the user.

The event monitor 171 receives event information from the peripherals interface 118. Event information includes information about a sub-event (e.g., a user touch on touch-sensitive display system 112, as part of a multi-touch gesture). The peripherals interface 118 transmits information it receives from the I/O subsystem 106 or a sensor, such as the proximity sensor 166, the accelerometer(s) 167, the gyroscope(s) 168, the magnetometer(s) 169, and/or the microphone 113 (through audio circuitry the 110). Information that the peripherals interface 118 receives from the I/O subsystem 106 includes information from the touch-sensitive display system 112 or a touch-sensitive surface.

In some embodiments, the event monitor 171 sends requests to the peripherals interface 118 at predetermined intervals. In response, the peripherals interface 118 transmits event information. In other embodiments, the peripherals interface 118 transmits event information only when there is a significant event (e.g., receiving an input above a predetermined noise threshold and/or for more than a predetermined duration).

In some embodiments, the event sorter 170 also includes a hit view determination module 172 and/or an active event recognizer determination module 173.

The hit view determination module 172 provides software procedures for determining where a sub-event has taken place within one or more views, when the touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

The hit view determination module 172 receives information related to sub-events of a touch-based gesture. When an application has multiple views organized in a hierarchy, the hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

The active event recognizer determination module 173 determines which view or views within a view hierarchy should receive a particular sequence of sub-events. In some embodiments, the active event recognizer determination module 173 determines that only the hit view should receive a particular sequence of sub-events. In other embodiments, the active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

The event dispatcher module 174 dispatches the event information to an event recognizer (e.g., an event recognizer 180). In some embodiments including the active event recognizer determination module 173, the event dispatcher module 174 delivers the event information to an event recognizer determined by the active event recognizer determination module 173. In some embodiments, event dispatcher module 174 stores in an event queue the event information, which is retrieved by a respective event receiver module 182.

In some embodiments, the operating system 126 includes the event sorter 170. Alternatively, the application 136-1 includes the event sorter 170. In yet other embodiments, the event sorter 170 is a stand-alone module, or a part of another module stored in the memory 102, such as the contact/motion module 130.

In some embodiments, the application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which the application 136-1 inherits its methods and other properties. In some embodiments, a respective event handler 190 includes one or more of: a data updater 176, an object updater 177, a GUI updater 178, and/or event data 179 received from the event sorter 170. The event handler 190 optionally utilizes or calls the data updater 176, the object updater 177, or the GUI updater 178 to update the application internal state 192. Alternatively, one or more of the application views 191 includes one or more respective event handlers 190. Also, in some embodiments, one or more of the data updater 176, the object updater 177, and the GUI updater 178 are included in a respective application view 191.

A respective event recognizer 180 receives event information (e.g., the event data 179) from the event sorter 170 and identifies an event from the event information. The event recognizer 180 includes an event receiver 182 and an event comparator 184. In some embodiments, the event recognizer 180 also includes at least a subset of: metadata 183, and event delivery instructions 188 (which optionally include sub-event delivery instructions).

The event receiver 182 receives event information from the event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

The event comparator 184 compares the event information to predefined event or sub-event definitions and, based on the comparison, determines an event or sub-event, or determines or updates the state of an event or sub-event. In some embodiments, the event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across the touch-sensitive display system 112, and lift-off of the touch (touch end). In some embodiments, the event also includes information for one or more associated event handlers 190.

In some embodiments, the event definition 187 includes a definition of an event for a respective user-interface object. In some embodiments, the event comparator 184 performs a hit test to determine which user-interface object is associated with a sub-event. For example, in an application view in which three user-interface objects are displayed on the touch-sensitive display system 112, when a touch is detected on the touch-sensitive display system 112, the event comparator 184 performs a hit test to determine which of the three user-interface objects is associated with the touch (sub-event). If each displayed object is associated with a respective event handler 190, the event comparator uses the result of the hit test to determine which the event handler 190 should be activated. For example, the event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, the metadata 183 includes configurable properties, flags, and/or lists that indicate how event recognizers interact, or are enabled to interact, with one another. In some embodiments, the metadata 183 includes configurable properties, flags, and/or lists that indicate whether sub-events are delivered to varying levels in the view or programmatic hierarchy.

In some embodiments, a respective event recognizer 180 activates the event handler 190 associated with an event when one or more particular sub-events of an event are recognized. In some embodiments, a respective event recognizer 180 delivers event information associated with the event to the event handler 190. Activating an event handler 190 is distinct from sending (and deferred sending) sub-events to a respective hit view. In some embodiments, the event recognizer 180 throws a flag associated with the recognized event, and the event handler 190 associated with the flag catches the flag and performs a predefined process.

In some embodiments, the event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, the data updater 176 creates and updates data used in the application 136-1. For example, the data updater 176 updates the telephone number used in the contacts module 137 or stores a video file. In some embodiments, the object updater 177 creates and updates objects used in the application 136-1. For example, the object updater 177 creates a new user-interface object or updates the position of a user-interface object. The GUI updater 178 updates the GUI. For example, the GUI updater 178 prepares display information and sends it to the graphics module 132 for display on the touch-sensitive display 112.

In some embodiments, the event handler(s) 190 includes or has access to the data updater 176, the object updater 177, and the GUI updater 178. In some embodiments, the data updater 176, the object updater 177, and the GUI updater 178 are included in a single module of a respective application 136-1 or the application view 191. In other embodiments, they are included in two or more software modules.

It shall be understood that the foregoing discussion regarding event handling of user touches on touch-sensitive displays also applies to other forms of user inputs to operate the multifunction devices 100 with input-devices, not all of which are initiated on touchscreens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
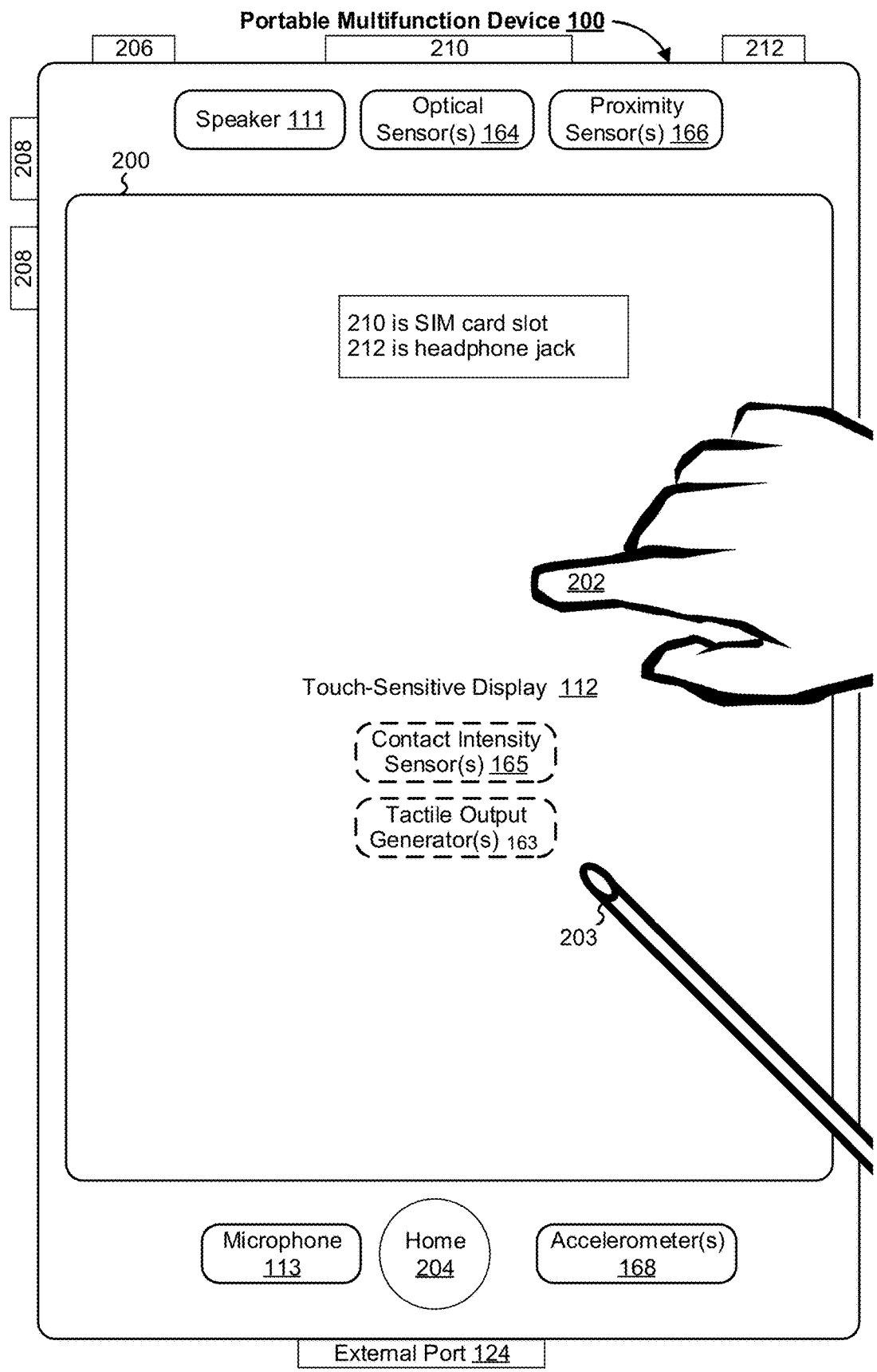
FIG. 2 illustrates a portable multifunction device having a touchscreen in accordance with some embodiments.

FIG. 2 illustrates a portable multifunction device 100 having a touchscreen (e.g., touch-sensitive display system 112, FIG. 1A) in accordance with some embodiments. The touchscreen optionally displays one or more graphics within a user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

The device 100 optionally also includes one or more physical buttons, such as "home" or menu button 204. As described previously, menu button 204 is, optionally, used to navigate to any application 136 in a set of applications that are, optionally executed on the device 100. Alternatively, in some embodiments, the menu button is implemented as a soft key in a GUI displayed on the touchscreen display.

In some embodiments, the device 100 includes the touchscreen display 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, the device 100 also accepts verbal input for activation or deactivation of some functions through the microphone 113. The device 100 also, optionally, includes the one or more contact intensity sensors 165 for detecting intensity of contacts on the touch-sensitive display system 112 and/or the one or more tactile output generators 163 for generating tactile outputs for a user of the device 100.

FIG. 3 is a block diagram of an example multifunction device with a display and a touch-sensitive surface in accordance with some embodiments. The device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, a memory 370, and one or more communication buses 320 for interconnecting these components. The communication buses 320 optionally include circuitry (sometimes called a chipset) that interconnects and controls communications between system components. The device 300 includes an input/output (I/O) interface 330 comprising a display 340, which is typically a touchscreen display. The I/O interface 330 also optionally includes a keyboard and/or mouse (or other pointing device) 350 and touchpad 355, a tactile output generator 357 for generating tactile outputs on the device 300 (e.g., similar to the one or more tactile output generators 163 described above with reference to FIG. 1A), sensors 359 (e.g., touch-sensitive, optical, contact intensity, proximity, acceleration, attitude, and/or magnetic sensors similar to the sensors 112, 164, 165, 166, 167, 168, and 169 described above with reference to FIG. 1A).

The memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. The memory 370 optionally includes one or more storage devices remotely located from the one or more processing units 310. In some embodiments, the memory 370 stores programs, modules, and data structures analogous to the programs, modules, and data structures stored in the memory 102 of the portable multifunction device 100 (FIG. 1A), or a subset thereof. Furthermore, the memory 370 optionally stores additional programs, modules, and data structures not present in the memory 102 of the portable multifunction device 100. For example, the memory 370 of device 300 optionally stores a drawing module 380, a presentation module 382, a word processing module 384, a website creation module 386, a disk authoring module 388, and/or a spreadsheet module 390, while the memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, the memory 370 optionally stores a subset of the modules and data structures identified above. Furthermore, the memory 370 optionally stores additional modules and data structures not described above.

Attention is now directed towards embodiments of user interfaces ("UI") that are, optionally, implemented on the portable multifunction device 100.

Figure 4A:
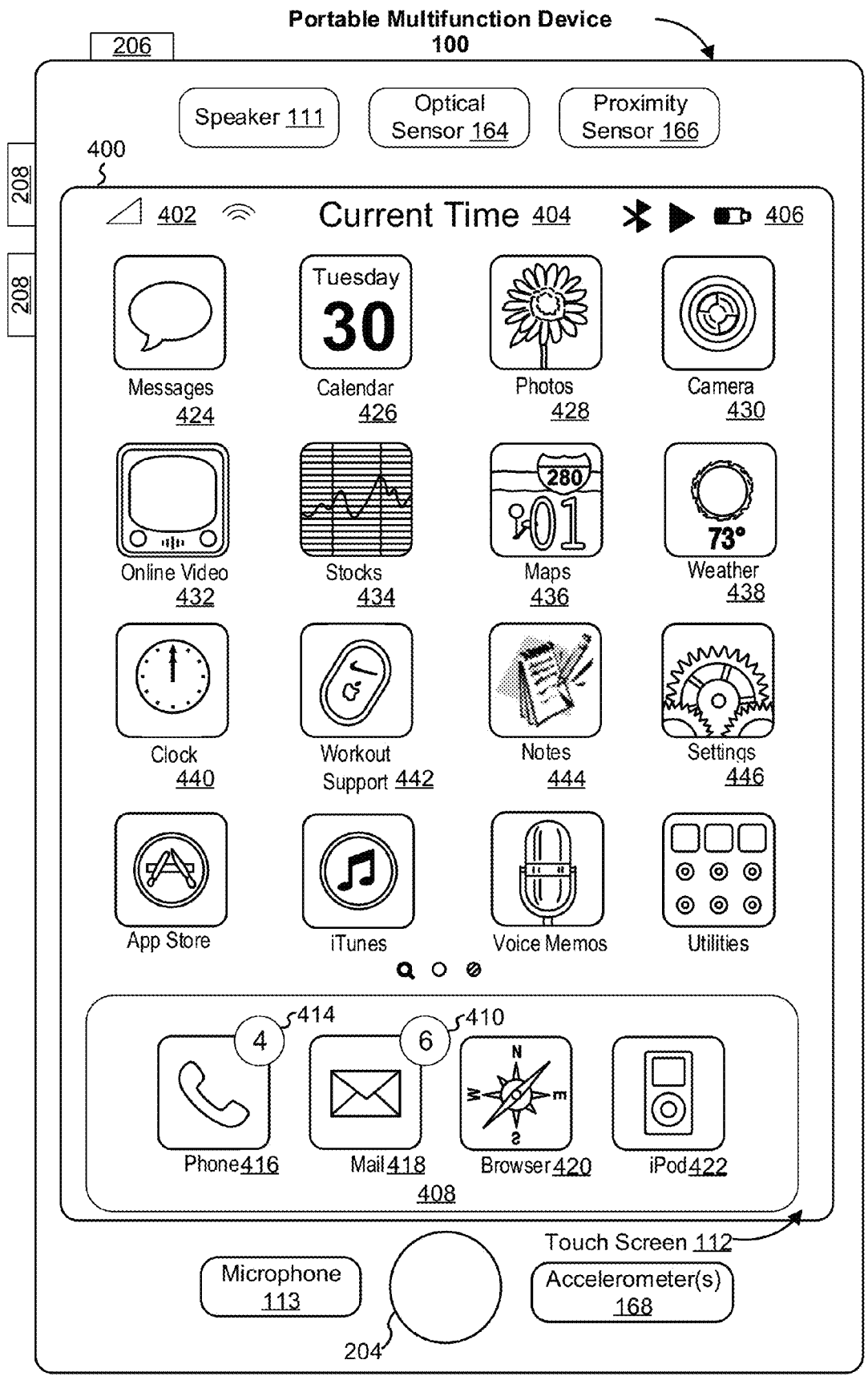
FIG. 4A illustrates an example user interface for a menu of applications on a portable multifunction device in accordance with some embodiments.

FIG. 4A illustrates an example user interface for a menu of applications on the portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
　Icon 416 for the telephone module 138, labeled "Phone," which optionally includes an indicator 414 of the number of missed calls or voicemail messages;
　Icon 418 for the e-mail client module 140, labeled "Mail," which optionally includes an indicator 410 of the number of unread e-mails;
　Icon 420 for the browser module 147, labeled "Browser"; and
　Icon 422 for the video and music player module 152, also referred to as iPod (trademark of Apple Inc. of Cupertino, Calif.) module 152, labeled "iPod"; and
Icons for other applications, such as:
　Icon 424 for the IM module 141, labeled "Text";
　Icon 426 for the calendar module 148, labeled "Calendar";
　Icon 428 for the image management module 144, labeled "Photos";
　Icon 430 for the camera module 143, labeled "Camera";
　Icon 432, labeled "Online Video";
　Icon 434 for the stocks widget 149-2, labeled "Stocks";
　Icon 436 for the map module 154, labeled "Map";
　Icon 438 for the weather widget 149-1, labeled "Weather";
　Icon 440 for the alarm clock widget 169-6, labeled "Clock";
　Icon 442 for the workout support module 142, labeled "Workout Support";
　Icon 444 for the notes module 153, labeled "Notes"; and
　Icon 446 for a settings application or module, which provides access to settings for device 100 and its various applications 136.

It should be noted that the icon labels illustrated in FIG. 4A are merely examples. For example, in some embodiments, the icon 422 for the video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
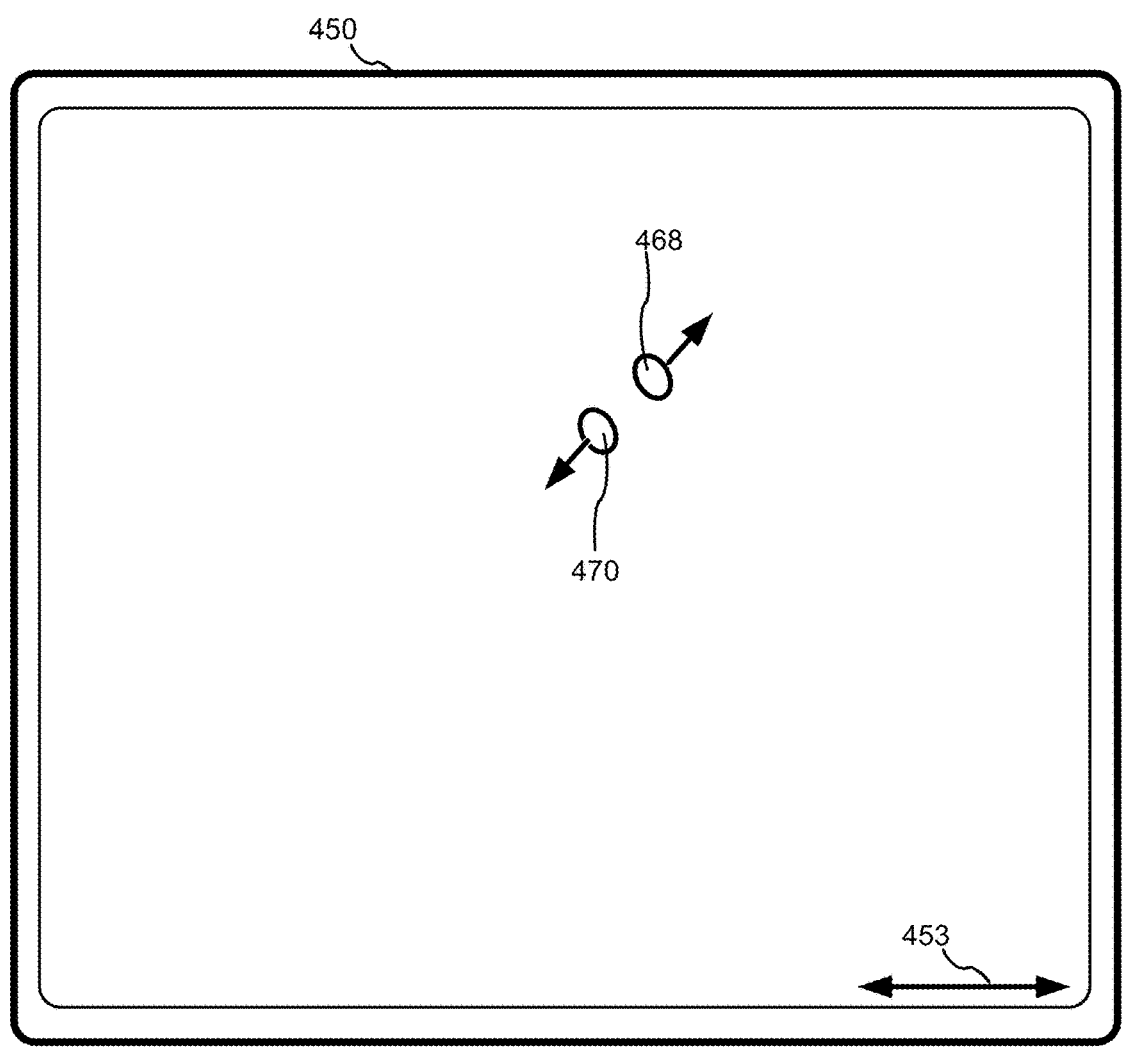
FIG. 4B illustrates an example user interface for a multifunction device with a touch-sensitive surface that is separate from the display in accordance with some embodiments.
Figure 4B:
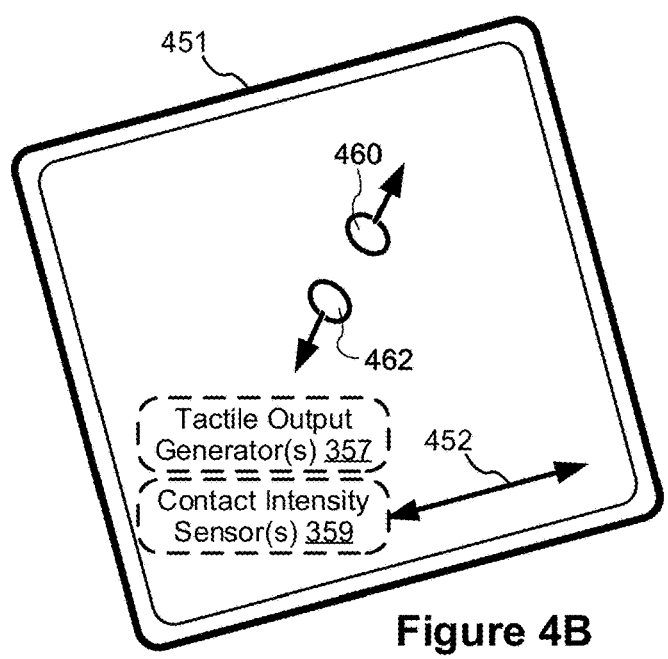

FIG. 4B illustrates an example user interface on a device (e.g., the device 300, FIG. 3) with a touch-sensitive surface 451 (e.g., a tablet or touchpad 355, FIG. 3) that is separate from the display 450. The device 300 also, optionally, includes one or more contact intensity sensors (e.g., the one or more of sensors 359) for detecting intensity of contacts on the touch-sensitive surface 451 and/or the one or more tactile output generators 359 for generating tactile outputs for a user of the device 300.

FIG. 4B illustrates an example user interface on a device (e.g., the device 300, FIG. 3) with a touch-sensitive surface 451 (e.g., a tablet or touchpad 355, FIG. 3) that is separate from the display 450. Although many of the examples that follow will be given with reference to inputs on the touch-screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., the touch-sensitive surface 451 in FIG. 4B) has a primary axis (e.g., a primary axis 452 in FIG. 4B) that corresponds to a primary axis (e.g., a primary axis 453 in FIG. 4B) on the display (e.g., the display 450 in FIG. 4B). In accordance with these embodiments, the device detects contacts (e.g., contacts 460 and 462 in FIG. 4B) with the touch-sensitive surface 451 at locations that correspond to respective locations on the display (e.g., in FIG. 4B, the contact 460 corresponds to a location 468 and the contact 462 corresponds to a location 470). In this way, user inputs (e.g., contacts 460 and 462, and movements thereof) detected by the device on the touch-sensitive surface (e.g., the touch-sensitive surface 451 in FIG. 4B) are used by the device to manipulate the user interface on the display (e.g., the display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., the touchpad 355 in FIG. 3 or the touch-sensitive surface 451 in FIG. 4B) while the cursor is over a particular user interface element (e.g., a button, window, slider or other user interface element), the particular user interface element is adjusted in accordance with the detected input. In some implementations that include a touchscreen display (e.g., the touch-sensitive display system 112 in FIG. 1A or the touchscreen in FIG. 4A) that enables direct interaction with user interface elements on the touchscreen display, a detected contact on the touchscreen acts as a "focus selector," so that when an input (e.g., a press input by the contact) is detected on the touchscreen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touchscreen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touchscreen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touchscreen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and an input device.

Figure 5A:
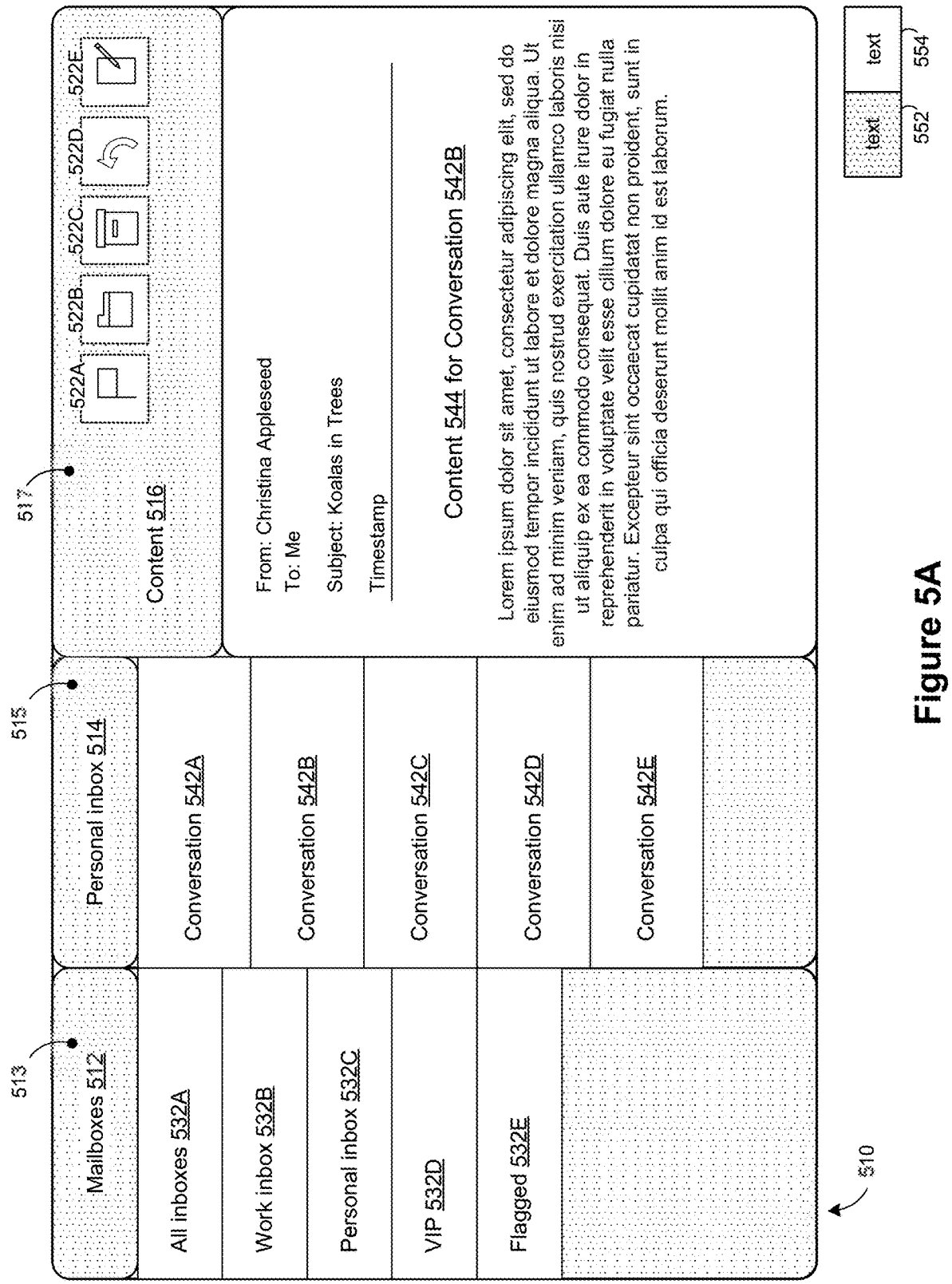
FIGS. 5A-5T illustrate example user interfaces for navigating and manipulating user interfaces displayed according to a dark display mode in accordance with some embodiments.
Figure 5B:
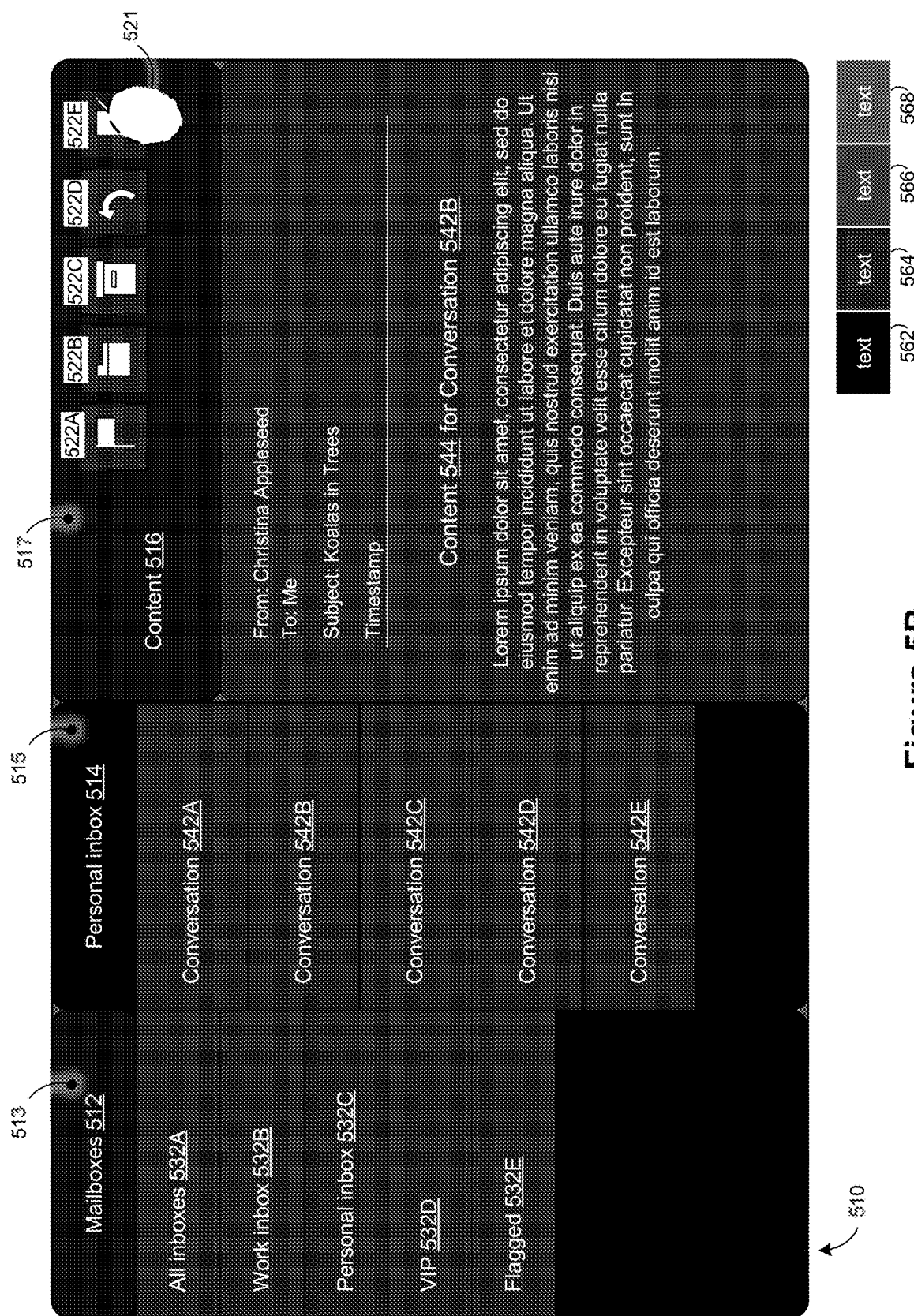
Figure 5C:
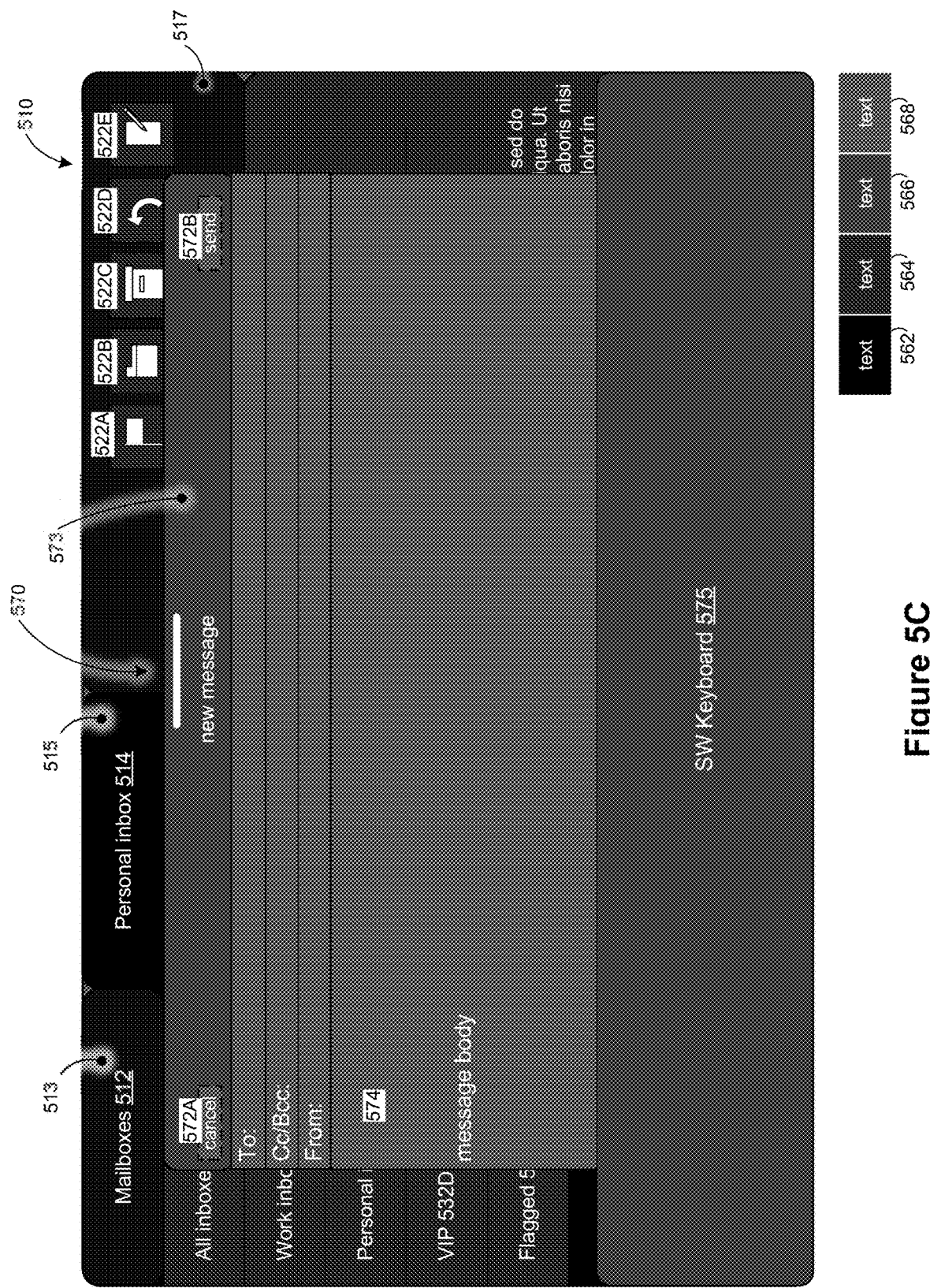
Figure 5D:
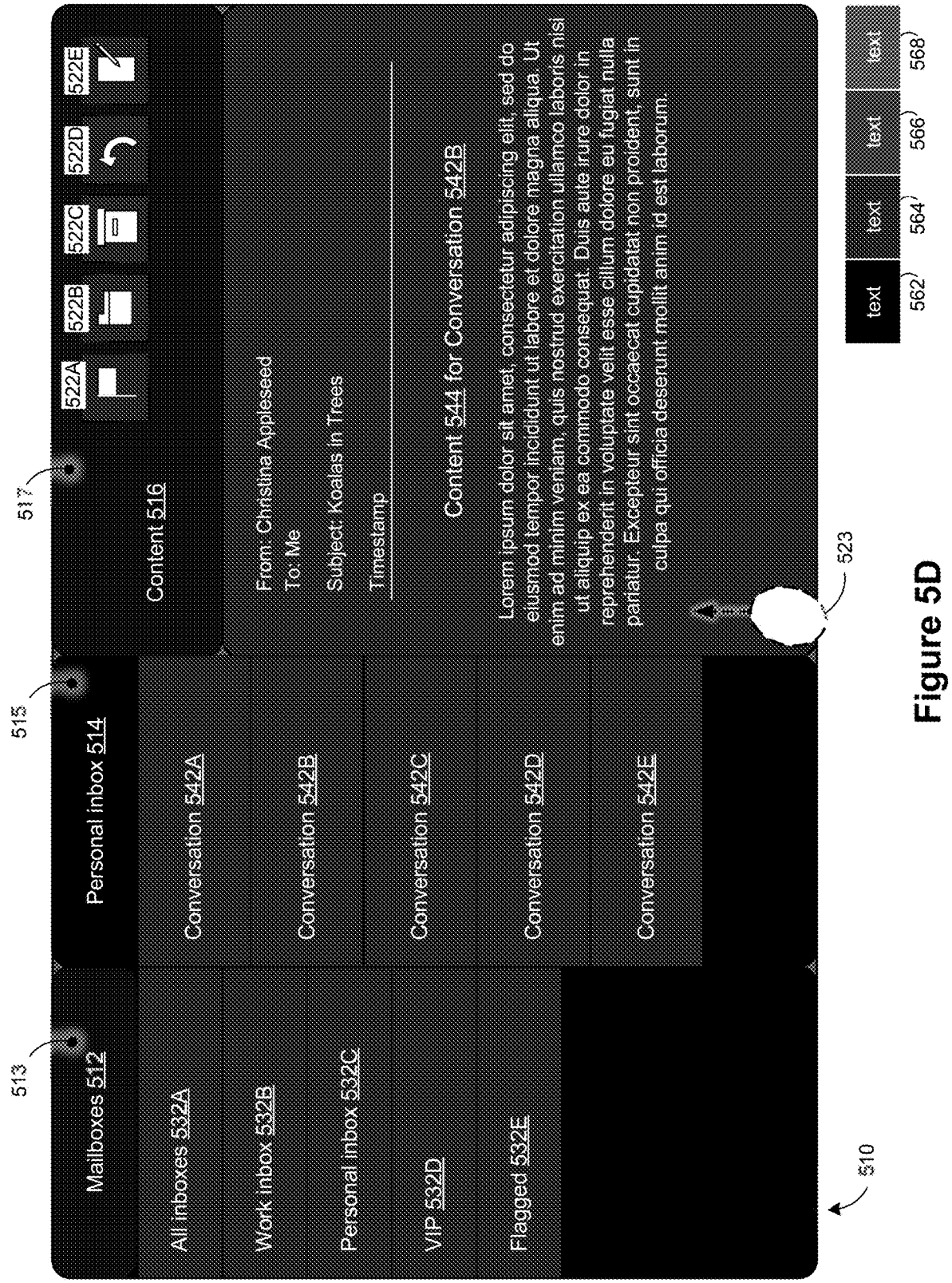
Figure 5E:
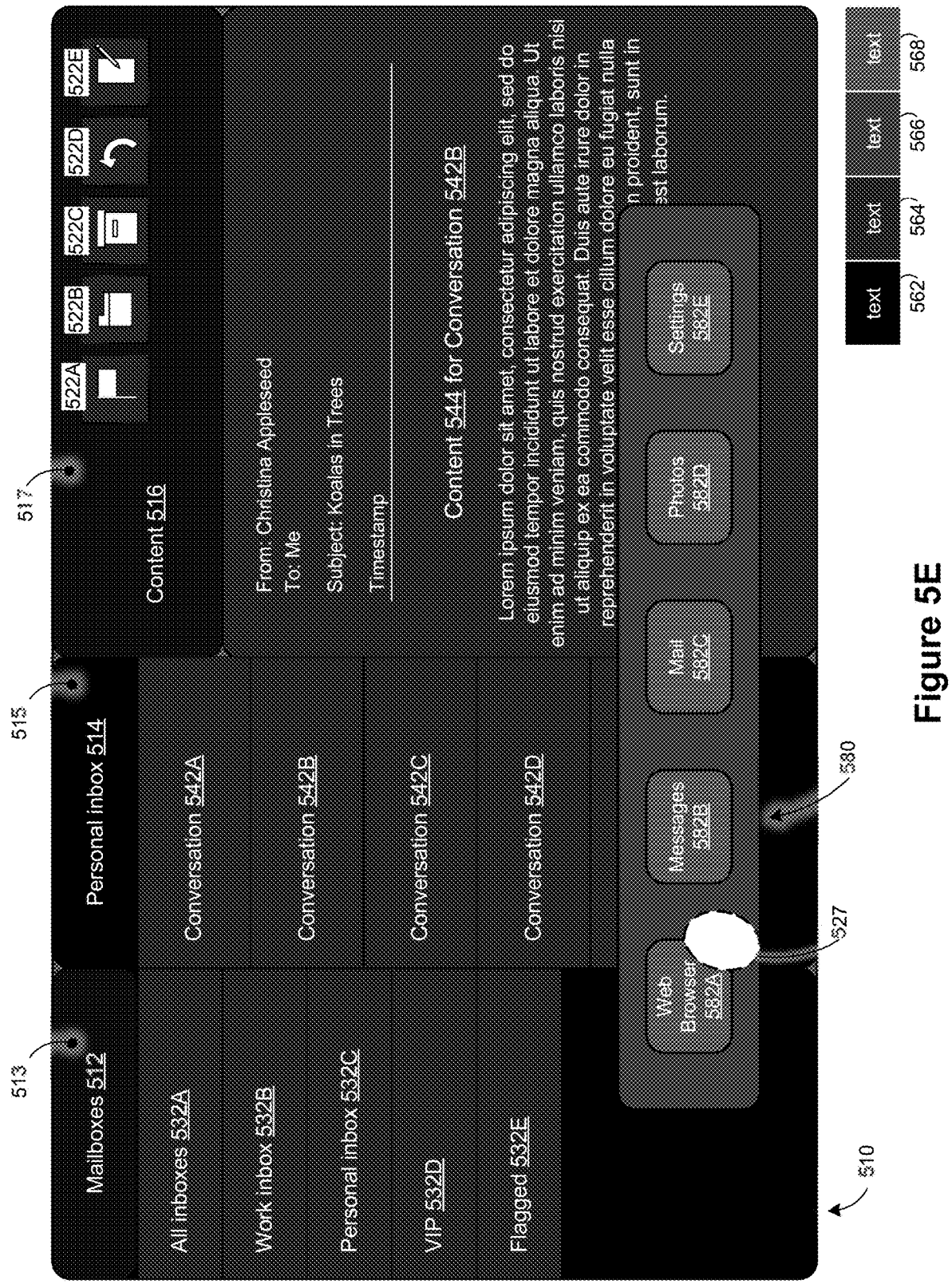
Figure 5F:
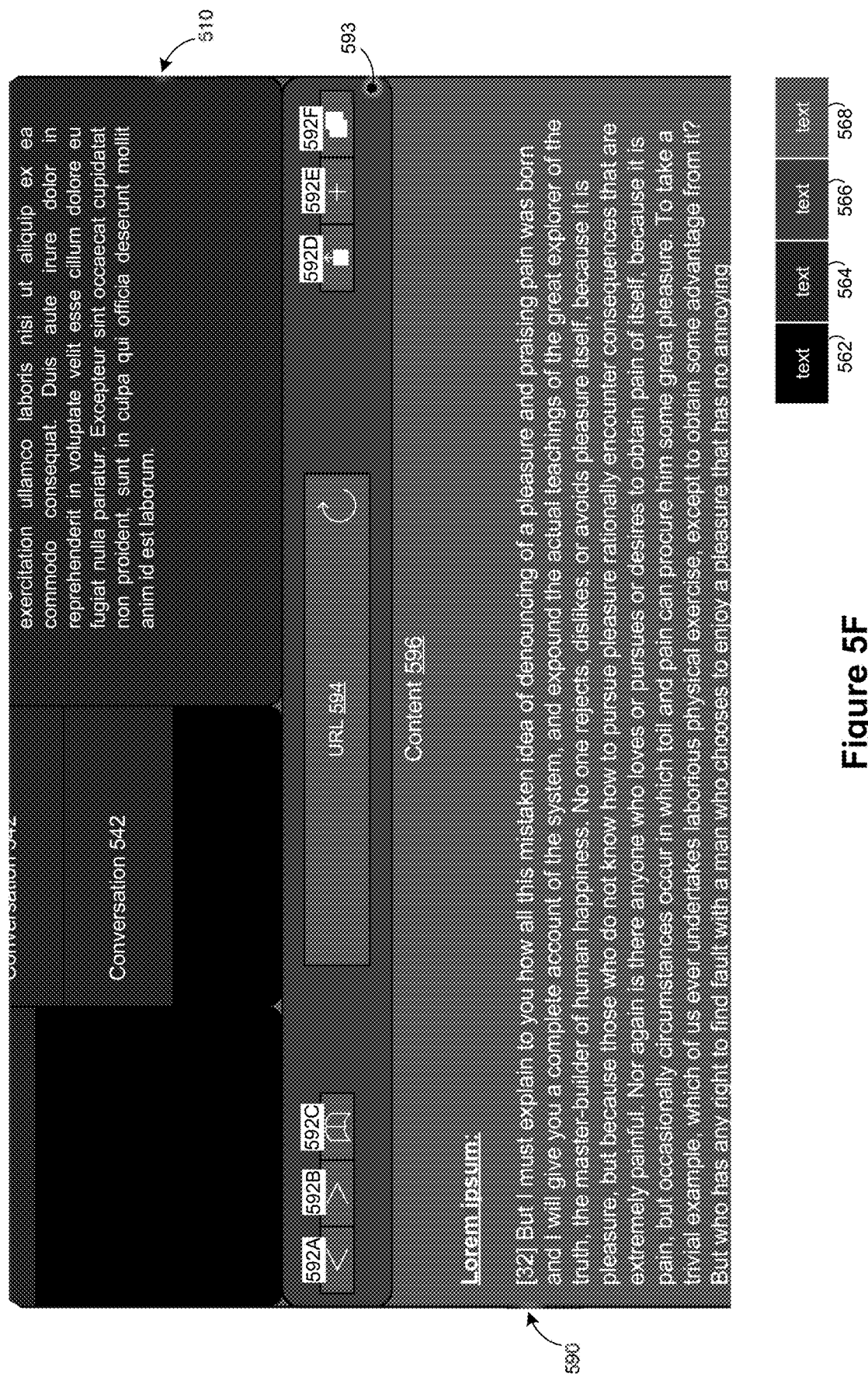
Figure 5G:
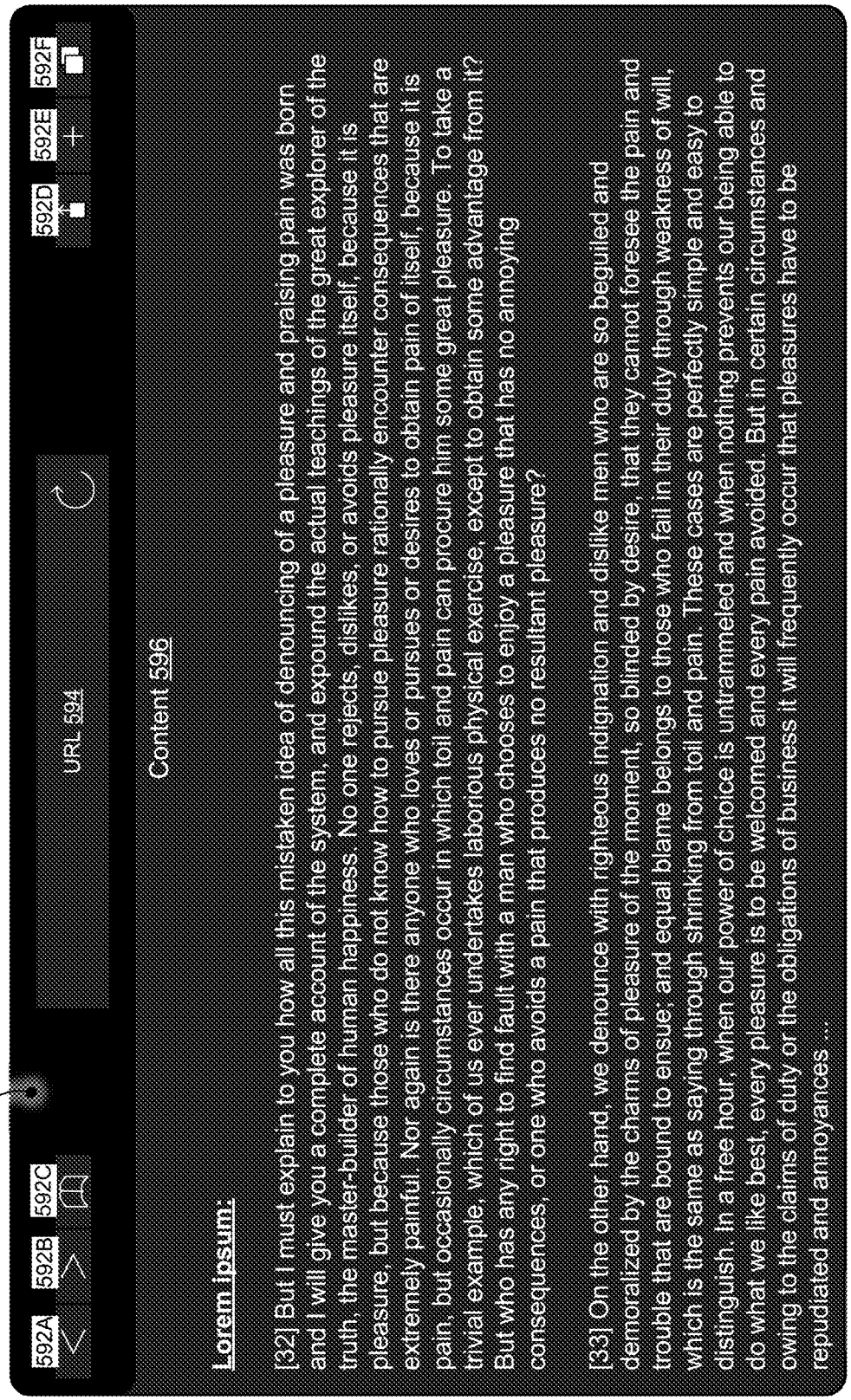
Figure 5G:
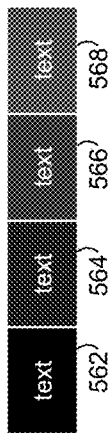
Figure 5H:
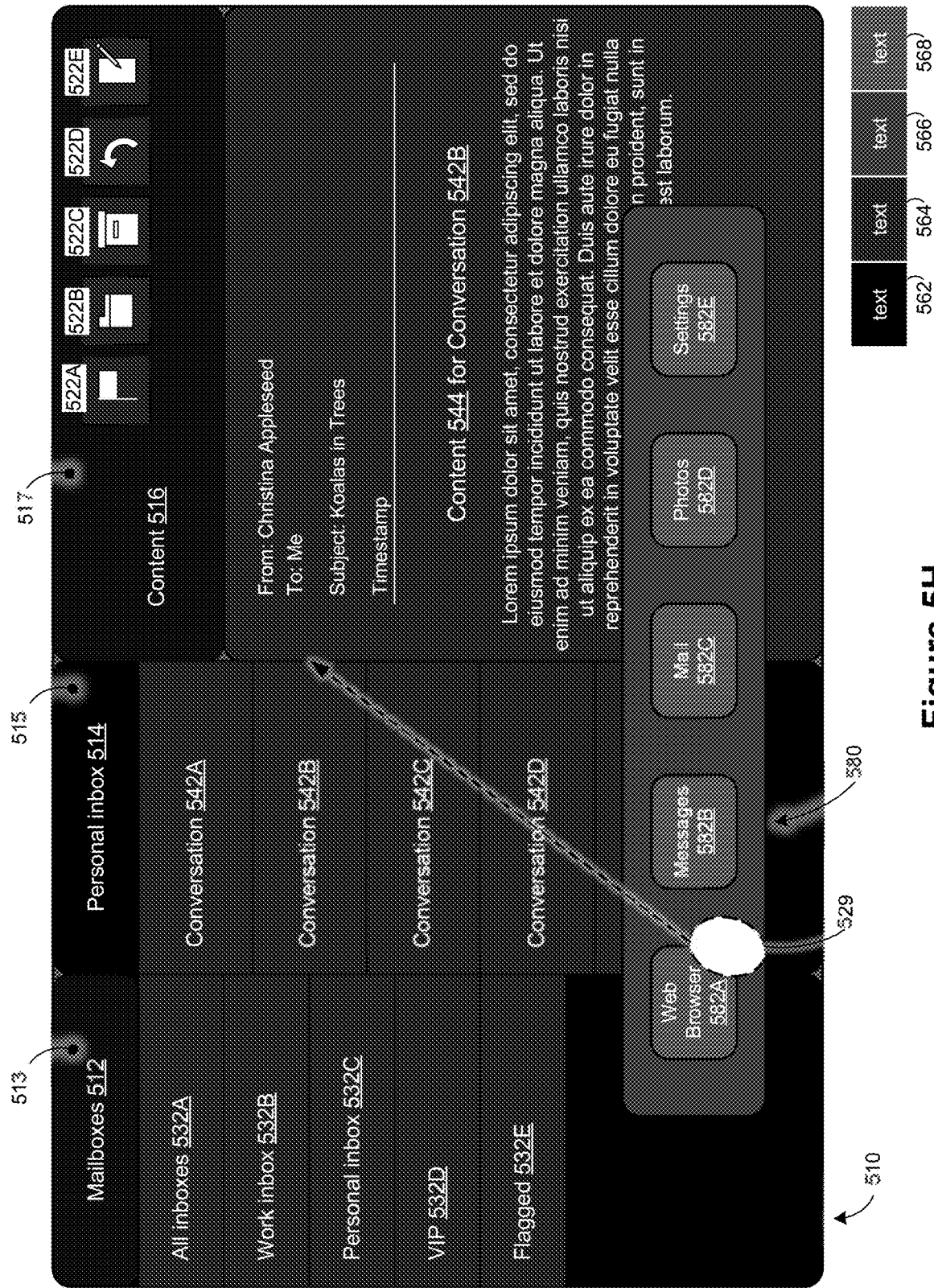
Figure 5I:
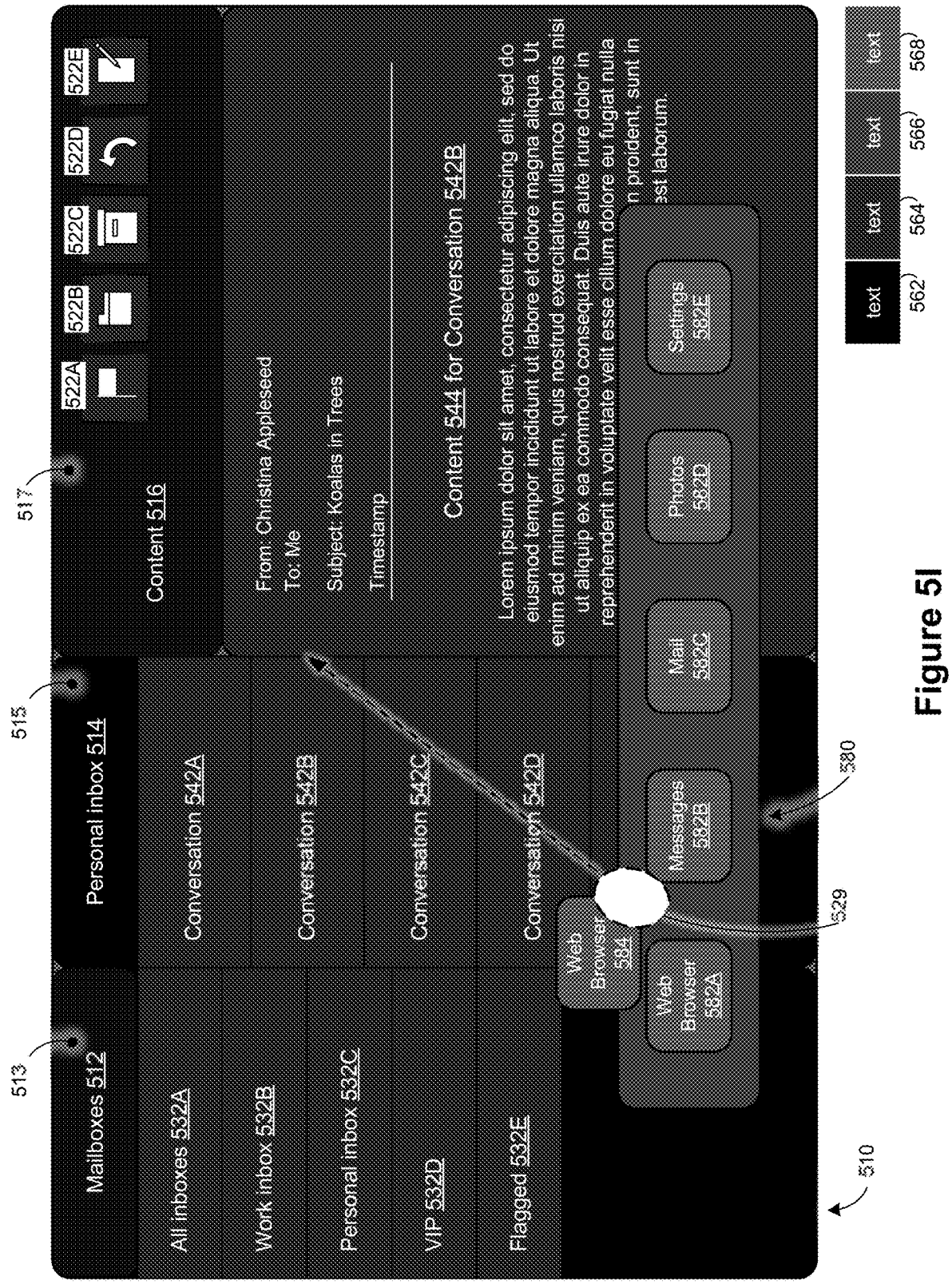
Figure 5J:
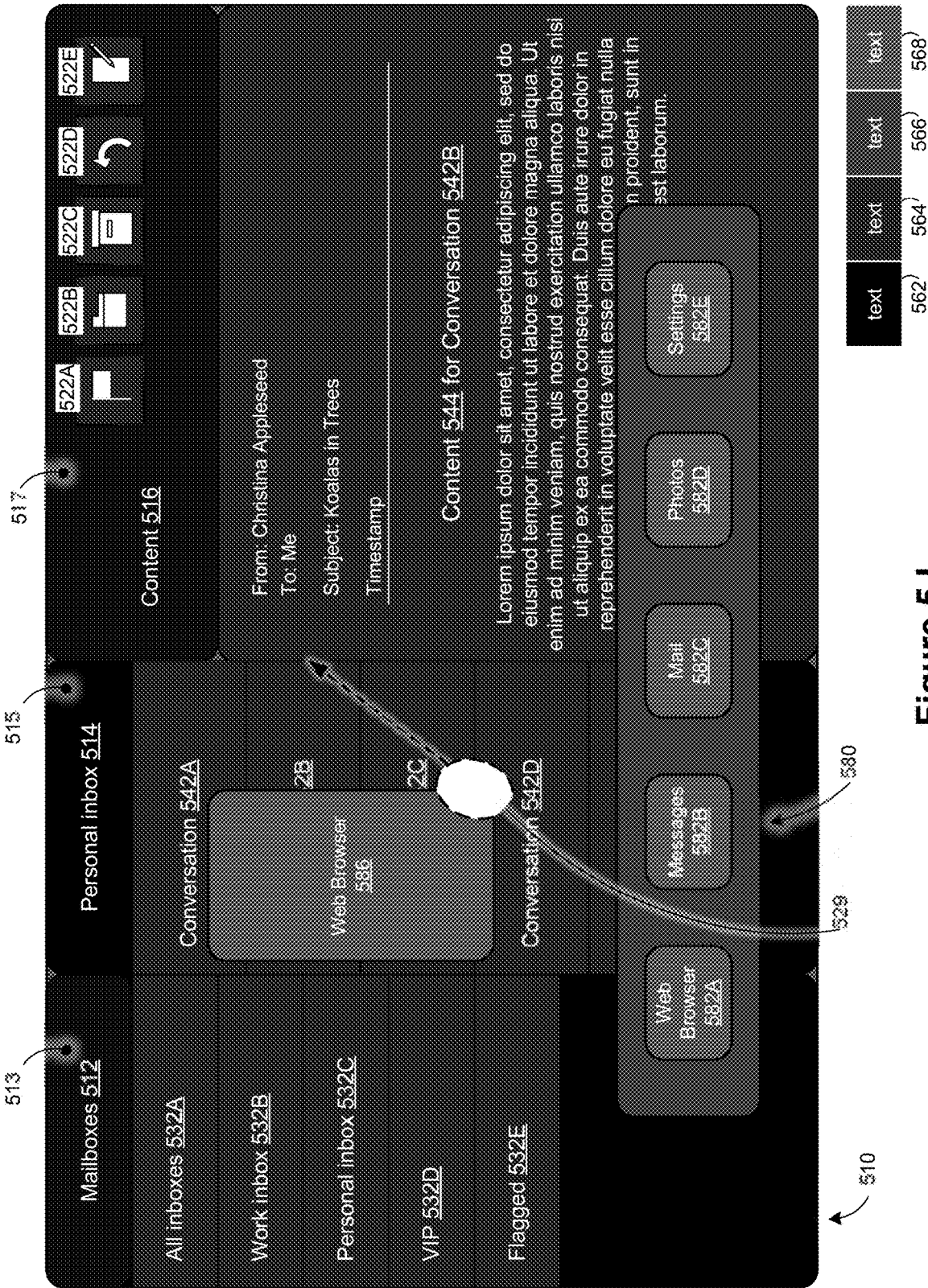
Figure 5K:
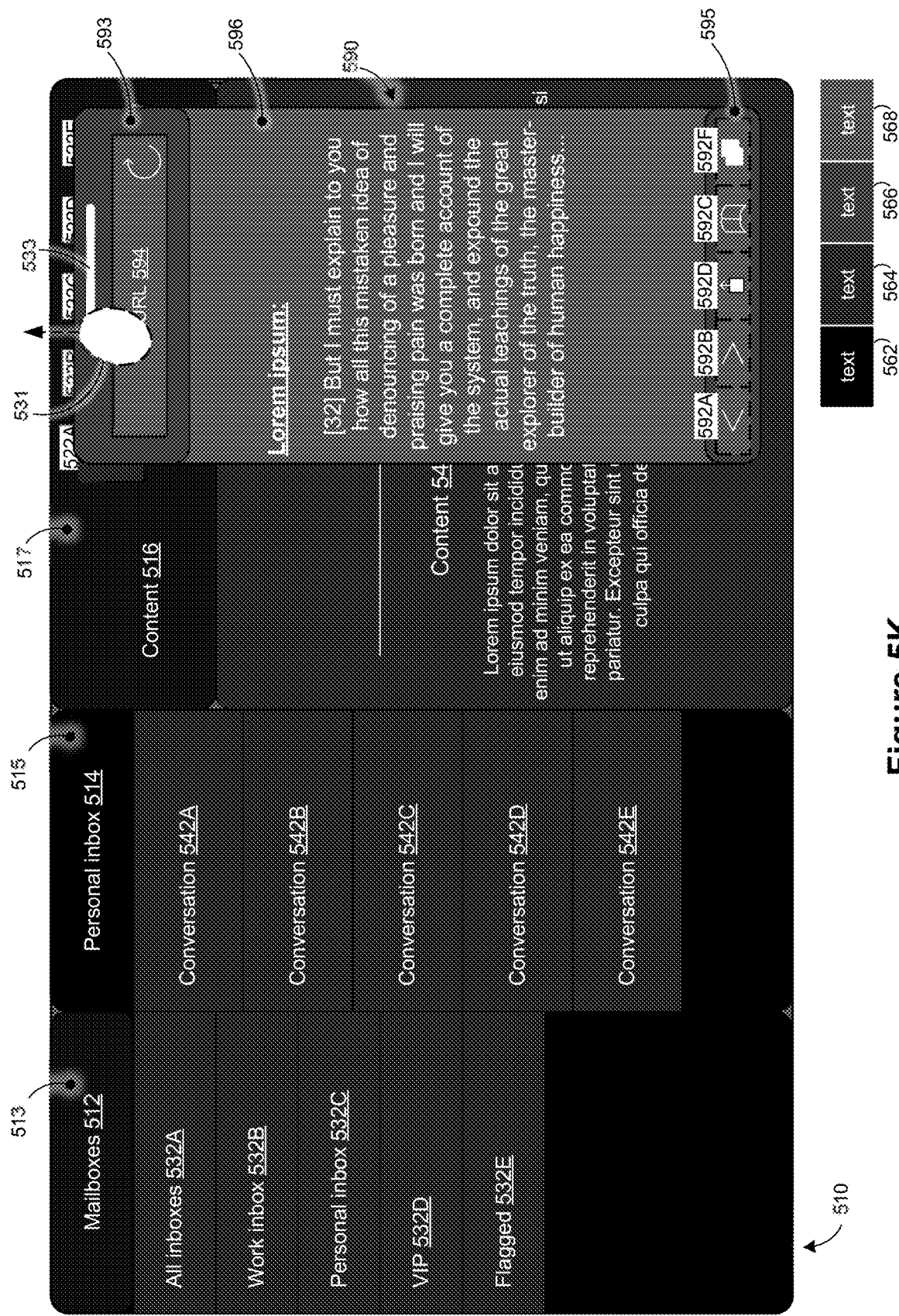
Figure 5L:
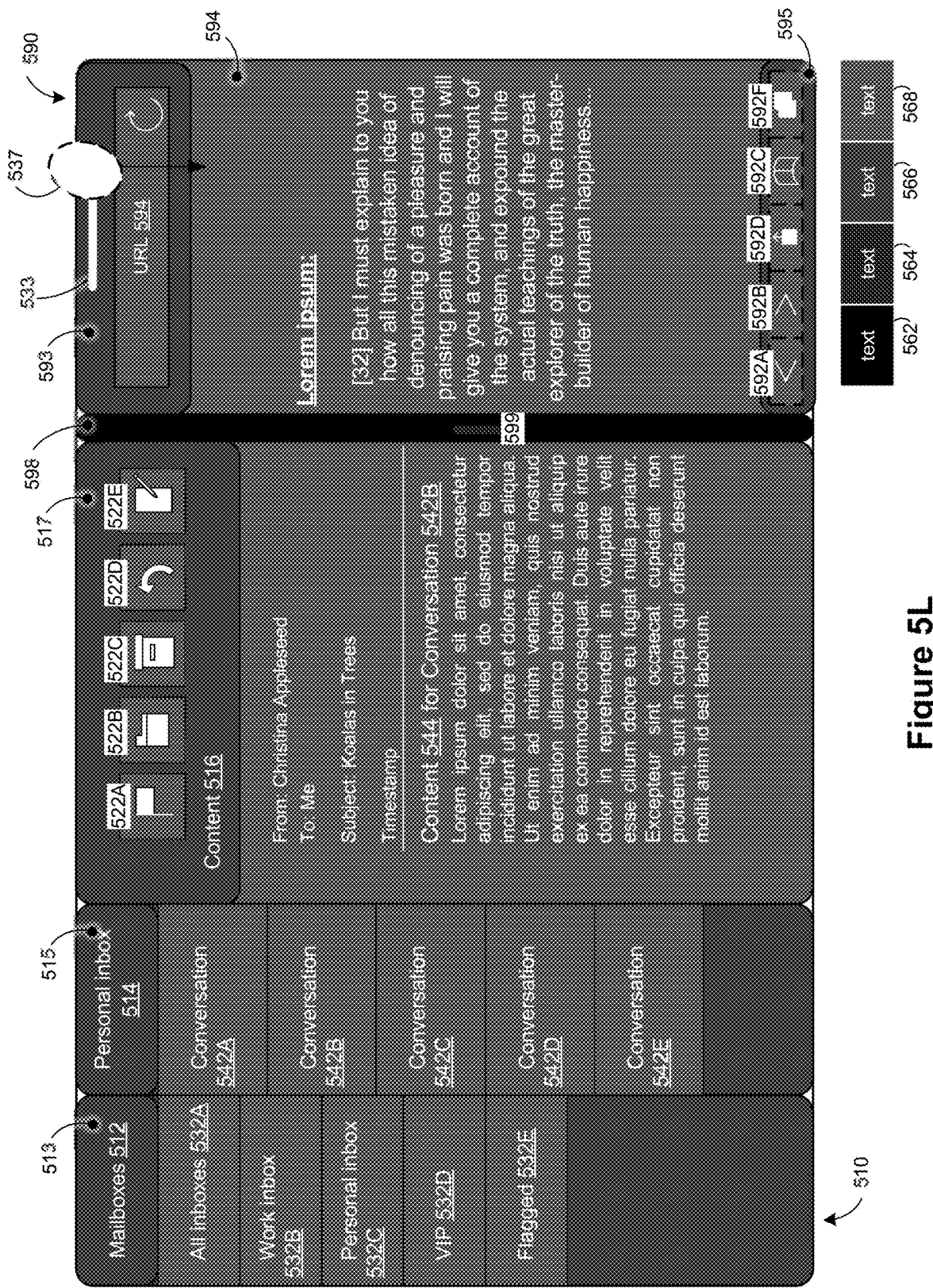
Figure 5M:
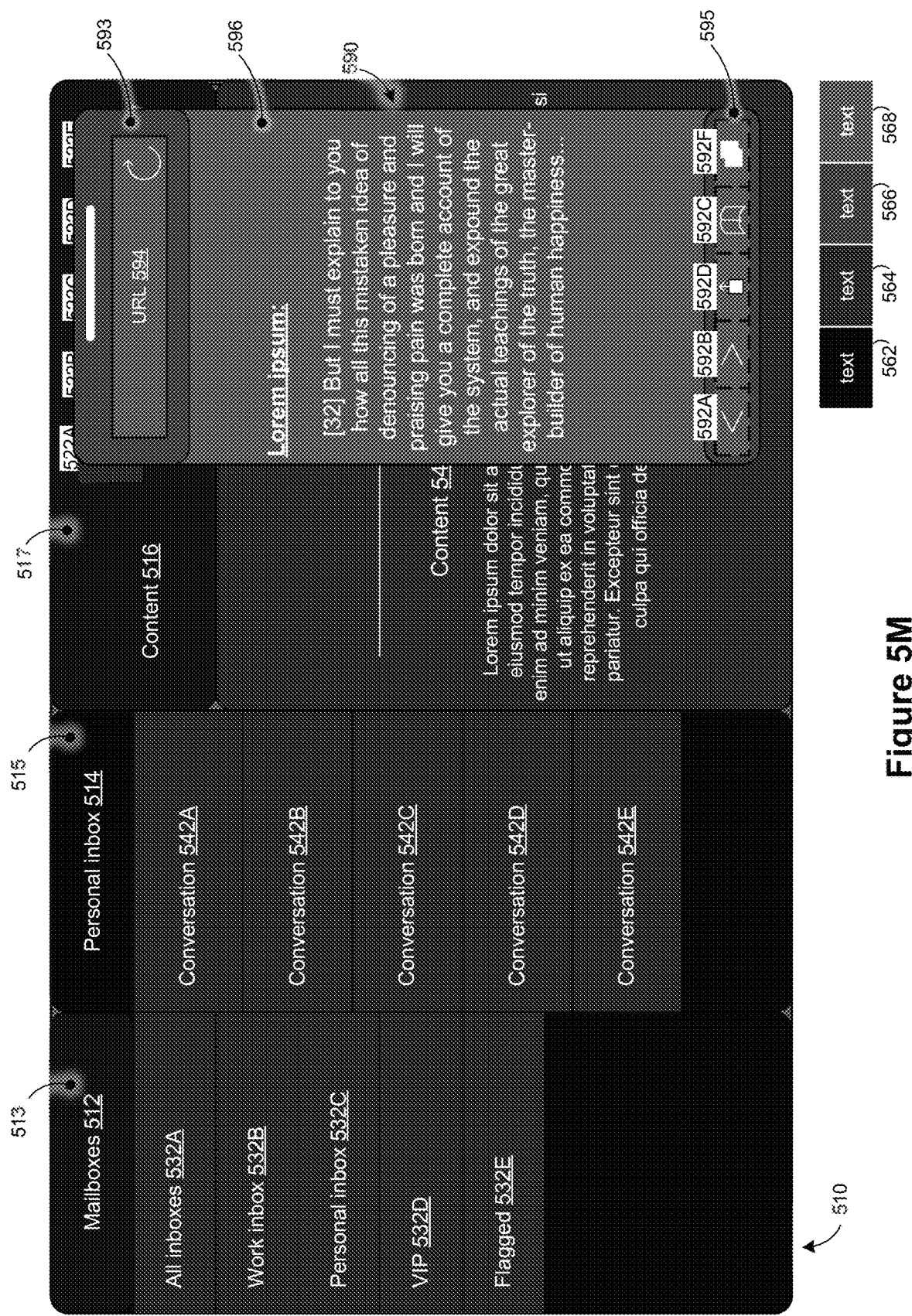
Figure 5N:
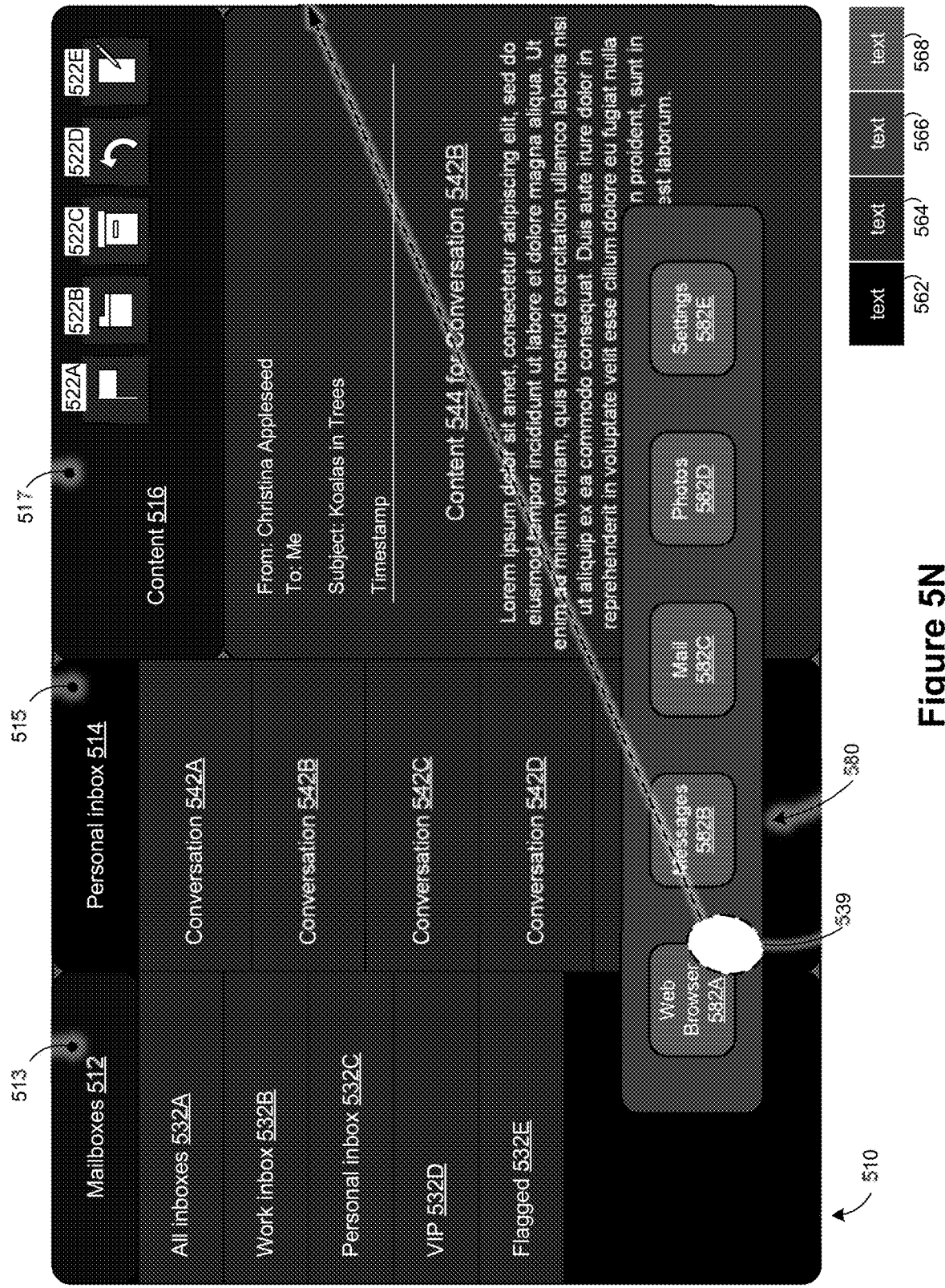
Figure 5O:
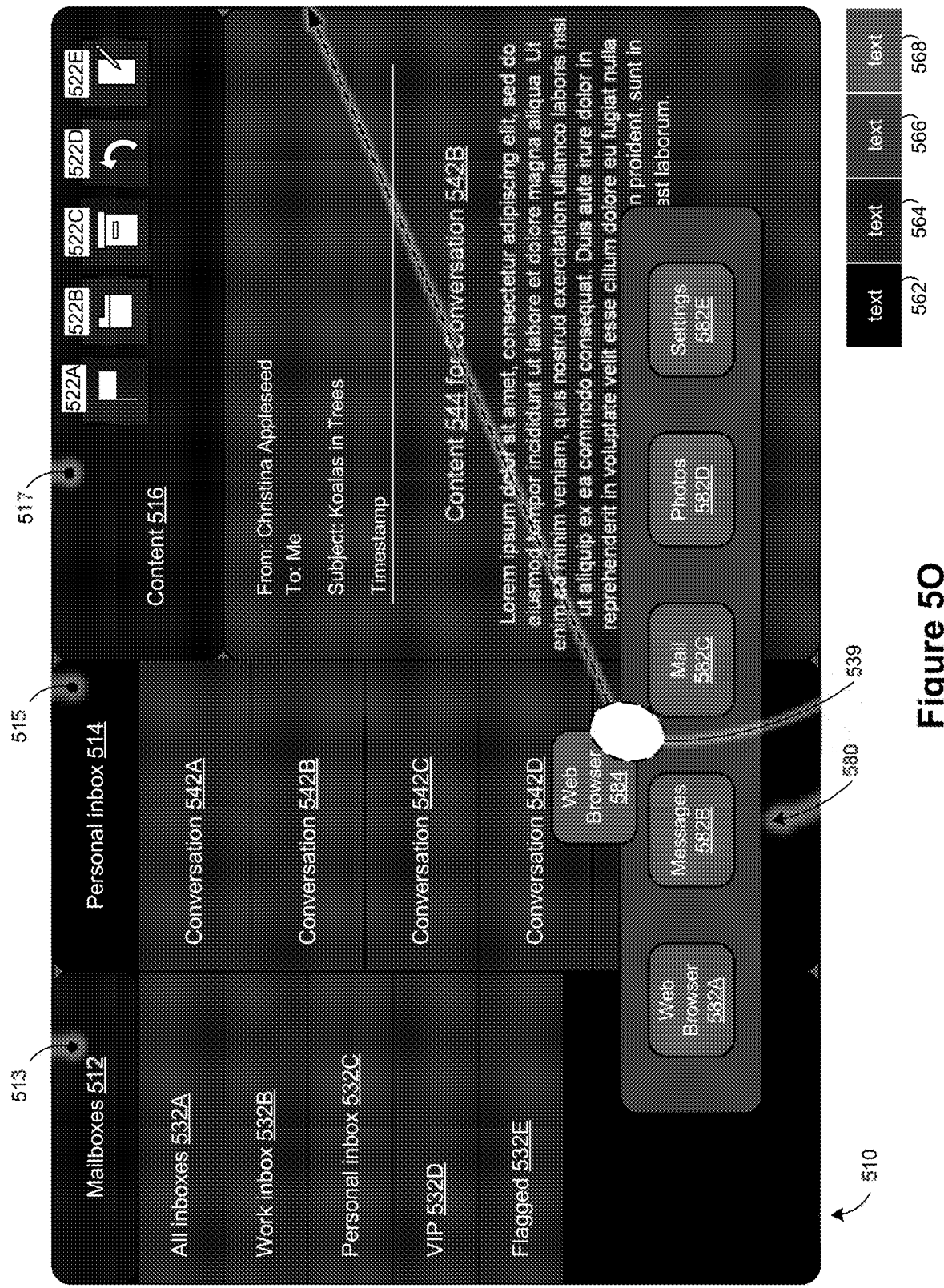
Figure 5P:
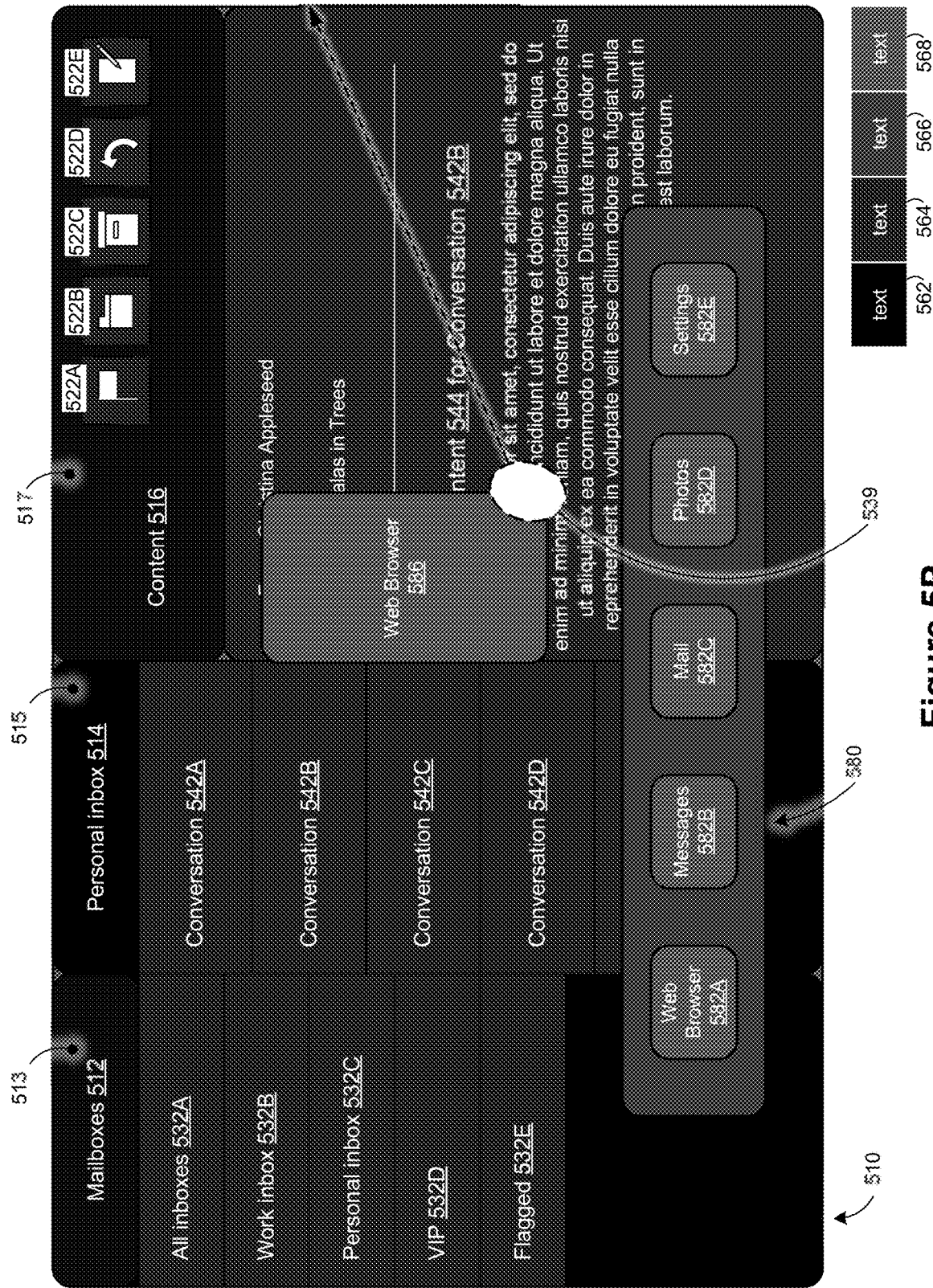
Figure 5Q:
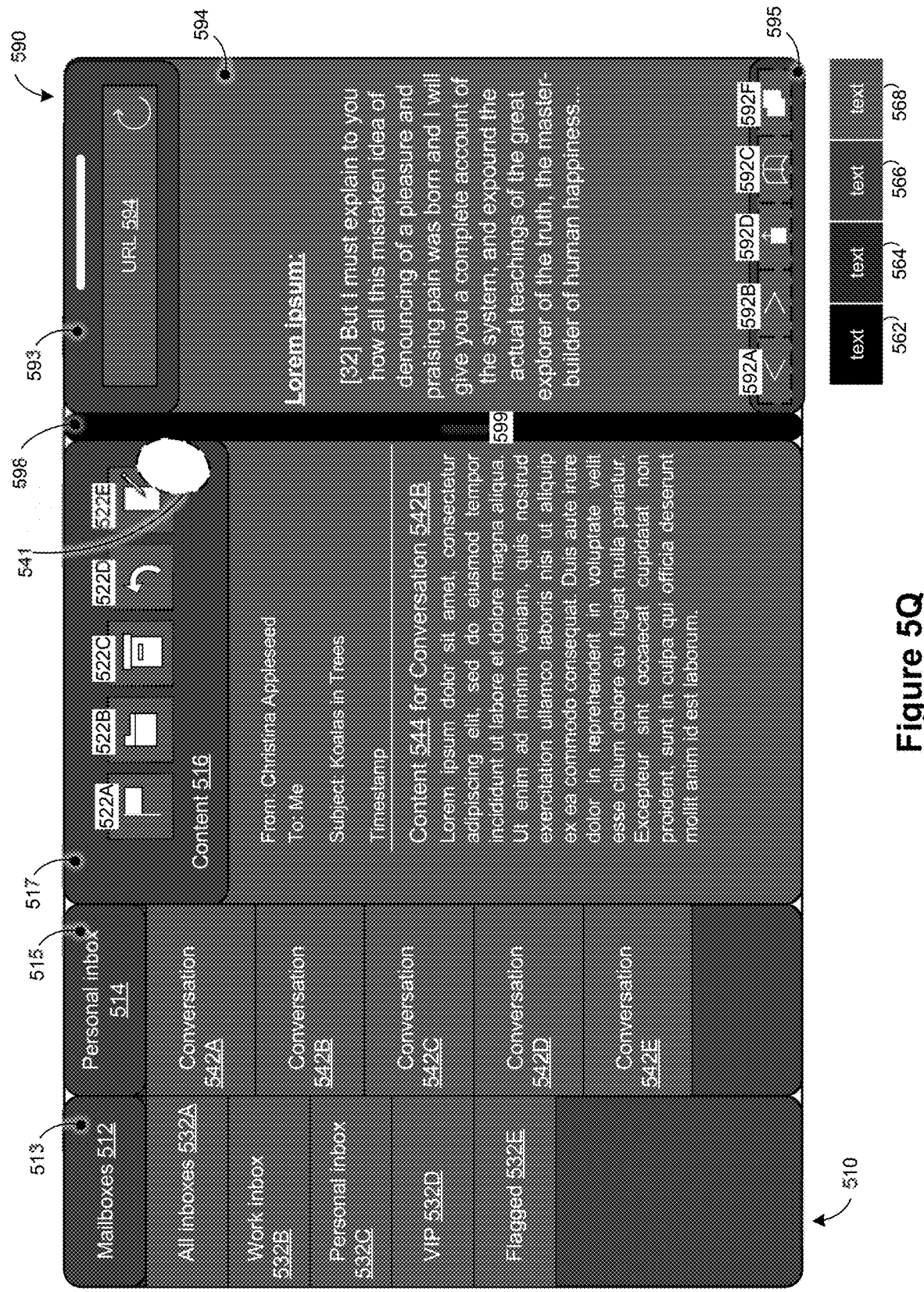
Figure 5R:
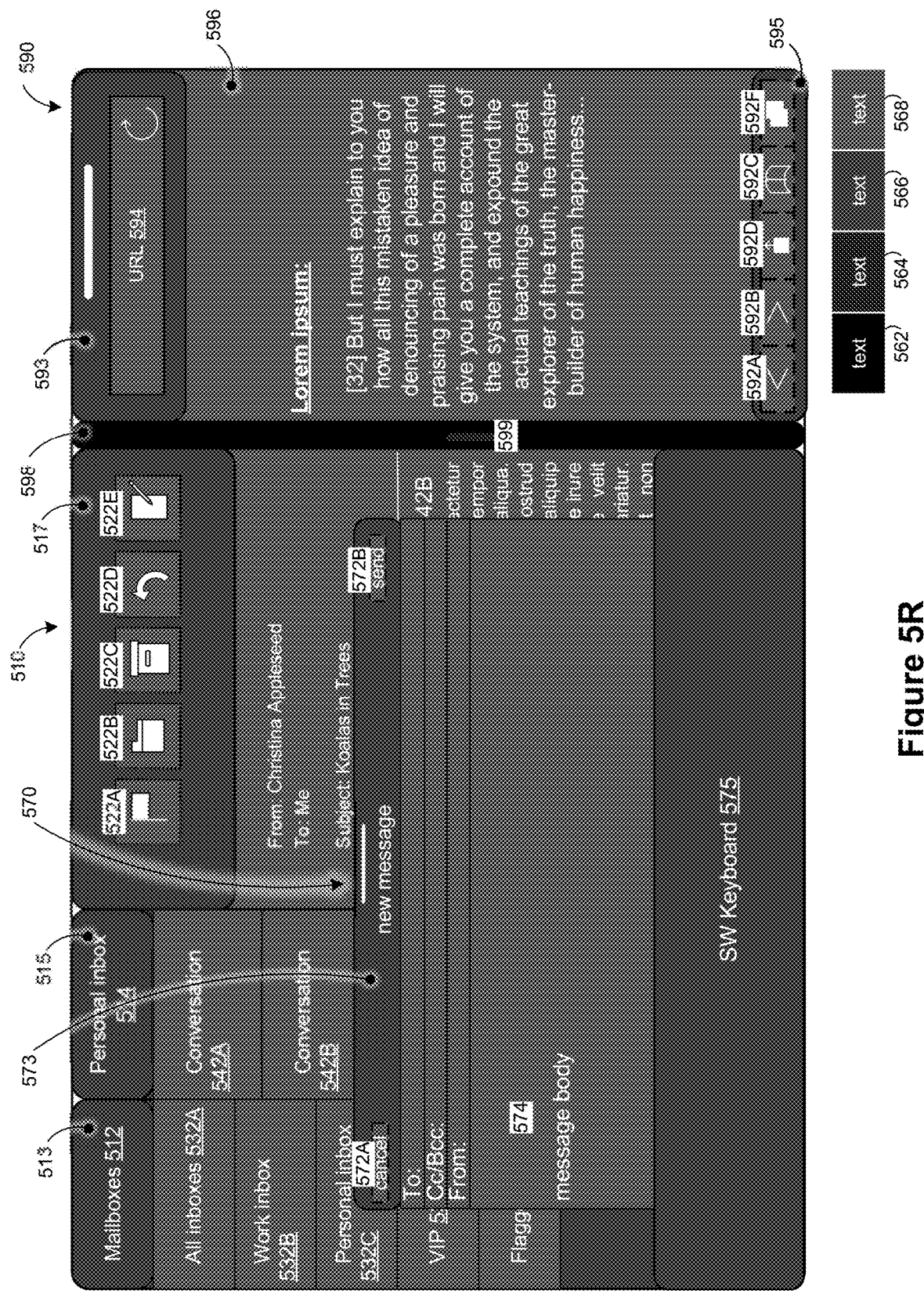
Figure 5S:
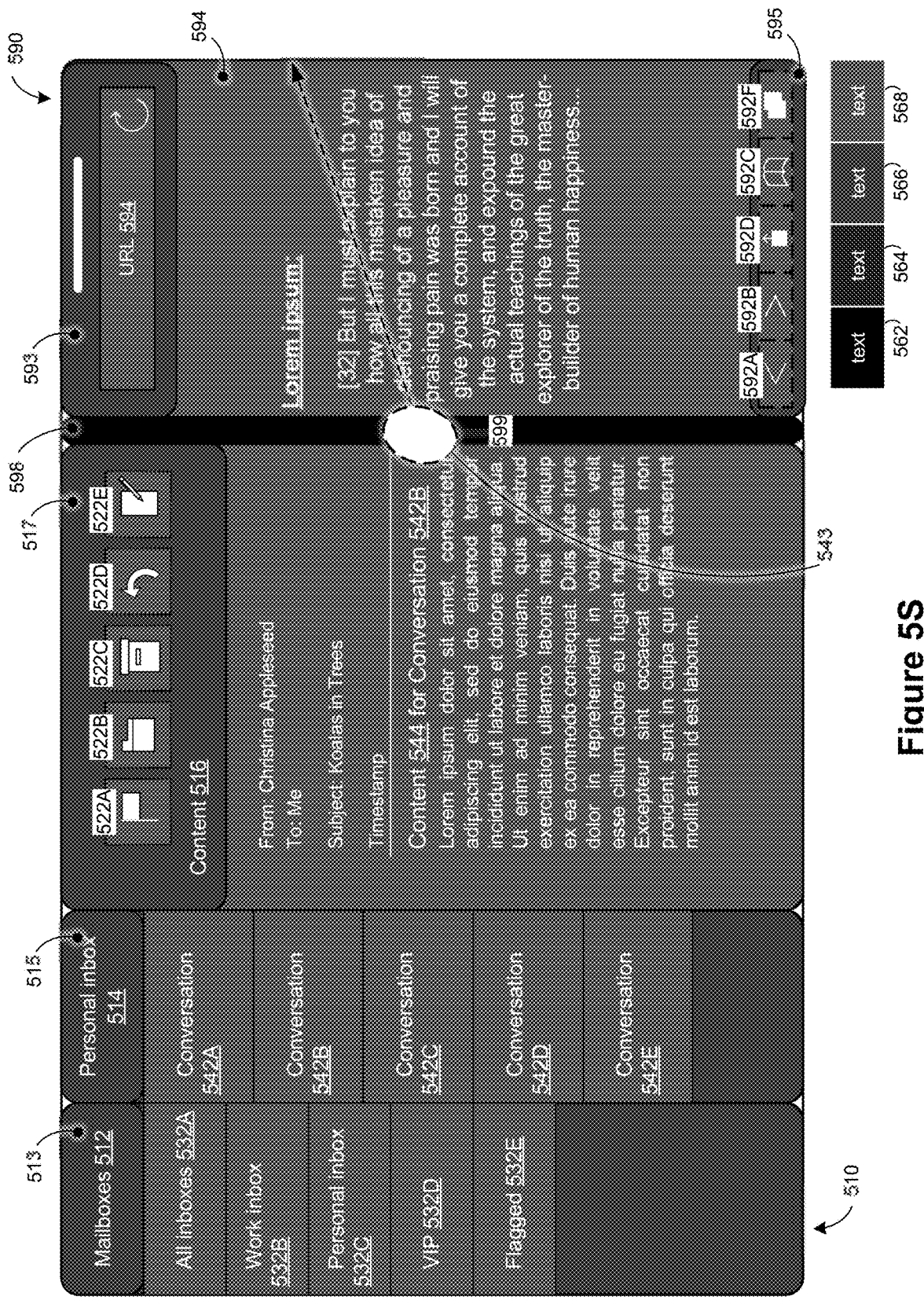
Figure 5T:
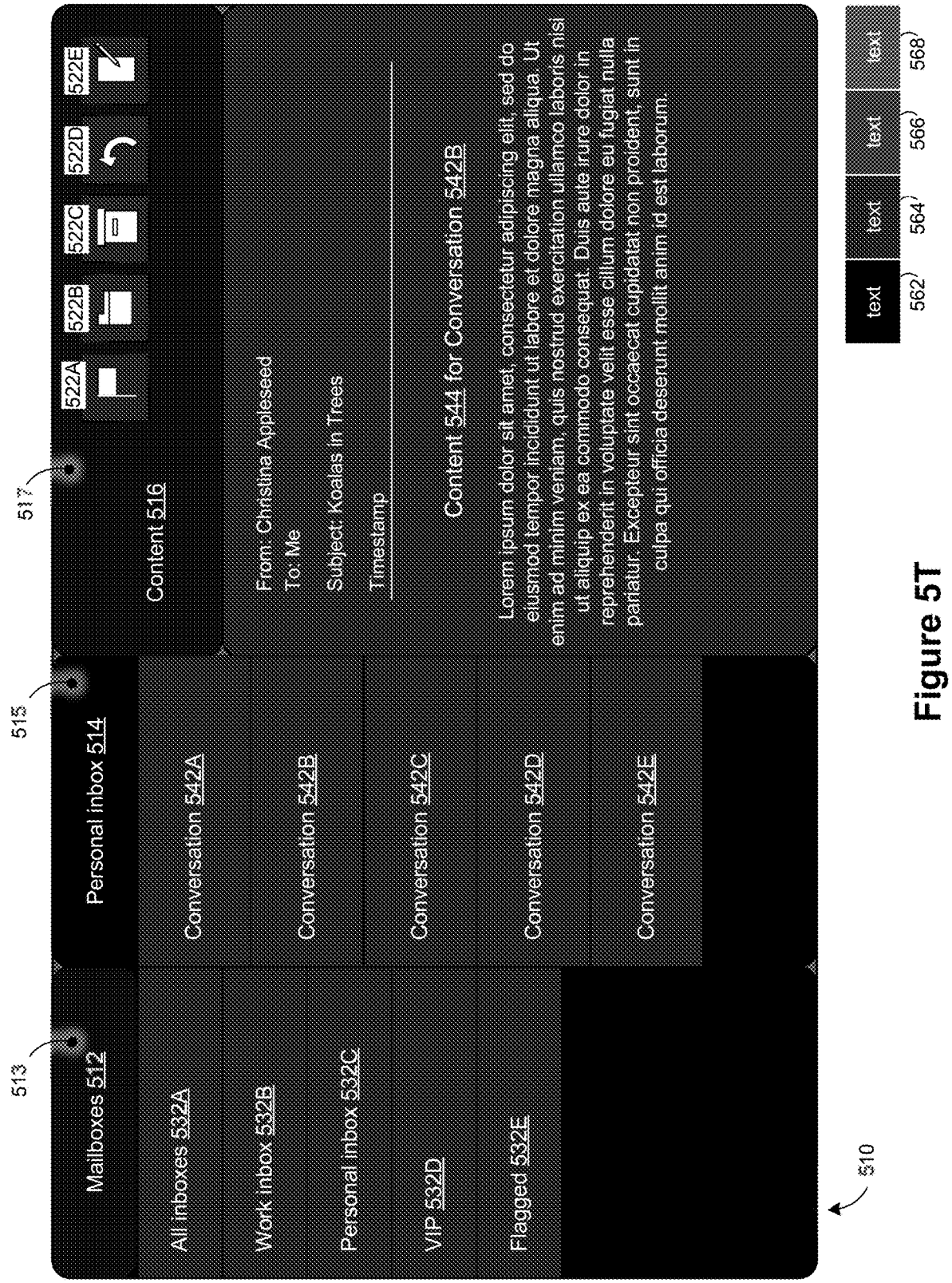

FIGS. 5A-5T illustrate example user interfaces for navigating and manipulating user interfaces displayed according to a dark display mode in accordance with some embodiments. The user interfaces in these figures are used to illustrate the processes described below, including the processes in FIGS. 10A-10E. Although some of the examples which follow will be given with reference to inputs on a touchscreen display (where the touch-sensitive surface and the display are combined), in some embodiments, the device detects inputs on a touch-sensitive surface 451 that is separate from the display 450, as shown in FIG. 4B.

FIGS. 5A and 5B illustrate a sequence in which an example email application window in a full-screen view transitions from a light display mode to a dark display mode in accordance with some embodiments. As shown in FIG. 5A, the electronic device displays an email application window 510 in a full-screen view according to a first display mode (e.g., a light display mode). According to some embodiments, the email application window 510 includes a mailboxes pane 512 associated with a plurality of selectable inboxes, an inbox pane 514 associated with a currently-selected inbox (e.g., the personal inbox), and a content pane 516 associated with a currently-selected conversation and one or more messages therein. According to some embodiments, the mailboxes pane 512 includes a chrome region 513 and selectable inbox affordances 532A, 532B, 532C, 532D, and 532E (sometimes collectively referred to herein as the inbox affordances 532), which, when selected cause the electronic device to display a respective inbox. According to some embodiments, the inbox pane 514 includes a chrome region 515 and selectable conversation affordances 542A, 542B, 542C, 542D, and 534E (sometimes collectively referred to herein as the conversation affordances 542), which, when selected cause the electronic device to display a respective conversation and one or more messages therein. According to some embodiments, the content pane 516 includes a content region 544 associated with a message within a conversation that corresponds to the selectable conversation affordance 542B and a chrome region 517 with action affordances 522A, 522B, 522C, 522D, and 522E (sometimes collectively referred to herein as the action affordances 522). For example, when selected, the action affordance 522E causes the electronic device to display a composition interface for drafting a new message (e.g., as shown in FIGS. 5B and 5C).

As shown in FIG. 5A, while displaying the email application window 510 in the full-screen view according to the first display mode, the electronic device displays the chrome regions 513, 515, and 517 with a set of display properties 552 (e.g., black text with a black and white dotted background fill pattern). As shown in FIG. 5A, while displaying the email application window 510 in the full-screen view according to the first display mode, the electronic device displays the inbox affordances 532, the conversation affordances 542, and the action affordances 522 (or the background thereof) with a set of display properties 554 (e.g., black text with a white background fill).

For example, the electronic device detects a request to transition from the first display mode (e.g., the light display mode) to a second display mode (e.g., a dark display mode). In some embodiments, the request corresponds to a predefined gesture, a voice command, a selection of an affordance from a settings interface, or the like. As one example, the electronic device detects a touch input (e.g., a single or double tap gesture) over the dark mode toggle 6136 shown within the controls user interface 6120 in FIG. 6I.

In response to detecting the request to transition from the first display mode (e.g., the light display mode) to the second display mode (e.g., the dark display mode), the electronic device displays the email application window 510 in the full-screen view according to the second display mode in FIG. 5B. As shown in FIG. 5B, while displaying the email application window 510 in the full-screen view according to the second display mode, the electronic device displays the chrome regions 513, 515, and 517 with a set of display properties 562 (e.g., white text with a 100% black background fill). As shown in FIG. 5B, while displaying the email application window 510 in the full-screen view according to the second display mode, the electronic device displays the inbox affordances 532, the conversation affordances 542, and the action affordances 522 (or the background thereof) with a set of display properties 564 (e.g., white text with an 85% black background fill). One of ordinary skill in the art will appreciate that the sets of display properties 562 and 564 are merely an example and can be replaced with various other color shades or color schemes such as displaying the chrome regions 513, 515, and 517 with a dark background and displaying the inbox affordances 532, the conversation affordances 542, and the action affordances 522 (or the background thereof) with a lighter gray color.

FIGS. 5B and 5C illustrate a sequence in which an example composition interface in a partial-screen view is overlaid on the email application window in the full-screen view as a slide-over pane in accordance with some embodiments. As shown in FIG. 5B, the electronic device detects a touch input 521 (e.g., a single or double tap gesture) at a location that corresponds to the action affordance 522E. In response to detecting the touch input 521 in FIG. 5B, the electronic device displays the composition interface 570 in the partial-screen view overlaid on the email application window 510 in the full-screen view as a slide-over pane in FIG. 5C.

According to some embodiments, the composition interface 570 includes a software keyboard 575, a message input region 574, and a chrome region 573 with action affordances 572A and 572B. As shown in FIG. 5C, while displaying the composition interface 570 in the partial-screen view according to the second display mode, the electronic device displays the chrome region 573 and the software keyboard 575 with a set of display properties 566 (e.g., white text with a 75% black background fill). As shown in FIG. 5C, while displaying the composition interface 570 in the partial-screen view according to the second display mode, the electronic device displays the message input region 574 and the action affordances 572A and 572B (or the background thereof) with a set of display properties 568 (e.g., white text with a 65% black background fill). One of ordinary skill in the art will appreciate that the sets of display properties 566 and 568 are merely an example and can be replaced with various other color shades or color schemes such as displaying the chrome region 573 and the software keyboard 575 with a light gray color and displaying the message input region 574 and the action affordances 572A and 572B (or the background thereof) with a lighter gray color.

FIGS. 5D and 5E illustrate a sequence in which an application dock is overlaid on the email application window in the full-screen view in accordance with some embodiments. As shown in FIG. 5D, the electronic device detects a touch input gesture 523 that corresponds to an upward swipe from a bottom edge of the electronic device. In response to detecting the touch input gesture 523 in FIG. 5D, the electronic device displays the application dock 580 overlaid on the email application window 510 in the full-screen view in FIG. 5E.

According to some embodiments, the application dock 580 includes application icons 582A, 582B, 582C, 582D, and 582E (sometimes collectively referred to herein as the application icons 582), which, when selected causes the electronic device to display an associated application window in a partial-screen or full-screen view. As shown in FIG. 5E, while displaying the application dock 580 according to the second display mode, the electronic device displays the background of the application dock 580 with the set of display properties 566 (e.g., white text with a 75% black background fill). As shown in FIG. 5E, while displaying the application dock 580 according to the second display mode, the electronic device displays the application icons 582 (or the background thereof) with the set of display properties 568 (e.g., white text with a 65% black background fill).

FIGS. 5E-5G illustrate a sequence in which the email application window in the full-screen view is replaced by an example web browser application window in the full-screen view in accordance with some embodiments. As shown in FIG. 5E, the electronic device detects a touch input 527 (e.g., a single or double tap gesture) at a location that corresponds to the application icon 582A associated with a web browser application. In response to detecting the touch input 527 in FIG. 5E, the electronic device displays a transition (e.g., a slide in animation) in FIG. 5F where a web browser application window 590 slides up from a bottom edge of the electronic device. Furthermore, in response to detecting the touch input 527 in FIG. 5E and after the transition in FIG. 5F, the electronic device displays the web browser application window 590 in the full-screen view according to the second display mode in FIG. 5G (without displaying the email application window 510 in the full-screen view).

According to some embodiments, the web browser application window 590 includes a chrome region 593 with an input field 594 that displays a current URL and selectable action affordances 592A, 592B, 592C, 592D, 592E, and 592F (sometimes collectively referred to herein as the action affordances 592). According to some embodiments, the web browser application window 590 also includes a content region 596 with content that corresponds to the current URL (e.g., a web page or the like).

As shown in FIG. 5F, while displaying a portion of the web browser application window 590 during the transition according to the second display mode, the electronic device displays the chrome region 593 with the set of display properties 566 (e.g., white text with a 75% black background fill). As shown in FIG. 5F, while displaying the portion of the web browser application window 590 during the transition according to the second display mode, the electronic device displays the input field 594, the content region 596, and the action affordances 592 (or the background thereof) with the set of display properties 568 (e.g., white text with a 65% black background fill).

As shown in FIG. 5G, while displaying the web browser application window 590 after the transition in the full-screen view according to the second display mode, the electronic device displays the chrome region 593 with the set of display properties 562 (e.g., white text with a 100% black background fill). As shown in FIG. 5G, while displaying the web browser application window 590 after the transition in the full-screen view according to the second display mode, the electronic device displays the input field 594, the content region 596, and the action affordances 592 (or the background thereof) with the set of display properties 564 (e.g., white text with an 85% black background fill).

FIGS. 5H-5K illustrate a sequence in which the web browser application window in the partial-screen view is overlaid on the email application window in the full-screen view as a slide-over pane in accordance with some embodiments. As shown in FIGS. 5H-5J, the electronic device detects a touch input gesture 529 (e.g., a tap and drag gesture) that originates at a location that corresponds to the application icon 582A associated with a web browser application and ends near a center of the display of the electronic device. As shown in FIG. 5I, the electronic device displays a first representation 584 of the application icon 582A while the touch input gesture 529 is within the application dock 580. As shown in FIG. 5J, the electronic device displays a second representation 586 of the application icon 582A while the touch input gesture 529 is outside of the application dock 580. In response to detecting completion of the touch input gesture 529 in FIGS. 5H-5J, the electronic device displays the web browser application window 590 in the partial-screen view (as a slide-over pane) overlaid on the email application window 510 in the full-screen view in FIG. 5K.

As shown in FIG. 5K, while displaying the email application window 510 in the full-screen view according to the second display mode, the electronic device displays the chrome regions 513, 515, and 517 with the set of display properties 562 (e.g., white text with a 100% black background fill). As shown in FIG. 5K, while displaying the email application window 510 in the full-screen view according to the second display mode, the electronic device displays the inbox affordances 532, the conversation affordances 542, and the action affordances 522 (or the background thereof) with the set of display properties 564 (e.g., white text with an 85% black background fill).

As shown in FIG. 5K, while displaying the web browser application window 590 in the partial-screen view according to the second display mode, the electronic device displays the chrome regions 593 and 595 with the set of display properties 566 (e.g., white text with a 75% black background fill). As shown in FIG. 5K, while displaying the web browser application window 590 in the partial-screen view according to the second display mode, the electronic device displays the input field 594, the content region 596, and the action affordances 592 (or the background thereof) with the set of display properties 568 (e.g., white text with a 65% black background fill).

FIGS. 5K and 5L illustrate a sequence in which the email application window transitions from the full-screen view to the partial-screen view such that the email application window and the web browser application window are concurrently displayed in the partial-screen view in accordance with some embodiments. As shown in FIG. 5K, the electronic device detects a touch input gesture 531 that corresponds to an upward swipe towards a top edge of the electronic device that originates at a location that corresponds to a slide-over affordance 533. In response to detecting the touch input gesture 531 in FIG. 5K, the electronic device displays the email application window 510 in the partial-screen view and the web browser application window 590 in the partial-screen view in FIG. 5L. According to some embodiments, as shown in FIG. 5L, the electronic device displays the email application window 510 and the web browser application window 590 in a side-by-side split-screen manner while displaying the email application window 510 in the partial-screen view and the web browser application window 590 in the partial-screen view. According to some embodiments, as shown in FIG. 5L, while displaying the email application window 510 and the web browser application window 590 in the side-by-side split-screen manner, the electronic device displays a divider 598 with a divider affordance 599 between the email application window 510 and the web browser application window 590.

As shown in FIG. 5L, the electronic device displays the background of the divider 598 with the set of display properties 562 (e.g., white text with a 100% black background fill) and the divider affordance 599 with the set of display properties 564 (e.g., white text with an 85% black background fill).

As shown in FIG. 5L, while displaying the email application window 510 in the partial-screen view according to the second display mode, the electronic device displays the chrome regions 513, 515, and 517 with the set of display properties 566 (e.g., white text with a 75% black background fill). As shown in FIG. 5L, while displaying the email application window 510 in the partial-screen view according to the second display mode, the electronic device displays the inbox affordances 532, the conversation affordances 542, and the action affordances 522 (or the background thereof) with the set of display properties 568 (e.g., white text with a 65% black background fill).

As shown in FIG. 5L, while displaying the web browser application window 590 in the partial-screen view according to the second display mode, the electronic device displays the chrome regions 593 and 595 with the set of display properties 566 (e.g., white text with a 75% black background fill). As shown in FIG. 5L, while displaying the web browser application window 590 in the partial-screen view according to the second display mode, the electronic device displays the input field 594, the content region 596, and the action affordances 592 (or the background thereof) with the set of display properties 568 (e.g., white text with a 65% black background fill).

FIGS. 5L and 5M illustrate a sequence in which the email application window transitions from the partial-screen view to the full-screen view such that the web browser application window in the partial-screen view is overlaid on the email application window in the full-screen view as a slide-over pane in accordance with some embodiments. As shown in FIG. 5L, the electronic device detects a touch input gesture 537 that corresponds to a downward swipe that originates at a location that corresponds to the slide-over affordance 533. In response to detecting the touch input gesture 537 in FIG. 5L, the electronic device displays the web browser application window 590 in the partial-screen view (as a slide-over pane) overlaid on the email application window 510 in the full-screen view in FIG. 5M.

As shown in FIG. 5M, while displaying the email application window 510 in the full-screen view according to the second display mode, the electronic device displays the chrome regions 513, 515, and 517 with the set of display properties 562 (e.g., white text with a 100% black background fill). As shown in FIG. 5M, while displaying the email application window 510 in the full-screen view according to the second display mode, the electronic device displays the inbox affordances 532, the conversation affordances 542, and the action affordances 522 (or the background thereof) with the set of display properties 564 (e.g., white text with an 85% black background fill).

As shown in FIG. 5M, while displaying the web browser application window 590 in the partial-screen view according to the second display mode, the electronic device displays the chrome regions 593 and 595 with the set of display properties 566 (e.g., white text with a 75% black background fill). As shown in FIG. 5M, while displaying the web browser application window 590 in the partial-screen view according to the second display mode, the electronic device displays the input field 594, the content region 596, and the action affordances 592 (or the background thereof) with the set of display properties 568 (e.g., white text with a 65% black background fill).

FIGS. 5N-5Q illustrate a sequence in which the email application window transitions from the full-screen view to the partial-screen view such that the email application window and the web browser application window are concurrently displayed in the partial-screen view in accordance with some embodiments. As shown in FIGS. 5N-5P, the electronic device detects a touch input gesture 539 (e.g., a tap and drag gesture) that originates at a location that corresponds to the application icon 582A associated with a web browser application and ends near a right edge of the display of the electronic device. As shown in FIG. 5O, the electronic device displays the first representation 584 of the application icon 582A while the touch input gesture 539 is within the application dock 580. As shown in FIG. 5P, the electronic device displays the second representation 586 of the application icon 582A while the touch input gesture 539 is outside of the application dock 580. In response to detecting completion of the touch input gesture 539 in FIGS. 5N-5P, the electronic device displays the email application window 510 and the web browser application window 590 in the partial-screen view in FIG. 5Q. According to some embodiments, as shown in FIG. 5Q, the electronic device displays the email application window 510 and the web browser application window 590 in the side-by-side split-screen manner while displaying the email application window 510 in the partial-screen view and the web browser application window 590 in the partial-screen view. According to some embodiments, as shown in FIG. 5Q, while displaying the email application window 510 and the web browser application window 590 in the side-by-side split-screen manner, the electronic device displays the divider 598 with the divider affordance 599 between the email application window 510 and the web browser application window 590.

As shown in FIG. 5Q, the electronic device displays the background of the divider 598 with the set of display properties 562 (e.g., white text with a 100% black background fill) and the divider affordance 599 with the set of display properties 564 (e.g., white text with an 85% black background fill).

As shown in FIG. 5Q, while displaying the email application window 510 in the partial-screen view according to the second display mode, the electronic device displays the chrome regions 513, 515, and 517 with the set of display properties 566 (e.g., white text with a 75% black background fill). As shown in FIG. 5Q, while displaying the email application window 510 in the partial-screen view according to the second display mode, the electronic device displays the inbox affordances 532, the conversation affordances 542, and the action affordances 522 (or the background thereof) with the set of display properties 568 (e.g., white text with a 65% black background fill).

As shown in FIG. 5Q, while displaying the web browser application window 590 in the partial-screen view according to the second display mode, the electronic device displays the chrome regions 593 and 595 with the set of display properties 566 (e.g., white text with a 75% black background fill). As shown in FIG. 5Q, while displaying the web browser application window 590 in the partial-screen view according to the second display mode, the electronic device displays the input field 594, the content region 596, and the action affordances 592 (or the background thereof) with the set of display properties 568 (e.g., white text with a 65% black background fill).

FIGS. 5Q and 5R illustrate a sequence in which the composition interface in the partial-screen view is overlaid on the email application window in the partial-screen view while the email application window and the web browser application window are concurrently displayed in the partial-screen view in accordance with some embodiments. As shown in FIG. 5Q, the electronic device detects a touch input 541 (e.g., a single or double tap gesture) at a location that corresponds to the action affordance 522E. In response to detecting the touch input 541 in FIG. 5Q, the electronic device displays the composition interface 570 in the partial-screen view overlaid on the email application window 510 in the partial-screen view as a slide-over pane in FIG. 5R.

As shown in FIG. 5R, while displaying the composition interface 570 in the partial-screen view according to the second display mode, the electronic device displays the chrome regions 573 and the software keyboard 575 with the set of display properties 566 (e.g., white text with a 75% black background fill). As shown in FIG. 5R, while displaying the composition interface 570 in the partial-screen view according to the second display mode, the electronic device displays the message input region 574 and the action affordances 572A and 572B (or the background thereof) with the set of display properties 568 (e.g., white text with a 65% black background fill).

FIGS. 5S and 5T illustrate a sequence in which the email application window transitions from the partial-screen view to the full-screen view such that the web browser application window ceases to be displayed in accordance with some embodiments. As an alternative to the touch input 541 in FIG. 5Q, as shown in FIG. 5S, the electronic device detects a touch input gesture 543 (e.g., a tap and drag gesture) that corresponds to a left-to-right swipe towards a right edge of the display of the electronic device that originates at a location that corresponds to the divider affordance 599. In response to detecting the touch input gesture 543 in FIG. 5S, the electronic device displays the email application window 510 in the full-screen view according to the second display mode in FIG. 5T (without displaying the web browser application window 590 in the partial-screen view).

As shown in FIG. 5T, while displaying the email application window 510 in the full-screen view according to the second display mode, the electronic device displays the chrome regions 513, 515, and 517 with the set of display properties 562 (e.g., white text with a 100% black background fill). As shown in FIG. 5T, while displaying the email application window 510 in the full-screen view according to the second display mode, the electronic device displays the inbox affordances 532, the conversation affordances 542, and the action affordances 522 (or the background thereof) with the set of display properties 564 (e.g., white text with an 85% black background fill).

FIGS. 6A-6I illustrate example user interfaces for navigating and manipulating user interfaces displayed according to a dark display mode in accordance with some embodiments. The user interfaces in these figures are used to illustrate the processes described below, including the processes in FIGS. 10A-10E. Although some of the examples which follow will be given with reference to inputs on a touchscreen display (where the touch-sensitive surface and the display are combined), in some embodiments, the device detects inputs on a touch-sensitive surface 451 that is separate from the display 450, as shown in FIG. 4B.

Figure 6A:
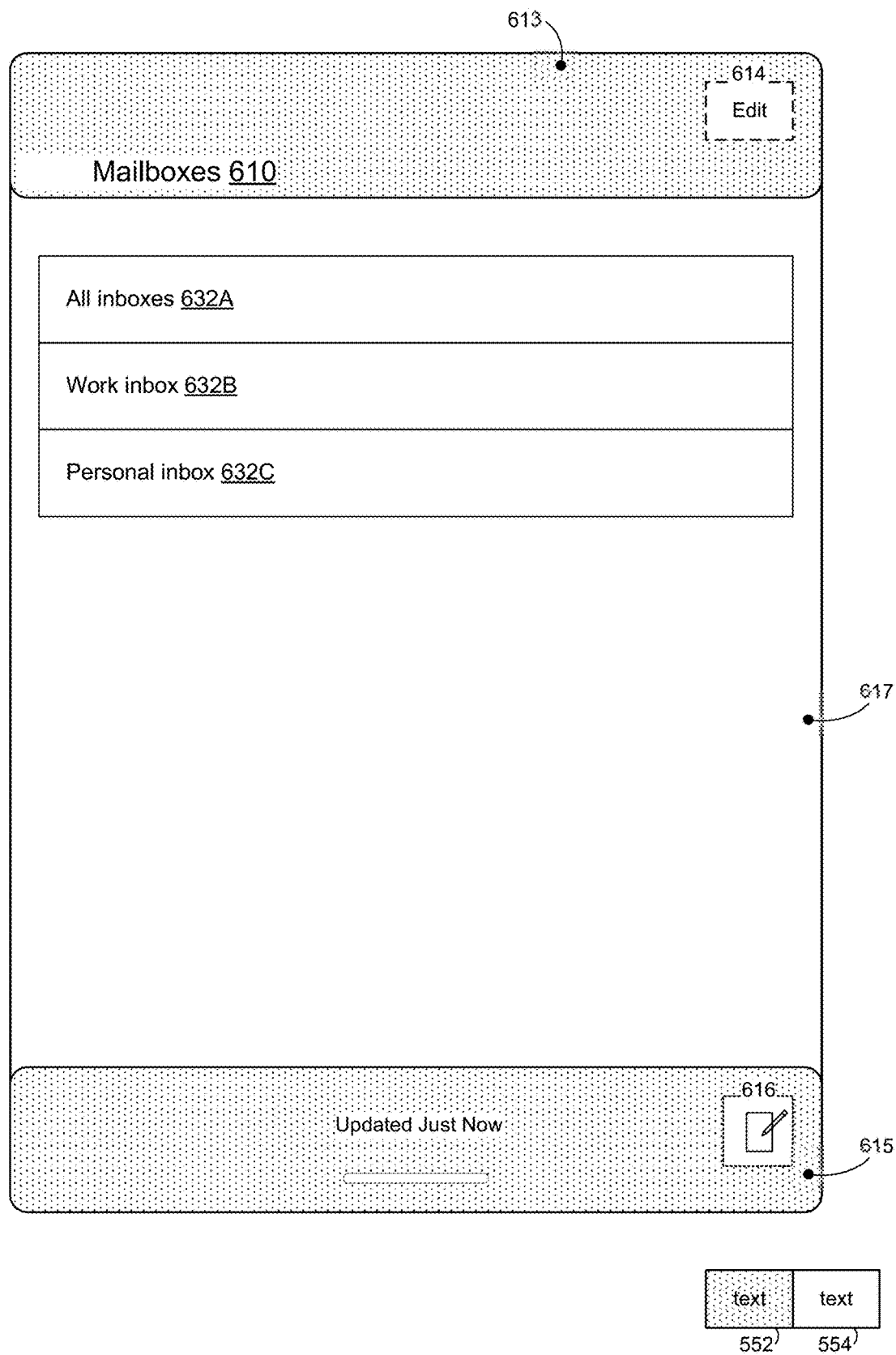
FIGS. 6A-6I illustrate example user interfaces for navigating and manipulating user interfaces displayed according to a dark display mode in accordance with some embodiments.
Figure 6B:
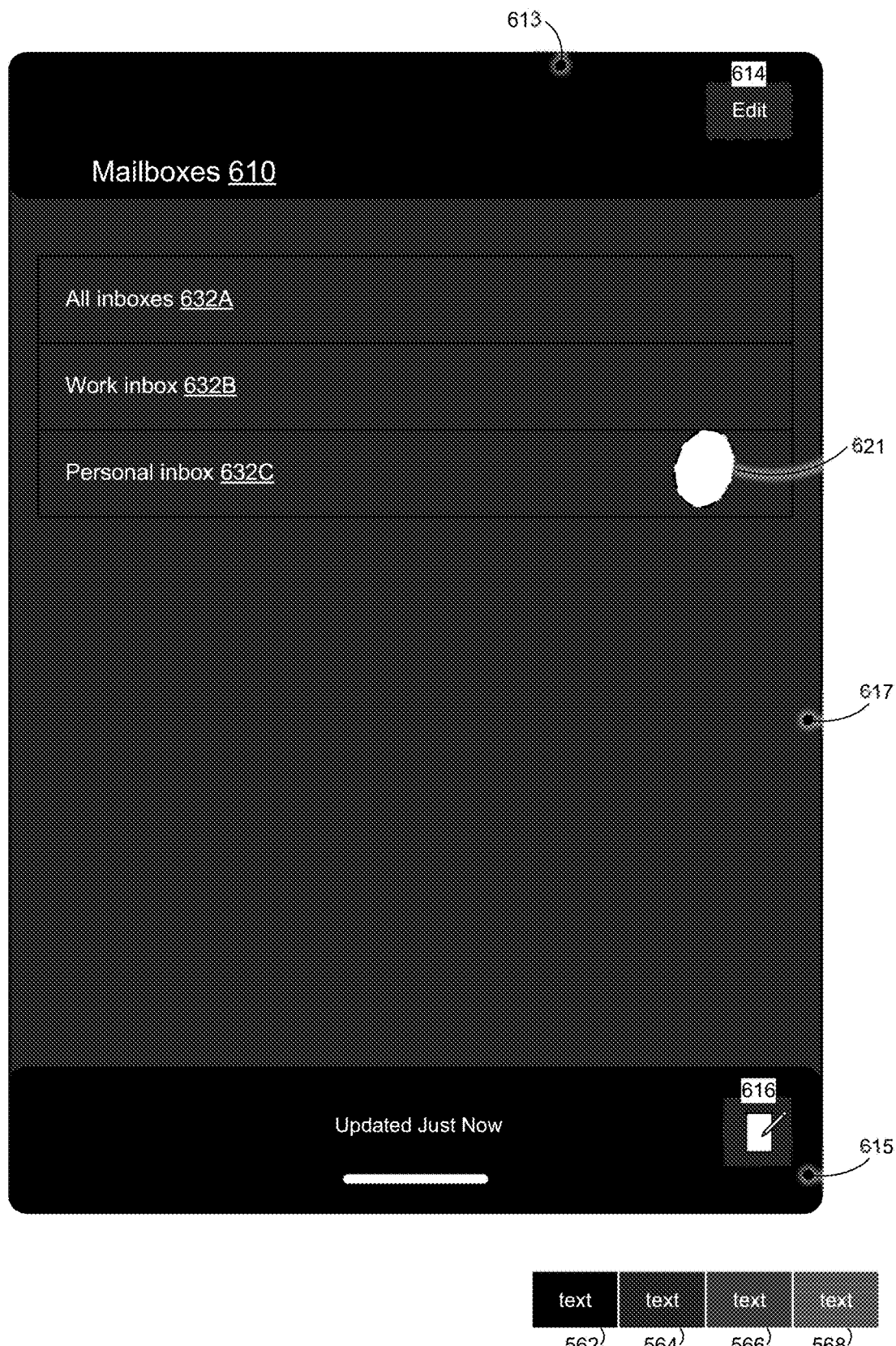

FIGS. 6A and 6B illustrate a sequence in which an example email application window (e.g., the mailboxes pane 610) in a full-screen view transitions from a light display mode to a dark display mode in accordance with some embodiments. As shown in FIG. 6A, the electronic device displays a mailboxes pane 610 associated with an email application in a full-screen view according to a first display mode (e.g., a light display mode). According to some embodiments, the mailboxes pane 610 includes a first chrome region 613 with a selectable action affordance 614 and a second chrome region 615 with a selectable action affordance 616. For example, when selected, the action affordance 616 causes the electronic device to display a composition interface for drafting a new message (e.g., as shown in FIGS. 6E and 6F). According to some embodiments, the mailboxes pane 610 includes a content region 617 with selectable inbox affordance 632A, 632B, and 632C (sometimes collectively referred to herein as the inbox affordances 632), which, when selected cause the electronic device to display a respective inbox.

As shown in FIG. 6A, while displaying the mailboxes pane 610 in the full-screen view according to the first display mode, the electronic device displays the chrome regions 613 and 615 with a set of display properties 552 (e.g., black text with a black and white dotted background fill pattern). As shown in FIG. 6A, while displaying the mailboxes pane 610 in the full-screen view according to the first display mode, the electronic device displays the inbox affordances 632 and the action affordances 614 and 616 (or the background thereof) with a set of display properties 554 (e.g., black text with a white background fill).

For example, the electronic device detects a request to transition from the first display mode (e.g., the light display mode) to a second display mode (e.g., a dark display mode). In some embodiments, the request corresponds to a predefined gesture, a voice command, a selection of an affordance from a settings interface, or the like. As one example, the electronic device detects a touch input (e.g., a single or double tap gesture) over the dark mode toggle 6136 shown within the controls user interface 6120 in FIG. 6I.

In response to detecting the request to transition from the first display mode (e.g., the light display mode) to the second display mode (e.g., the dark display mode), the electronic device displays the mailboxes pane 610 in the full-screen view according to the second display mode in FIG. 6B. As shown in FIG. 6B, while displaying the mailboxes pane 610 in the full-screen view according to the first display mode, the electronic device displays the chrome regions 613 and 615 with a set of display properties 562 (e.g., white text with a 100% black background fill). As shown in FIG. 6B, while displaying the mailboxes pane 610 in the full-screen view according to the first display mode, the electronic device displays the content region 617, the inbox affordances 632, and the action affordances 614 and 616 (or the background thereof) with a set of display properties 564 (e.g., white text with an 85% black background fill).

FIGS. 6B-6E illustrate a sequence in which a first email application window (e.g., the mailboxes pane 610) in the full-screen view is replaced by a second email application window (e.g., the inbox pane 640) in the full-screen view. As shown in FIG. 6B, the electronic device detects a touch input 621 (e.g., a single or double tap gesture) at a location that corresponds to the inbox affordance 632C in accordance with some embodiments. In response to detecting the touch input 621 in FIG. 6B, the electronic device displays a transition (e.g., a slide over animation) in FIGS. 6C and 6D where an inbox pane 640 slides over the mailboxes pane 610 in a right-to-left direction from a right edge of the electronic device. Furthermore, in response to detecting the touch input 621 in FIG. 6B and after the transition in FIGS. 6C and 6D, the electronic device displays the inbox pane 640 in the full-screen view according to the second display mode in FIG. 6E (without displaying the mailboxes pane 610 in the full-screen view).

According to some embodiments, the inbox pane 640 includes a first chrome region 643 with a search input field 644 and selectable action affordances 614 and 646. According to some embodiments, the inbox pane 640 also includes a second chrome region 651 with selectable action affordance 616 and 653. For example, when selected, the action affordance 616 causes the electronic device to display a composition interface for drafting a new message (e.g., as shown in FIGS. 6E and 6F). According to some embodiments, the inbox pane 640 further includes a content region 645 with selectable conversation affordances 642A, 642B, 642C, 642D, and 642E (sometimes collectively referred to herein as the conversation affordances 642), which, when selected cause the electronic device to display a respective conversation and one or more messages therein.

Figure 6C:
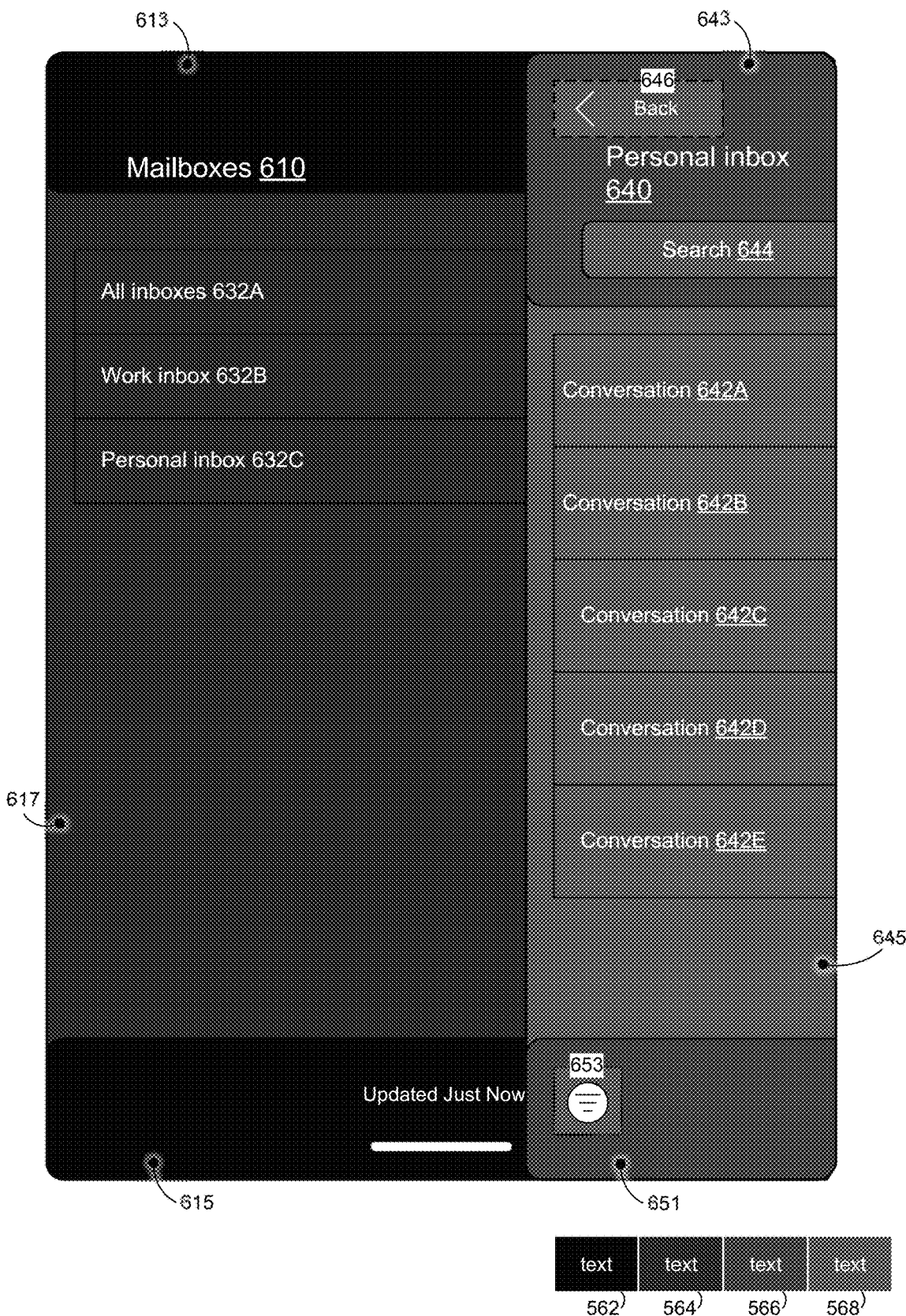

As shown in FIG. 6C, while displaying a portion of the inbox pane 640 during the transition according to the second display mode, the electronic device displays the chrome regions 643 and 651 with the set of display properties 566 (e.g., white text with a 75% black background fill). As shown in FIG. 6C, while displaying the portion of the inbox pane 640 during the transition according to the second display mode, the electronic device displays the search input field 644, the content region 645, the action affordances 646 and 653, and the conversation affordances 642 (or the background thereof) with the set of display properties 568 (e.g., white text with a 65% black background fill).

Figure 6D:
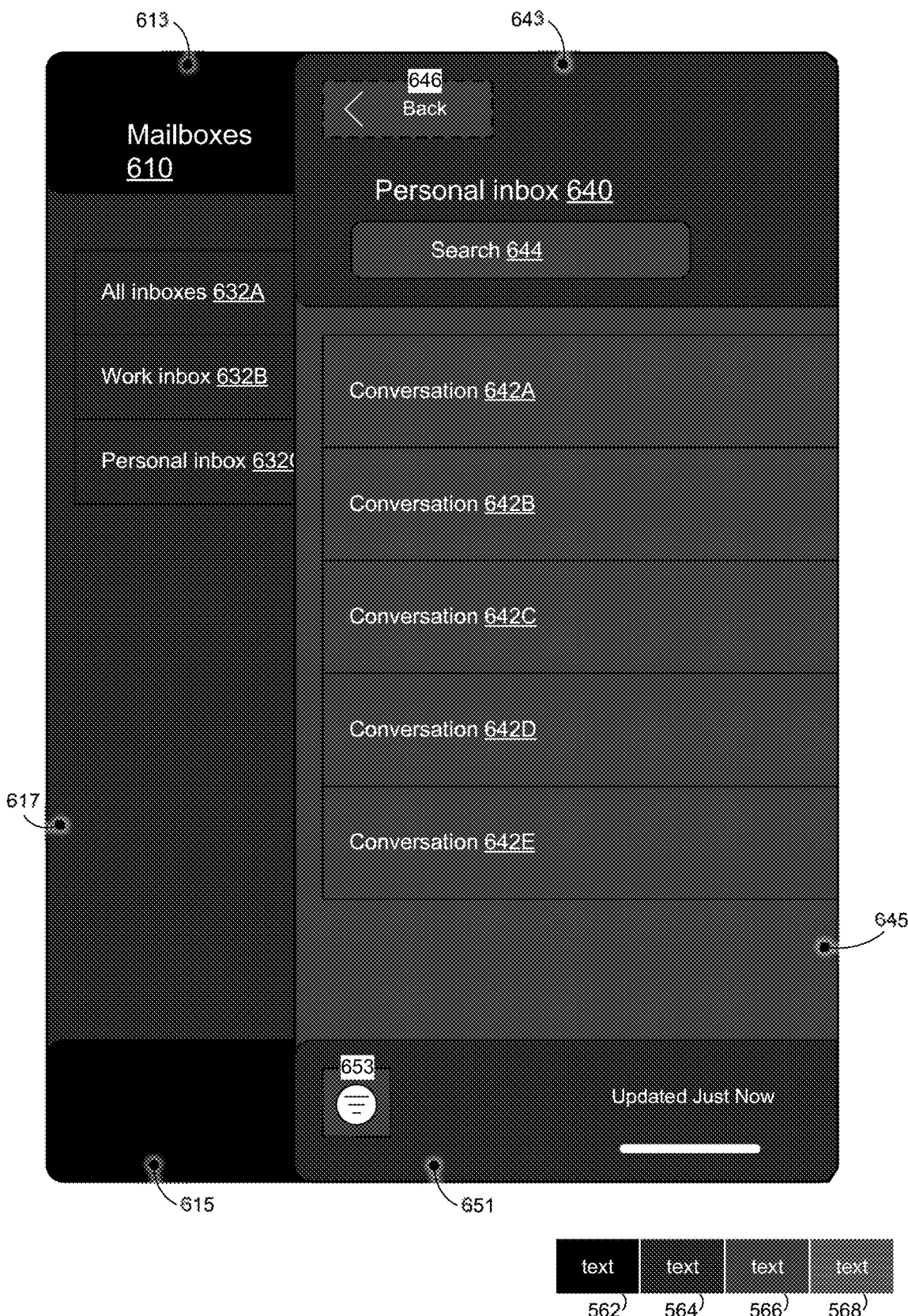
Figure 6E:
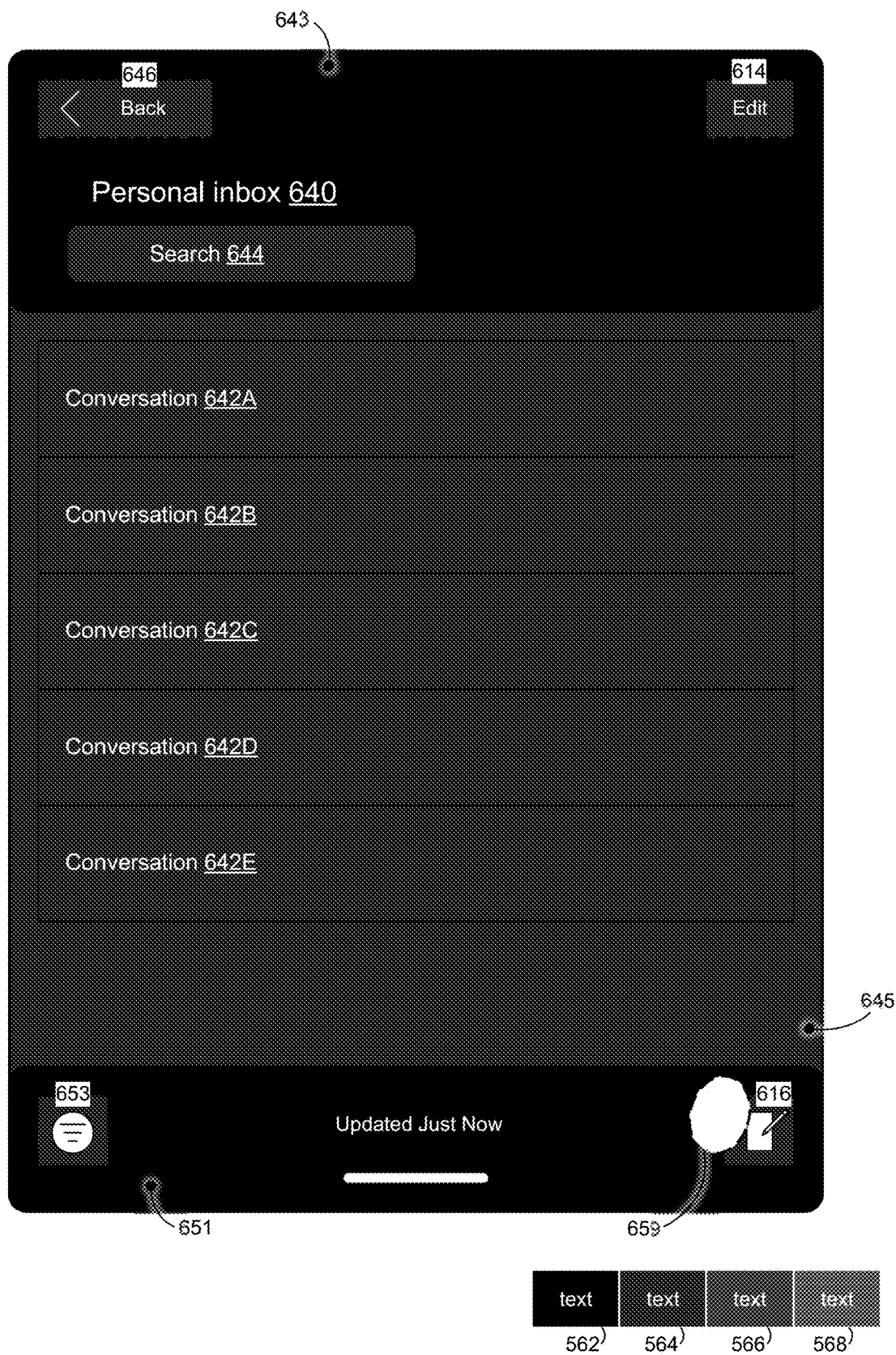
Figure 6F:
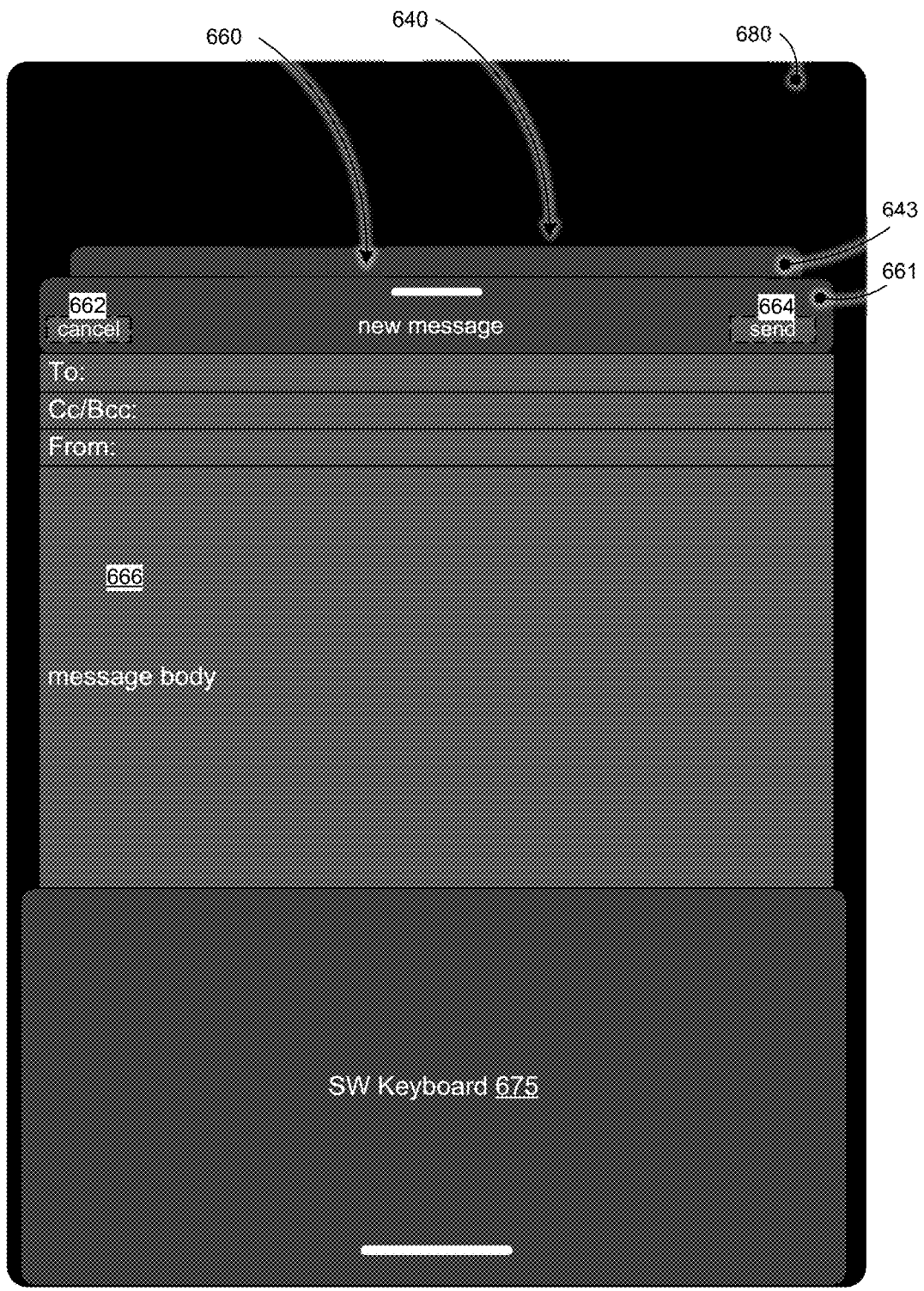
Figure 6F:
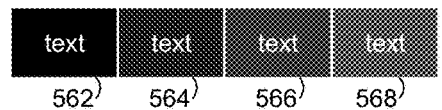

As shown in FIG. 6D, while displaying the portion of the inbox pane 640 during the transition according to the second display mode, the electronic device displays the chrome regions 643 and 651 with the set of display properties 564 (e.g., white text with an 85% black background fill). As shown in FIG. 6D, while displaying the portion of the inbox pane 640 during the transition according to the second display mode, the electronic device displays the search input field 644, the content region 645, the action affordances 646 and 653, and the conversation affordances 642 (or the background thereof) with the set of display properties 566 (e.g., white text with a 75% black background fill).

As shown in FIGS. 6C and 6D, while displaying a portion of the mailboxes pane 610 during the transition according to the second display mode, the electronic device displays the chrome regions 613 and 615 with the set of display properties 562 (e.g., white text with a 100% black background fill). As shown in FIGS. 6C and 6D, while displaying the portion of the mailboxes pane 610 during the transition according to the second display mode, the electronic device displays the content region 617 and the inbox affordances 632 with the set of display properties 564 (e.g., white text with an 85% black background fill).

As shown in FIG. 6E, while displaying the inbox pane 640 after the transition in the full-screen view according to the second display mode, the electronic device displays the chrome regions 643 and 651 with the set of display properties 562 (e.g., white text with a 100% black background fill). As shown in FIG. 6E, while displaying the inbox pane 640 after the transition in the full-screen view according to the second display mode, the electronic device displays the search input field 644, the content region 645, the action affordances 614, 616, 646, and 653, and the conversation affordances 642 (or the background thereof) with the set of display properties 564 (e.g., white text with an 85% black background fill).

FIGS. 6E and 6F illustrate a sequence in which an example composition interface (e.g., the composition pane 660) in a partial-screen view is overlaid on the second email application window (e.g., the inbox pane 640) in the partial-screen view in accordance with some embodiments. As shown in FIG. 6E, the electronic device detects a touch input 659 (e.g., a single or double tap gesture) at a location that corresponds to the action affordance 616. In response to detecting the touch input 659 in FIG. 6E, the electronic device displays the composition pane 660 in the partial-screen view overlaid on the inbox pane 640 in the partial-screen view in FIG. 6F.

According to some embodiments, the composition pane 660 includes a software keyboard 675, a message input region 666, and a chrome region 661 with action affordances 662 and 664. As shown in FIG. 6F, while displaying the composition pane 660 in the partial-screen view according to the second display mode, the electronic device displays the chrome region 661 and the software keyboard 675 with the set of display properties 566 (e.g., white text with a 75% black background fill). As shown in FIG. 6F, while displaying the composition pane 660 in the partial-screen view according to the second display mode, the electronic device displays the message input region 666 and the action affordances 662 and 664 (or the background thereof) with a set of display properties 568 (e.g., white text with a 65% black background fill).

As shown in FIG. 6F, while displaying the inbox pane 640 in the partial-screen view according to the second display mode, the electronic device displays the first chrome region 643 with the set of display properties 566 (e.g., white text with a 75% black background fill). According to some embodiments, while displaying the composition pane 660 in the partial-screen view overlaid on the inbox pane 640 in the partial-screen view, the electronic device displays a background region 680 under the inbox pane 640 and the composition pane 660. As shown in FIG. 6F, the electronic device displays the background region 680 with the set of display properties 562 (e.g., white text with a 100% black background fill).

Figure 6G:
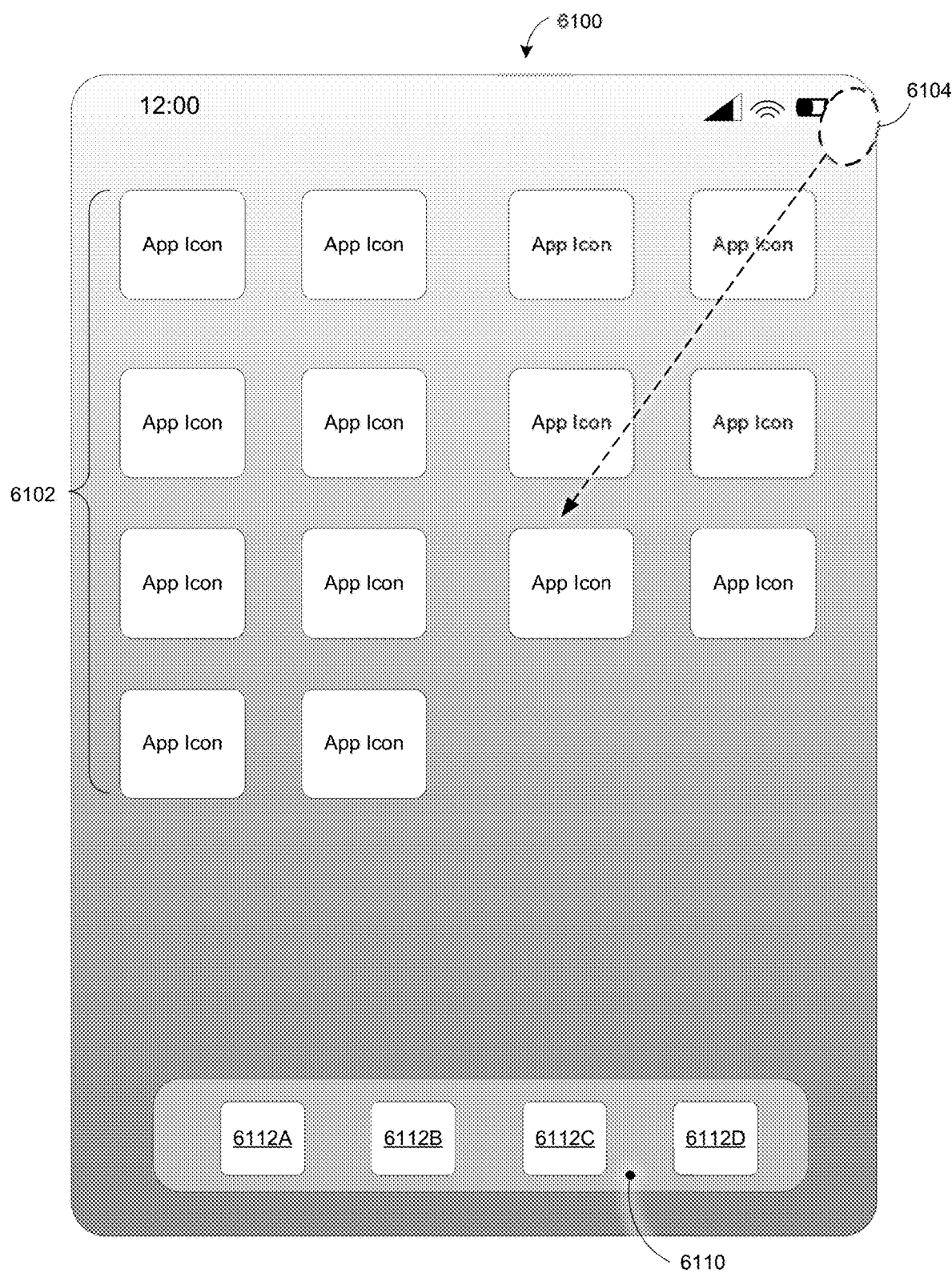
Figure 6H:
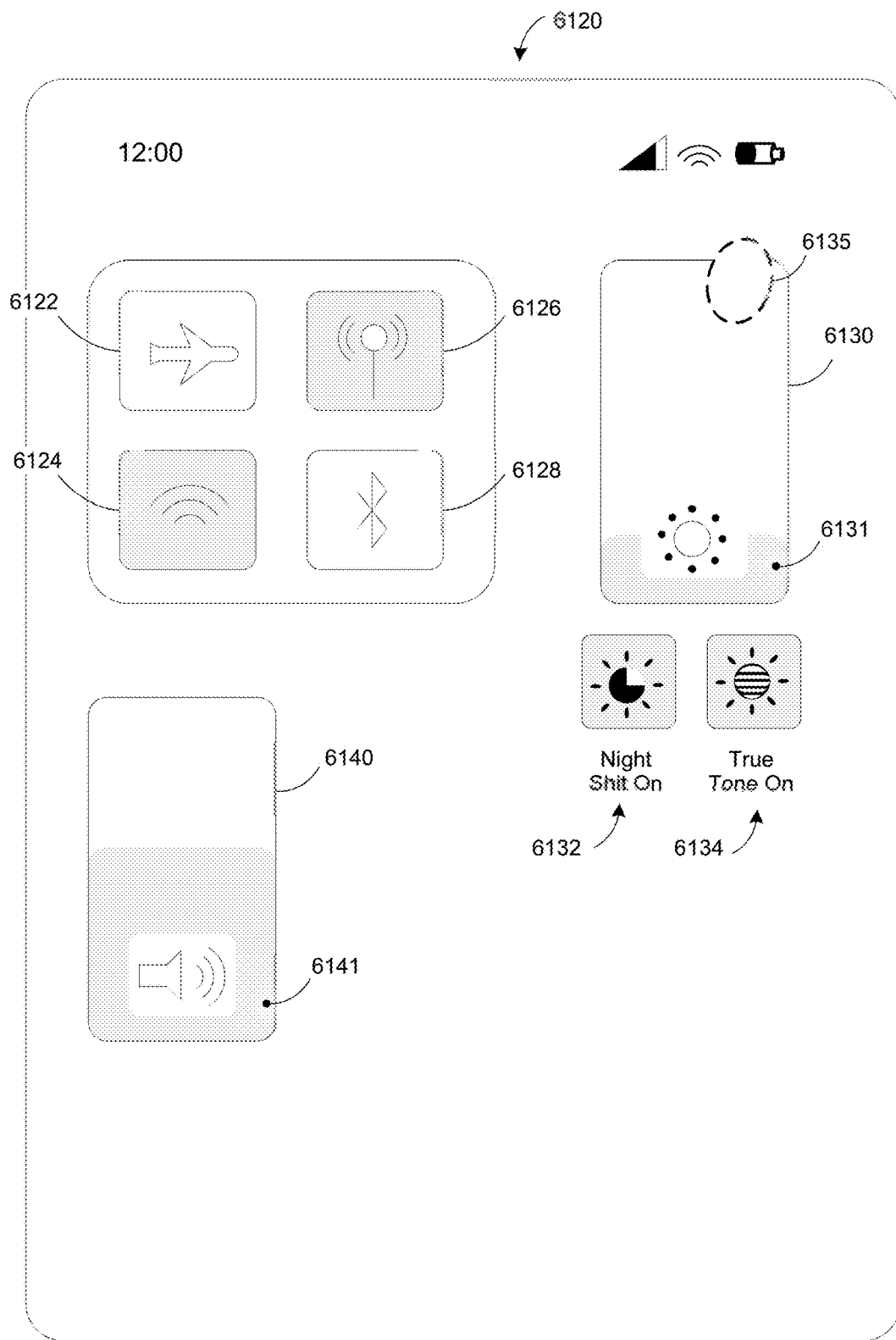
Figure 6I:
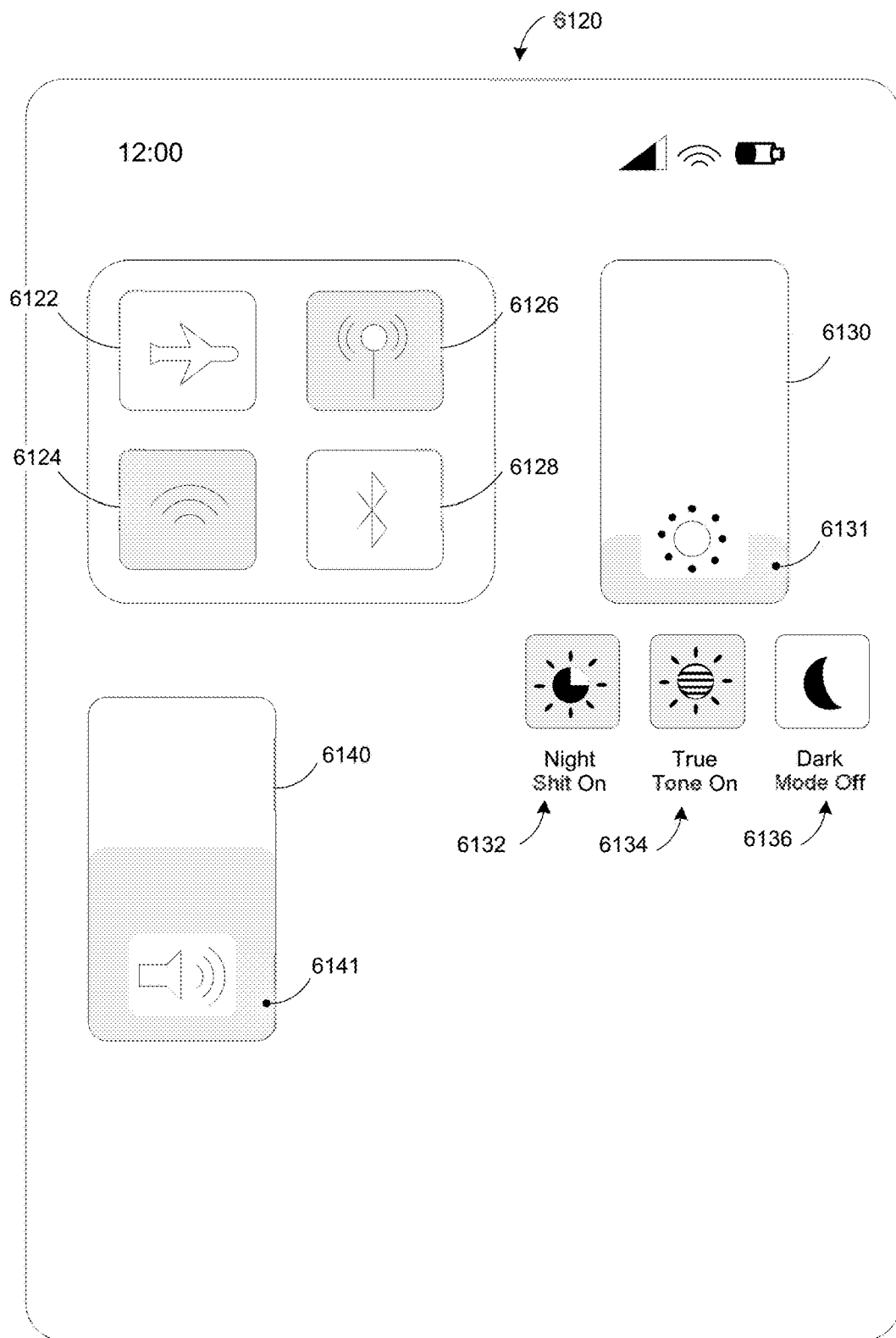

FIGS. 6G-6I illustrate a sequence in which a dark mode toggle is added to a controls user interface in accordance with some embodiments. As shown in FIG. 6G, the electronic device displays a home screen user interface 6100. The home screen user interface 6100 includes a plurality of selectable application icons 6102 and a dock region 6110 with selectable application icons 6112A, 6112B, 6112C, and 6112D.

As shown in FIG. 6G, the electronic device detects a touch input gesture 6104 corresponding to a tap-and-drag gesture in a downward diagonal direction that originates nearby an upper corner of the electronic device. In response to detecting the touch input gesture 6104 in FIG. 6G, the electronic device displays a controls user interface 6120 in FIG. 6H. One of ordinary skill in the art that other touch input gestures may cause the transition from the home screen user interface 6100 to the controls user interface 6120 in various other embodiments such as an upward swipe gesture originating nearby a bottom edge of the electronic device, a downward swipe gesture originating nearby a top edge of the electronic device, or the like.

As shown in FIG. 6H, in some embodiments, the controls user interface 6120 includes an airplane mode toggle 6122, a Wi-Fi radio toggle 6124, a cellular radio toggle 6126, and a BLUETOOTH radio toggle 6128. In response to a selection input (e.g., a single or double tap gesture) over any of the toggles 6122, 6124, 6126, and 6128, the electronic device changes the state (e.g., on or off) of the function associated with the toggles 6122, 6124, 6126, and 6128. For example, in FIG. 6H, the airplane mode toggle 6122 and the BLUETOOTH radio toggle 6128 are in an "off" state as indicated by the white background fill therefor. For example, in FIG. 6H, the Wi-Fi radio toggle 6124 and the cellular radio toggle 6126 are in an "on" state as indicated by the gray background fill therefor.

As shown in FIG. 6H, in some embodiments, the controls user interface 6120 also includes a screen brightness slider 6130 with a current value indicator 6131. In response to an increase input (e.g., an upward tap-and-drag gesture) over the screen brightness slider 6130, the electronic device increases the screen brightness according to the magnitude of the increase input. In response to a decrease input (e.g., a downward tap-and-drag gesture) over the screen brightness slider 6130, the electronic device decreases the screen brightness according to the magnitude of the decrease input.

As shown in FIG. 6H, in some embodiments, the controls user interface 6120 also includes a night shift toggle 6132 and a true tone toggle 6134. In response to a selection input (e.g., a single or double tap gesture) over the toggles 6132 and 6134, the electronic device changes the state (e.g., on or off) of the function associated with the toggles 6132 and 6134. For example, in FIG. 6H, the night shift toggle 6132 and the true tone toggle 6134 are in an "on" state as indicated by the gray background fill therefor and the associated text.

As shown in FIG. 6H, in some embodiments, the controls user interface 6120 further includes a volume slider 6140 with a current value indicator 6141. In response to an increase input (e.g., an upward tap-and-drag gesture) over the volume slider 6140, the electronic device increases the volume according to the magnitude of the increase input. In response to a decrease input (e.g., a downward tap-and-drag gesture) over the volume slider 6140, the electronic device decreases the volume according to the magnitude of the decrease input.

As shown in FIG. 6H, the electronic device detects a touch input gesture 6135 (e.g., a long press gesture, tap-and-hold gesture, deep press gesture, or the like) at a location that corresponds to the screen brightness slider 6130. In response to detecting the touch input gesture 6135 in FIG. 6H, the electronic device displays a dark mode toggle 6136 within the controls user interface 6120 in FIG. 6I. In response to a selection input (e.g., a single or double tap gesture) over the dark mode toggle 6136, the electronic device changes the state (e.g., on or off) of the function associated with the dark mode toggle 6136. For example, in FIG. 6I, the dark mode toggle 6136 is in an "off" state as indicated by the white background fill therefor and the associated text. One of ordinary skill in the art that other touch input gestures may cause the dark mode toggle 6136 to be displayed within the controls user interface 6120 in various other embodiments.

Figure 7:
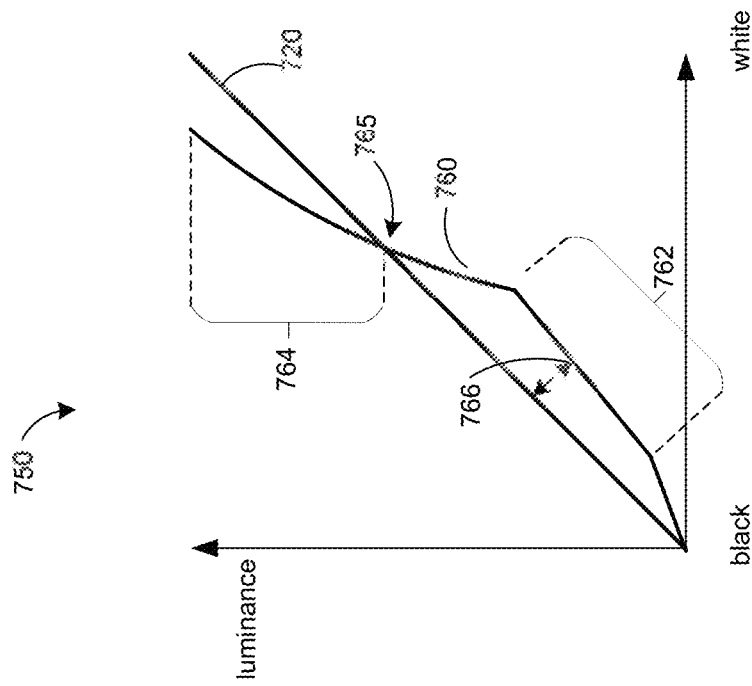
FIG. 7 illustrates example graphical representations of an appearance function for user interface overlay elements in accordance with some embodiments.
Figure 7:
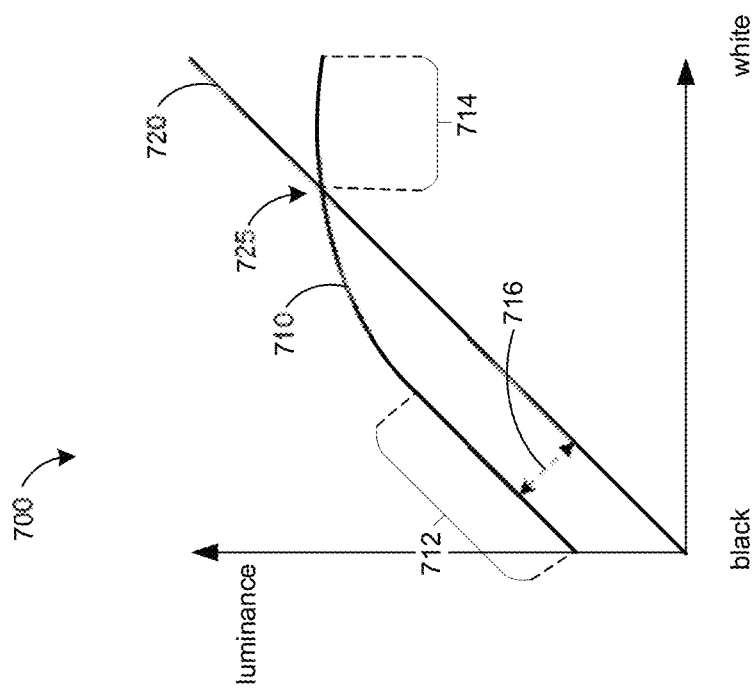

FIG. 7 illustrates example graphical representations of an appearance function for user interface (UI) overlay elements in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 7, a first graphical representation 700 includes an x-axis that corresponds to a grayscale range of colors or hues from pure black to pure white and a y-axis that corresponds to increasing luminance values. As shown in FIG. 7, according to some embodiments, an appearance function 710 for UI overlay elements and an appearance function 720 for background content are plotted on the first graphical representation 700.

According to some embodiments, the appearance function 720 for background content corresponds to a linear curve with a slope of 1. According to some embodiments, a crossover value 725 corresponds to an intersection between the appearance function 710 for UI overlay elements and the appearance function 720 for background content.

According to some embodiments, the appearance function 710 for UI overlay elements corresponds to a non-linear curve that includes a first range of values 712 (e.g., luminance or brightness values) and a second range of values 714 (e.g., luminance or brightness values). In some embodiments, there is a threshold amount of difference 716 between the first range of values 712 associated with the appearance function 710 for UI overlay elements and corresponding values associated with the appearance function 720 for background content (e.g., based on the x-axis of the graphical representations 700).

As shown in FIG. 7, with reference to the first graphical representation 700, the first range of values 712 is lighter than a corresponding first range of corresponding values associated with the appearance function 720 for background content, and the second range of values 714 is darker than a second range of corresponding values associated with the appearance function 720 for background content. As will be appreciated by one of ordinary skill in the art, the appearance function 710 for UI overlay elements is an example non-linear function that may be replaced or modified in order to achieve the desired contrast, brightness, or the like when overlaid on background content (e.g., lighter than the background content prior to the crossover value 725, then darker than the background content after to the crossover value 725).

Similarly, as shown in FIG. 7, a second graphical representation 750 includes an x-axis that corresponds to a grayscale range of colors or hues from pure black to pure white and a y-axis that corresponds to increasing luminance values. As shown in FIG. 7, according to some embodiments, an appearance function 760 for UI overlay elements and an appearance function 720 for background content are plotted on the second graphical representation 750.

According to some embodiments, the appearance function 720 for background content corresponds to a linear curve with a slope of 1. According to some embodiments, a crossover value 765 corresponds to an intersection between the appearance function 710 for UI overlay elements and the appearance function 720 for background content.

According to some embodiments, the appearance function 760 for UI overlay elements corresponds to a non-linear curve that includes a first range of values 762 (e.g., luminance or brightness values) and a second range of values 764 (e.g., luminance or brightness values). In some embodiments, there is a threshold amount of difference 766 between the first range of values 762 associated with the appearance function 760 for UI overlay elements and corresponding values associated with the appearance function 720 for background content (e.g., based on the x-axis of the graphical representations 700).

As shown in FIG. 7, with reference to the second graphical representation 750, the first range of values 762 is darker than a corresponding first range of corresponding values associated with the appearance function 720 for background content, and the second range of values 764 is lighter than a second range of corresponding values associated with the appearance function 720 for background content. As will be appreciated by one of ordinary skill in the art, the appearance function 760 for UI overlay elements is an example non-linear function that may be replaced or modified in order to achieve the desired contrast, brightness, or the like when overlaid on background content (e.g., darker than the background content prior to the crossover value 765, then lighter than the background content after to the crossover value 765).

Figure 8A:
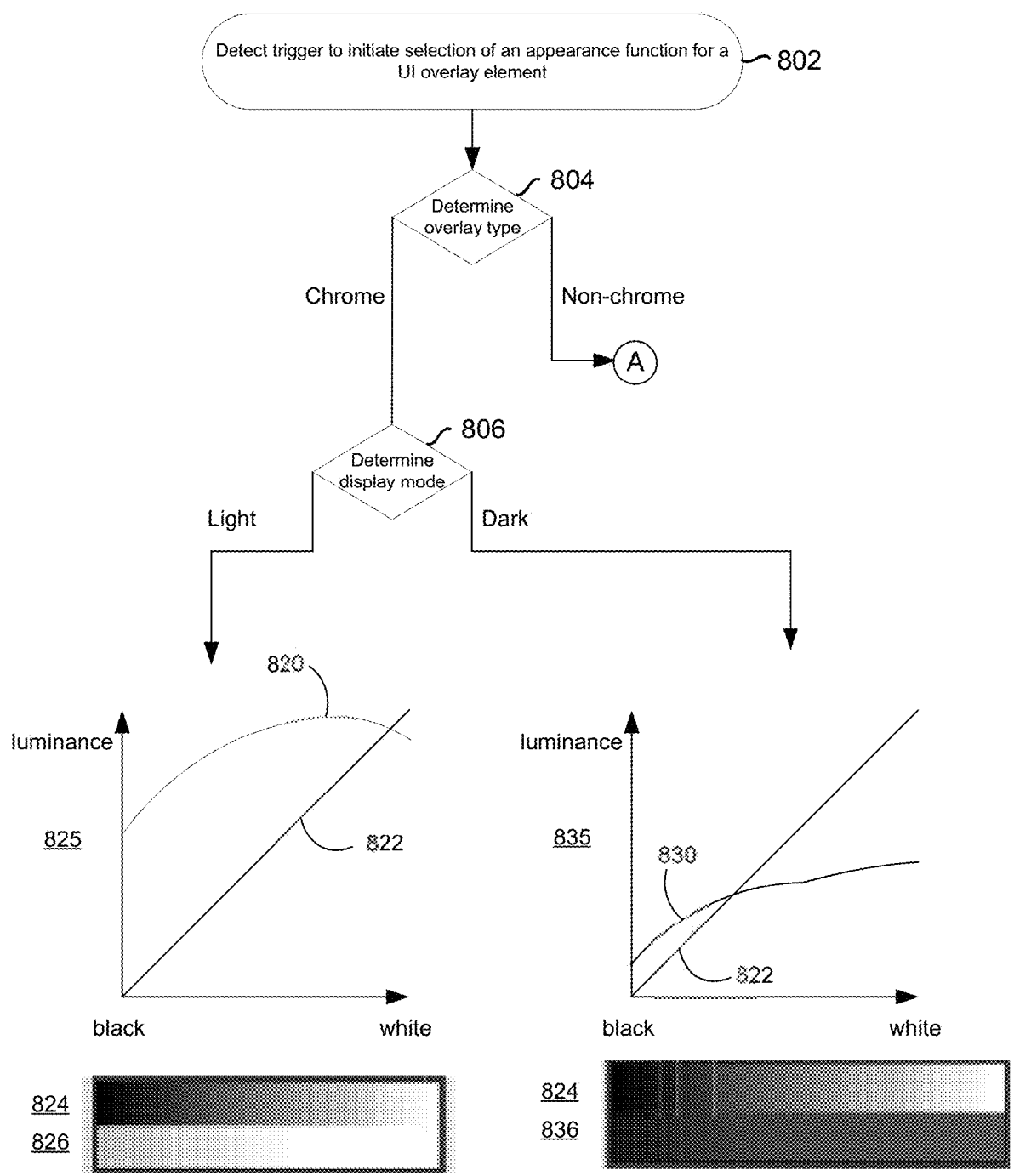
FIGS. 8A-8C illustrate a flow diagram of a method of selecting an appearance function for a user interface overlay element in accordance with some embodiments.
Figure 8B:
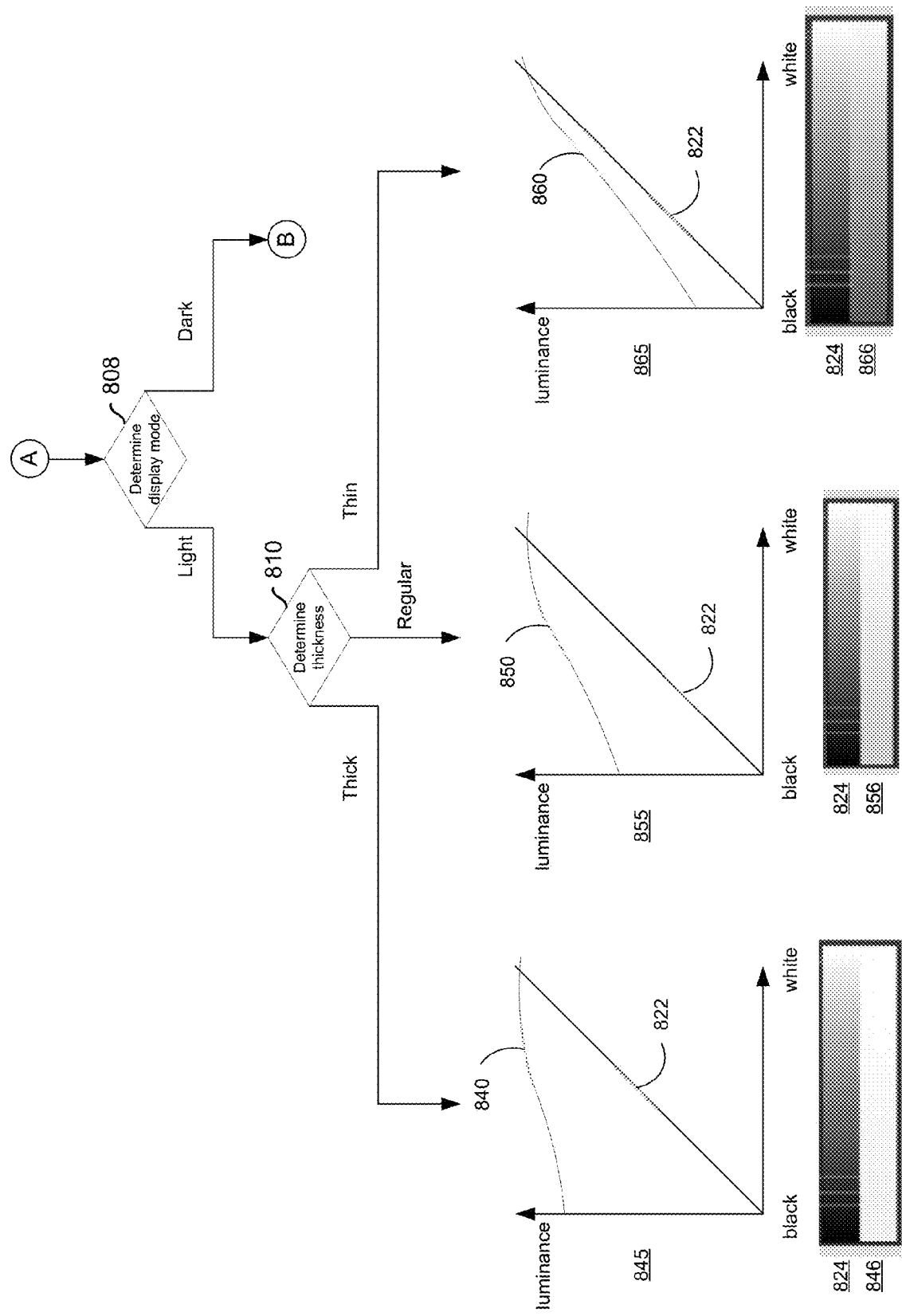
Figure 8C:
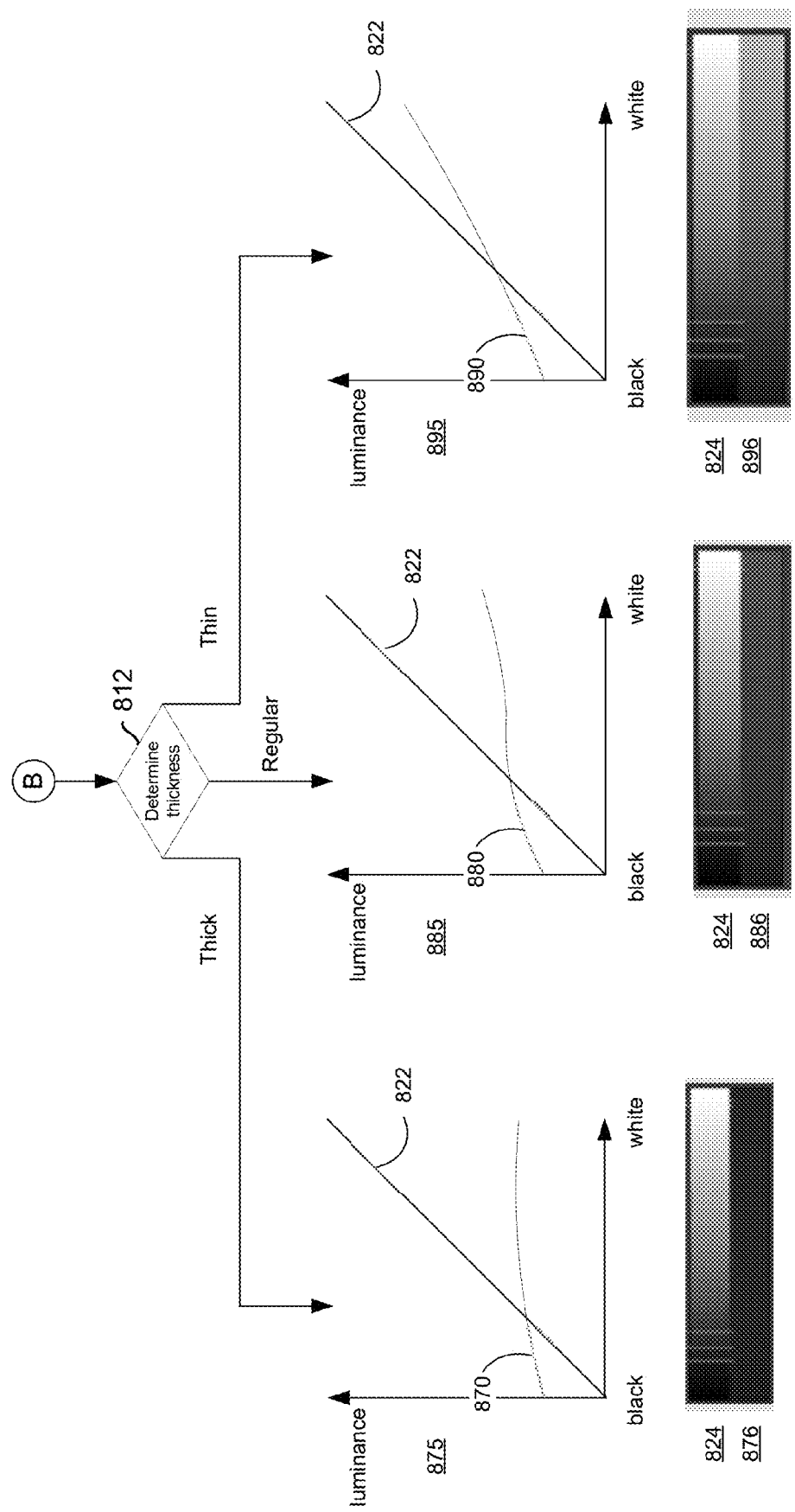

FIGS. 8A-8C illustrate a flow diagram of a method 800 of selecting an appearance function for a user interface (UI) overlay element in accordance with some embodiments. The method 800 is performed at an electronic device (e.g., the portable multifunction device 100 in FIG. 1A, or the device 300 in FIG. 3) with one or more processors, non-transitory memory, a display, and an input device. In some embodiments, the display is a touchscreen display and the input device is on or integrated with the display. In some embodiments, the display is separate from the input device. Some operations in method 800 are, optionally, combined and/or the order of some operations is, optionally, changed.

The electronic device detects (802) a trigger to initiate selection of an appearance function for a UI overlay element. For example, the trigger corresponds to a request to display an application window with one or more user interface overlay elements, a user interface overlay element, or the like.

The electronic device determines (804) whether the UI overlay element corresponds to a chrome type component or a non-chrome type component. In some embodiments, the chrome type components correspond to one of icon bar, a title bar, a scroll bar, chrome region, or the like. In some embodiments, the non-chrome type components correspond to one of one of a composition window, a share sheet, a slide-over pane, a slide-up pane, a quick action window, a preview window, or the like. If the UI overlay element corresponds to the chrome type component, the method 800 continues to block 806. If the UI overlay element corresponds to the non-chrome type component, the method 800 continues to block 808.

The electronic device determines (806) whether the electronic device is operating in a light display mode or a dark display mode.

If the electronic device is operating in the light display mode and the UI overlay element corresponds to the chrome type component, the electronic device displays the UI overlay element according to an appearance function 820. As shown in FIG. 8A, the appearance function 820 for UI overlay elements and an appearance function 822 for background content are plotted on a graph 825 that includes an x-axis that corresponds to a grayscale range of colors or hues from pure black to pure white and a y-axis that corresponds to increasing luminance values. Furthermore, FIG. 8A illustrates a grayscale representation 824 of the appearance function 822, and a grayscale representation 826 of the appearance function 820. One of ordinary skill in the art will appreciate that the appearance function 820 is an example appearance function that may be modified in various other embodiments.

If the electronic device is operating in the dark display mode and the UI overlay element corresponds to the chrome type component, the electronic device displays the UI overlay element according to an appearance function 830. As shown in FIG. 8A, the appearance function 830 for UI overlay elements and the appearance function 822 for background content are plotted on a graph 835 that includes the x-axis that corresponds to a grayscale range of colors or hues from pure black to pure white and the y-axis that corresponds to increasing luminance values. Furthermore, FIG. 8A illustrates the grayscale representation 824 of the appearance function 822, and a grayscale representation 836 of the appearance function 830. One of ordinary skill in the art will appreciate that the appearance function 830 is an example appearance function that may be modified in various other embodiments.

The electronic device determines (808) whether the electronic device is operating in a light display mode or a dark display mode. If the electronic device is operating in the light display mode and the UI overlay element corresponds to the non-chrome type component, the electronic device determines (810) a thickness value associated with the UI overlay element. According to some embodiments, the thickness value represents or emulates a material associated with the UI overlay element. For example, a high thickness value may correspond to an opaque material such as wood, masonry, metal, or the like. For example, a medium thickness value may correspond to a semi-opaque material such as plastic or the like. For example, a low thickness value may correspond to a semi-transparent material such as glass, screening, or the like.

If the electronic device is operating in the light display mode and the UI overlay element corresponds to the non-chrome type component with a first thickness value (e.g., thick), the electronic device displays the UI overlay element according to an appearance function 840. As shown in FIG. 8B, the appearance function 840 for UI overlay elements and the appearance function 822 for background content are plotted on a graph 845 that includes the x-axis that corresponds to a grayscale range of colors or hues from pure black to pure white and the y-axis that corresponds to increasing luminance values. Furthermore, FIG. 8B illustrates the grayscale representation 824 of the appearance function 822, and a grayscale representation 846 of the appearance function 840. One of ordinary skill in the art will appreciate that the appearance function 840 is an example appearance function that may be modified in various other embodiments.

If the electronic device is operating in the light display mode and the UI overlay element corresponds to the non-chrome type component with a second thickness value (e.g., regular), the electronic device displays the UI overlay element according to an appearance function 850. As shown in FIG. 8B, the appearance function 850 for UI overlay elements and the appearance function 822 for background content are plotted on a graph 855 that includes the x-axis that corresponds to a grayscale range of colors or hues from pure black to pure white and the y-axis that corresponds to increasing luminance values. Furthermore, FIG. 8B illustrates the grayscale representation 824 of the appearance function 822, and a grayscale representation 856 of the appearance function 850. One of ordinary skill in the art will appreciate that the appearance function 850 is an example appearance function that may be modified in various other embodiments.

If the electronic device is operating in the light display mode and the UI overlay element corresponds to the non-chrome type component with a second thickness value (e.g., regular), the electronic device displays the UI overlay element according to an appearance function 860. As shown in FIG. 8B, the appearance function 860 for UI overlay elements and the appearance function 822 for background content are plotted on a graph 865 that includes the x-axis that corresponds to a grayscale range of colors or hues from pure black to pure white and the y-axis that corresponds to increasing luminance values. Furthermore, FIG. 8B illustrates the grayscale representation 824 of the appearance function 822, and a grayscale representation 866 of the appearance function 860. One of ordinary skill in the art will appreciate that the appearance function 860 is an example appearance function that may be modified in various other embodiments.

If the electronic device is operating in the dark display mode and the UI overlay element corresponds to the non-chrome type component, the electronic device determines (812) a thickness value associated with the UI overlay element.

If the electronic device is operating in the dark display mode and the UI overlay element corresponds to the non-chrome type component with a first thickness value (e.g., thick), the electronic device displays the UI overlay element according to an appearance function 870. As shown in FIG. 8C, the appearance function 870 for UI overlay elements and the appearance function 822 for background content are plotted on a graph 875 that includes the x-axis that corresponds to a grayscale range of colors or hues from pure black to pure white and the y-axis that corresponds to increasing luminance values. Furthermore, FIG. 8C illustrates the grayscale representation 824 of the appearance function 822, and a grayscale representation 876 of the appearance function 870. One of ordinary skill in the art will appreciate that the appearance function 870 is an example appearance function that may be modified in various other embodiments.

If the electronic device is operating in the dark display mode and the UI overlay element corresponds to the non-chrome type component with a first thickness value (e.g., regular), the electronic device displays the UI overlay element according to an appearance function 880. As shown in FIG. 8C, the appearance function 880 for UI overlay elements and the appearance function 822 for background content are plotted on a graph 885 that includes the x-axis that corresponds to a grayscale range of colors or hues from pure black to pure white and the y-axis that corresponds to increasing luminance values. Furthermore, FIG. 8C illustrates the grayscale representation 824 of the appearance function 822, and a grayscale representation 886 of the appearance function 880. One of ordinary skill in the art will appreciate that the appearance function 880 is an example appearance function that may be modified in various other embodiments.

If the electronic device is operating in the dark display mode and the UI overlay element corresponds to the non-chrome type component with a first thickness value (e.g., thin), the electronic device displays the UI overlay element according to an appearance function 880. As shown in FIG. 8C, the appearance function 890 for UI overlay elements and the appearance function 822 for background content are plotted on a graph 895 that includes the x-axis that corresponds to a grayscale range of colors or hues from pure black to pure white and the y-axis that corresponds to increasing luminance values. Furthermore, FIG. 8C illustrates the grayscale representation 824 of the appearance function 822, and a grayscale representation 896 of the appearance function 890. One of ordinary skill in the art will appreciate that the appearance function 890 is an example appearance function that may be modified in various other embodiments.

FIGS. 9A-9D illustrate example user interfaces for changing the appearance of user interface (UI) overlay elements in accordance with some embodiments. The user interfaces in these figures are used to illustrate the processes described below, including the processes in FIGS. 11A-11C. Although some of the examples which follow will be given with reference to inputs on a touchscreen display (where the touch-sensitive surface and the display are combined), in some embodiments, the device detects inputs on a touch-sensitive surface 451 that is separate from the display 450, as shown in FIG. 4B.

Figure 9A:
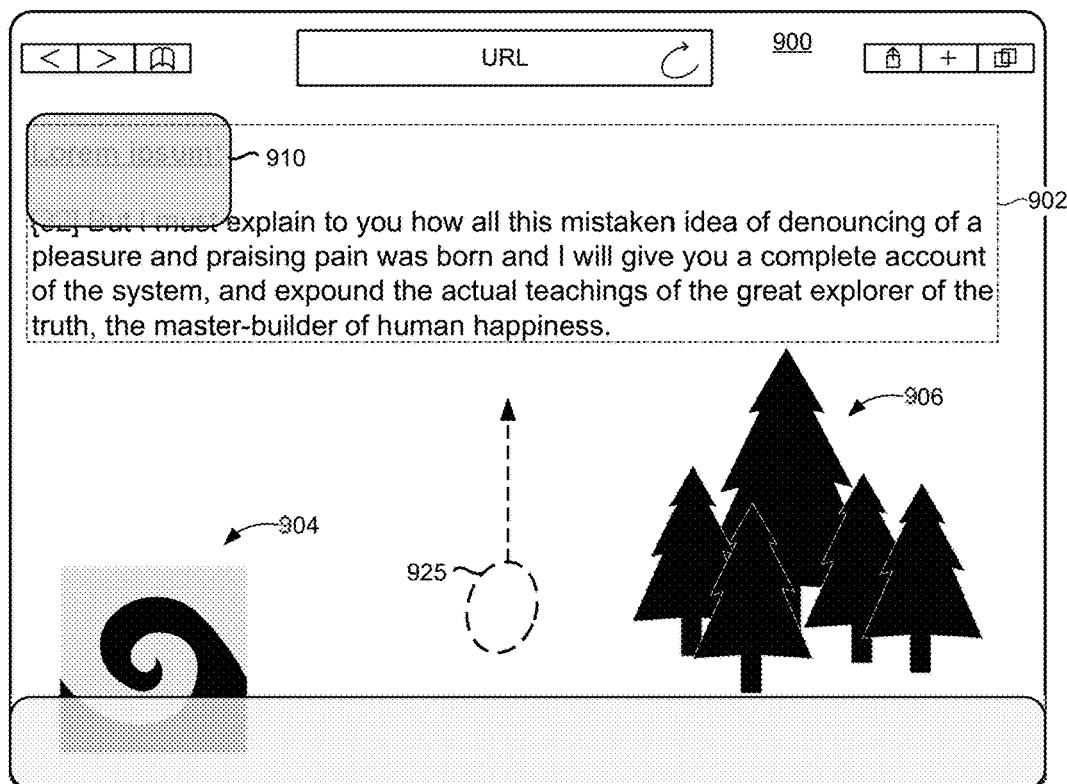
FIGS. 9A-9D illustrate example user interfaces for changing the appearance of user interface overlay elements in accordance with some embodiments.
Figure 9B:
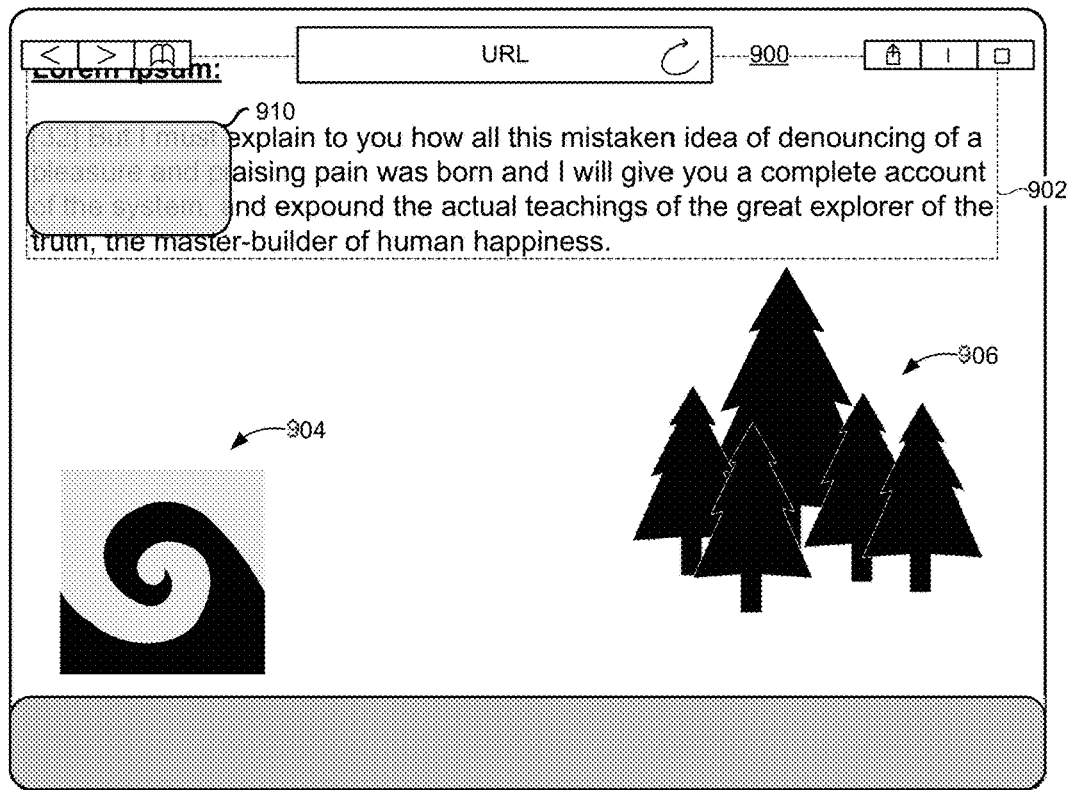

FIGS. 9A and 9B show a sequence in which a scroll gesture changes background content underlying first and second UI overlay elements. As shown in FIG. 9A, the electronic device displays a web browser application window 900 that includes text content 902 and image content 904 and 906 associated with a web page or the like. As shown in FIG. 9A, the electronic device also displays a first UI overlay element 910 overlaid on a portion of the text content 902 and a second UI overlay element overlaid 920 on a portion of the image content 904. According to some embodiments, the electronic device displays the web browser application window 900 according to the light display mode in FIGS. 9A-9D. According to some embodiments, the first UI overlay element 910 corresponds to a non-chrome type UI overlay element (e.g., a movable magnification region, a preview window, a second application window, or the like). According to some embodiments, the second UI overlay element 920 corresponds to a chrome type UI overlay element (e.g., an icon bar, title bar, tool bar, or the like). In some embodiments, the first UI overlay element 910 is independent of the web browser application window 900. In some embodiments, the second UI overlay element 920 is associated with the web browser application window 900.

In some embodiments, the first UI overlay element 910 is displayed based on one of the appearance functions 840, 850, or 860 and the portion of the text content 902 underlying the first UI overlay element 910. As shown in FIG. 9A, the first UI overlay element 910 is lighter than the underlying background content of the web browser application window 900 (e.g., the portion of the text content 902 under the first UI overlay element 910). In some embodiments, the second UI overlay element 920 is displayed based on the appearance function 820 and the portion of the image content 904 underlying the second UI overlay element 920. As shown in FIG. 9A, the second UI overlay element 920 is lighter than the underlying background content of the web browser application window 900 (e.g., the portion of the image content 904 under the second UI overlay element 920).

As shown in FIG. 9A, the electronic device detects a user input gesture 925 (e.g., an upward swipe gesture) that corresponds to scrolling the content in an upward direction. In response to detecting the user input gesture 925, the electronic device scrolls the content web page associated with the web browser application window 900 (including the text content 902 and the image content 904 and 906) in an upward direction. As shown in FIG. 9B, the second UI overlay element 920 is darker than the underlying background content of the web browser application window 900.

Figure 9C:
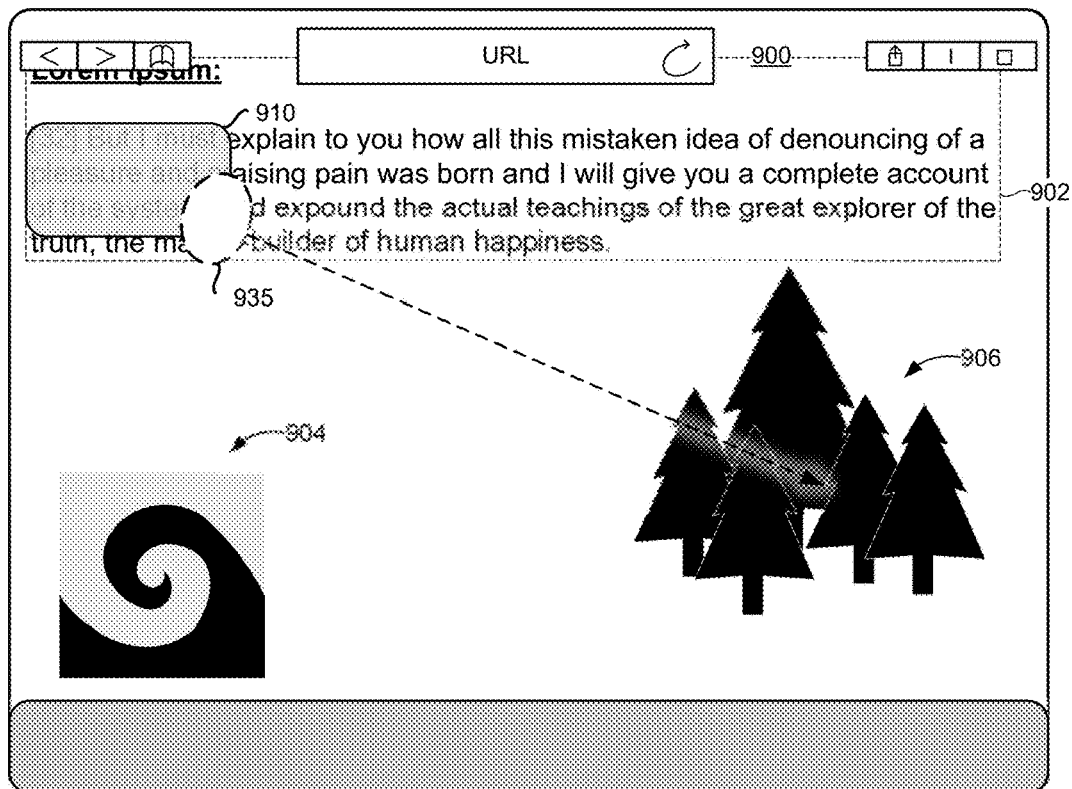
Figure 9D:
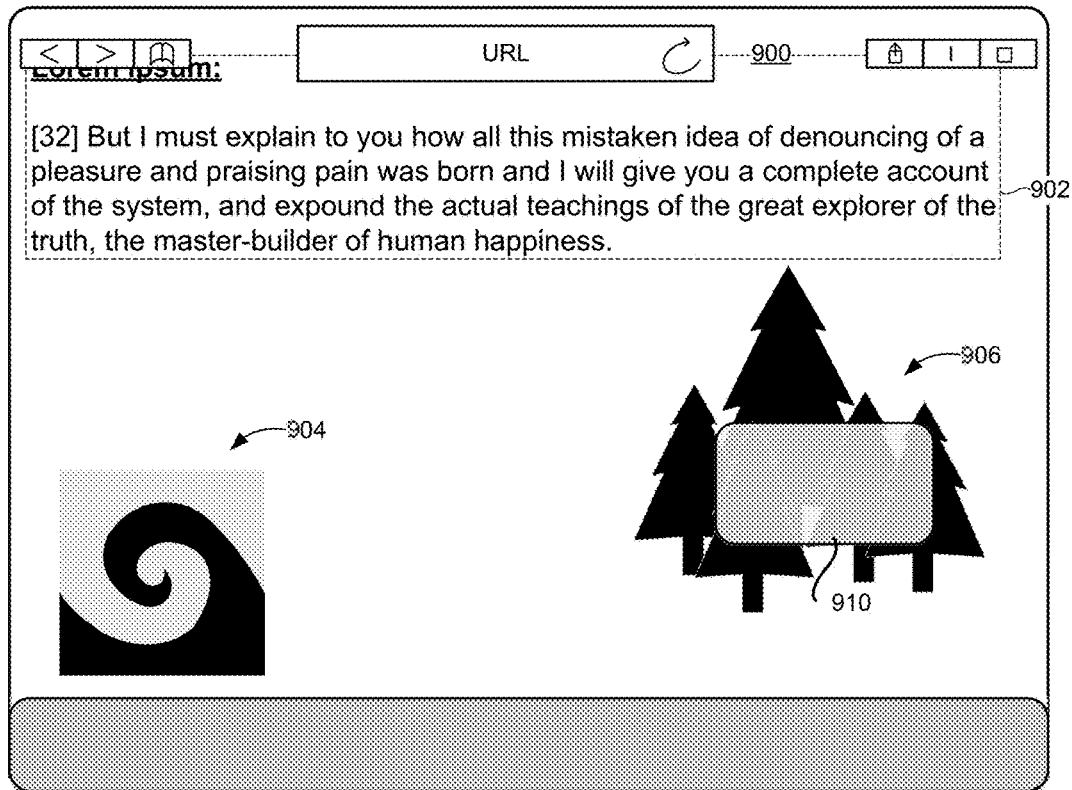
Figure 10A:
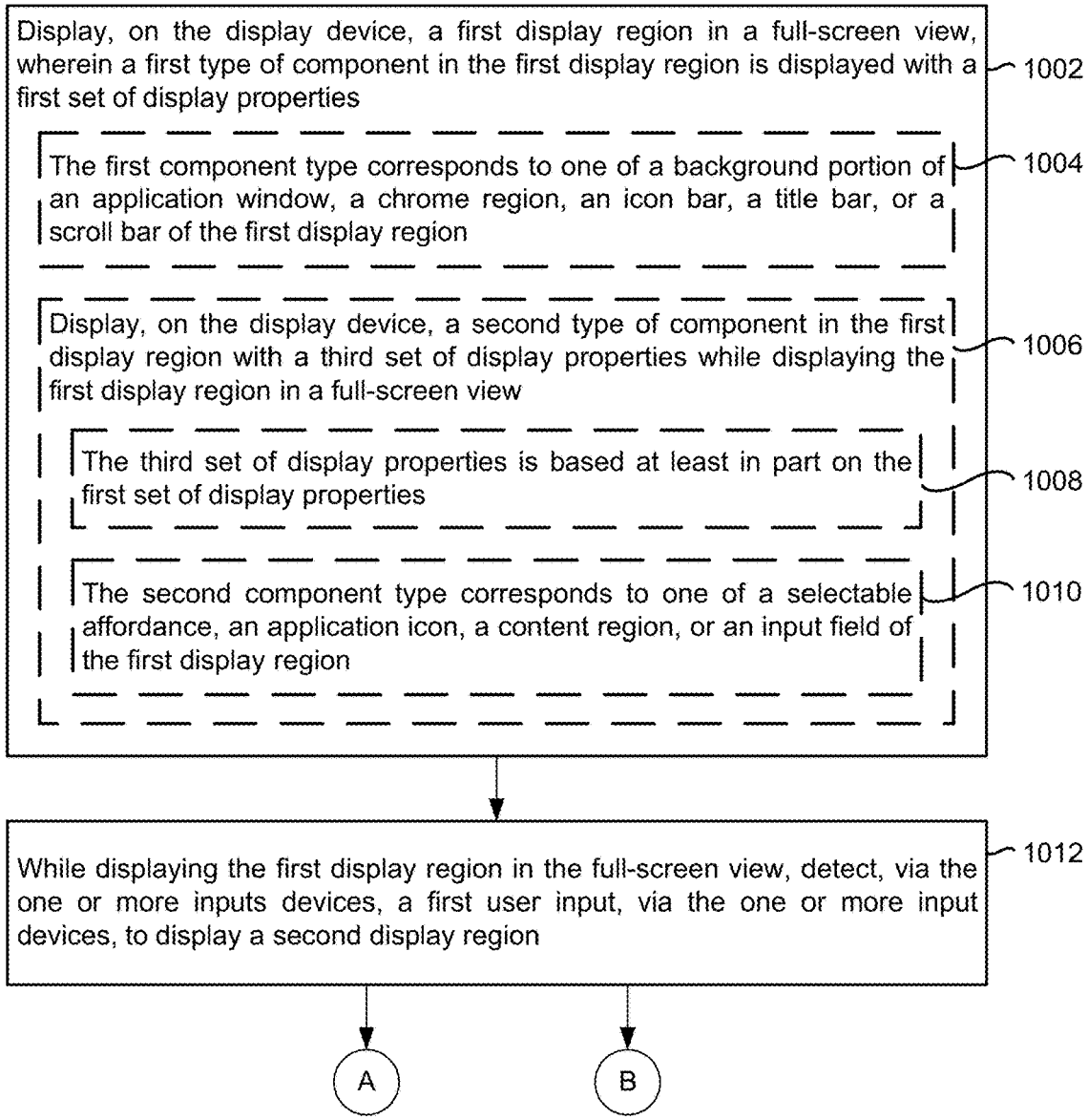
Figure 10B:
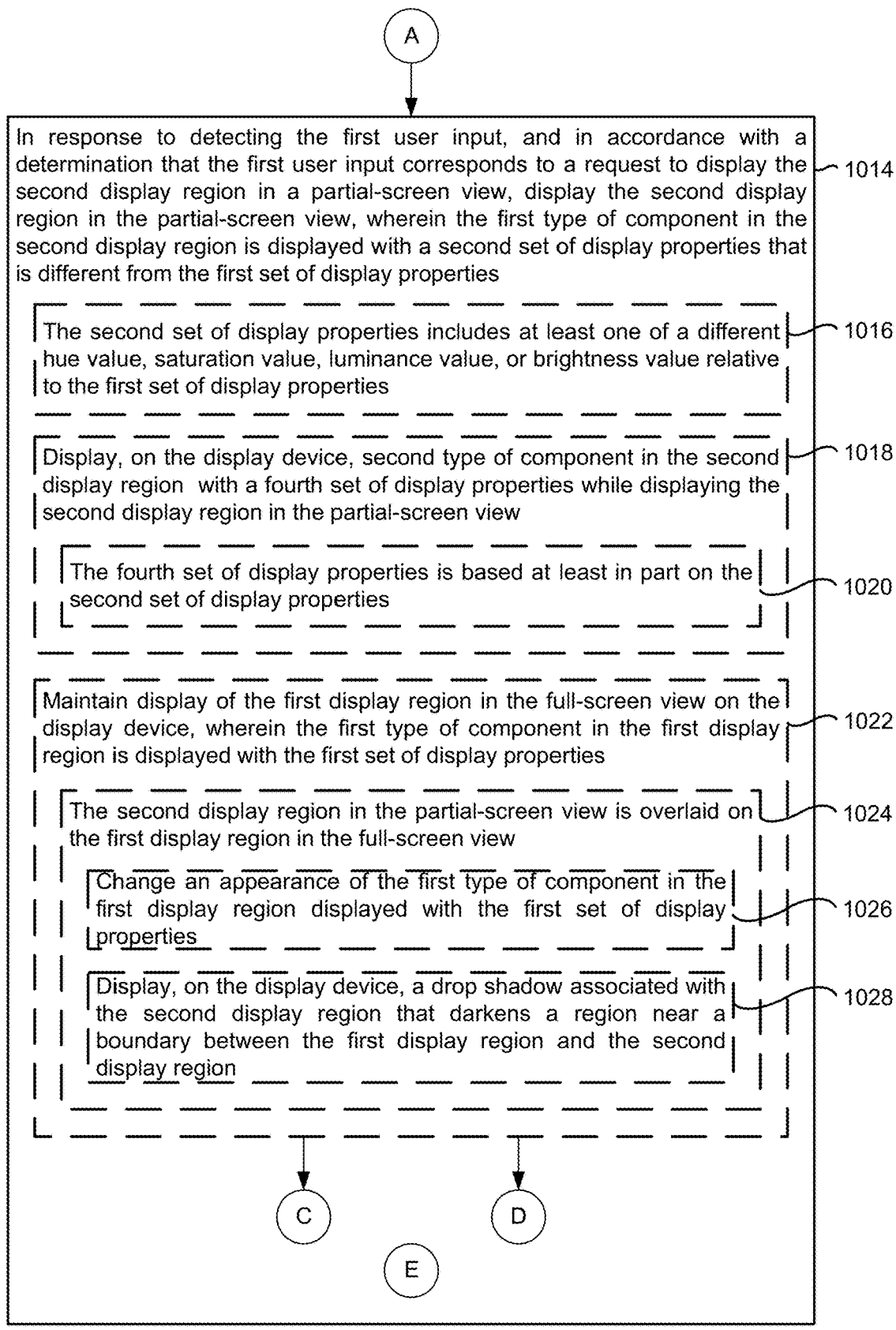
Figure 10E:
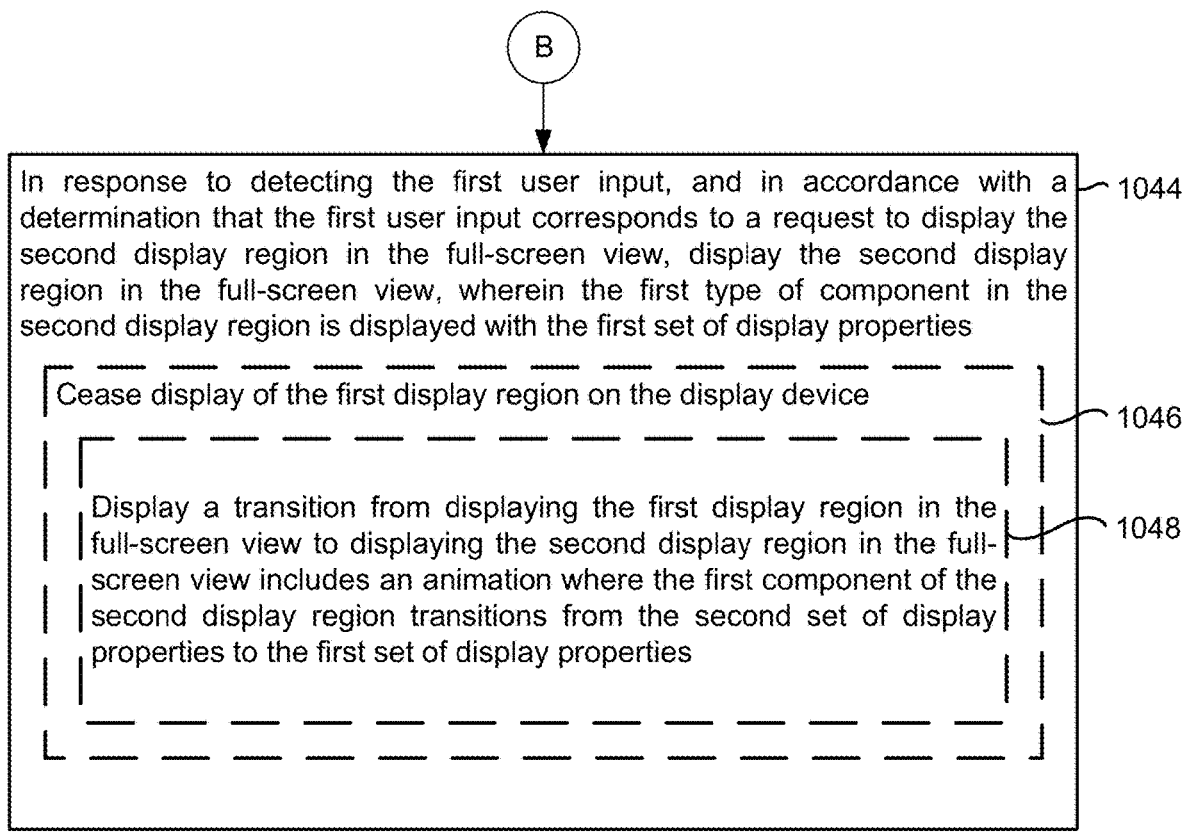

FIGS. 9C and 9D show a sequence in which the first UI overlay element is moved from a first location overlaid on text content to a second location overlaid on image content. As shown in FIG. 9C, the electronic device detects a user input gesture 935 (e.g., a tap and drag gesture) that corresponds to moving the first UI overlay element 910. In response to detecting the user input gesture 935, the electronic device displaying the first UI overlay element 910 over a portion of the image content 906). As shown in FIG. 9D, the first UI overlay element 910 is lighter than in FIGS. 9A-9C because the underlying background content of the web browser application window 900 in FIG. 9D (e.g., the portion of the image content 906 under the first UI overlay element 910) is darker than the underlying background content of the web browser application window 900 in FIGS. 9A-9C (e.g., the portion of the text content 902 under the first UI overlay element 910).

FIGS. 10A-10E illustrate a flow diagram of a method 1000 of applying different sets of display properties to components of display regions based on their respective layers in accordance with some embodiments. The method 1000 is performed at an electronic device (e.g., the portable multifunction device 100 in FIG. 1A, or the device 300 in FIG. 3) with one or more processors, non-transitory memory, a display device, and one or more input devices. In some embodiments, the display is a touchscreen display and the input device is on or integrated with the display. In some embodiments, the display is separate from the input device. Some operations in method 1000 are, optionally, combined and/or the order of some operations is, optionally, changed.

As described below, the method 1000 provides an intuitive way to display components within display regions with different sets of display properties to components of display regions based on their respective layers. The method reduces the cognitive burden on a user when navigating and manipulating user interfaces, thereby creating a more efficient human-machine interface. For battery-operated electronic devices, enabling a user to navigate and manipulate user interfaces faster and more efficiently conserves power and increases the time between battery charges.

The device displays (1002), via the display device, a first display region in a full-screen view, wherein a first type of component in the first display region is displayed with a first set of display properties. For example, the first display region corresponds to a display container such as an application window, a pop/slide over pane, a composition window, or the like. In some embodiments, while the electronic device displays first display region in the full-screen view at least a portion of the display includes a status bar or the like associated with the operating system including, for example, a Wi-Fi indicator, mobile access network indicator, BLUETOOTH indicator, the current time, and/or the like.

In some embodiments, while in the full-screen view, the device displays the first display region on a first layer of the user interface. In some embodiments, the first set of display properties is independent of the color or content of the first display region. In some embodiments, the first set of display properties is dependent on the color or content of the first display region. In some embodiments, a second type of component within the first display region is displayed with a third set of display properties based on but different from the first set of display properties (e.g., a lighter hue, a reduced saturation, a greater brightness value, or the like). For example, the first component type corresponds to a background portion of an application window, a chrome sub-region, an icon bar, a title bar, a scroll bar, or the like of the first display region. For example, the second component type corresponds to a background of a content sub-region, an input field, an icon, an affordance, a button, or the like of the first display region.

As one example, with reference to FIG. 5B, the electronic device displays the email application window 510 (e.g., the first display region) in the full-screen view according to the dark display mode. Continuing with this example, with reference to FIG. 5B, while displaying the email application window 510 in the full-screen view, the electronic device displays the first type of component—the chrome regions 513, 515, and 517—with a set of display properties 562 (e.g., the first set of display properties such as white text with a 100% black background fill). Continuing with this example, with reference to FIG. 5B, while displaying the email application window 510 in the full-screen view, the electronic device displays the second type of component—the inbox affordances 532, the conversation affordances 542, and the action affordances 522 (or the background thereof)—with a set of display properties 564 (e.g., the third set of display properties such as white text with an 85% black background fill).

In some embodiments, the device is set to a dark display mode based on a toggle located in a settings interface or a control center. For example, at least one of background, text, and key colors change between dark and light display modes. For example, in the light display mode, application windows are white/off white with contrasting drop shadows. In some embodiments, while in dark display mode, the first set of display properties is associated with a black or pure black background that blends the first component type of the first display region into the device hardware/bezel and a contrasting text color such as white or gray. As one example, FIGS. 5A and 5B illustrate a sequence in which an example email application window 510 in a full-screen view transitions from a light display mode to a dark display mode. As another example, FIGS. 6A and 6B illustrate a sequence in which an example email application window (e.g., the mailboxes pane 610) in a full-screen view transitions from a light display mode to a dark display mode.

In some embodiments, the first component type corresponds to (1004) one of a background portion of an application window, a chrome region, an icon bar, a title bar, or a scroll bar of the first display region. As one example, with reference to FIG. 5B, the electronic device displays the first type of component—the chrome regions 513, 515, and 517—within the email application window 510. As another example, with reference to FIG. 5G, the electronic device displays the first type of component—the chrome region 593—within the web browser application window 590.

In some embodiments, the device displays (1006), via the display device, a second type of component in the first display region with a third set of display properties while displaying the first display region in a full-screen view. Displaying a first type of component within the first display region in the full-screen view with a first set of display properties and a second type of component within the first display region in the full-screen view with a third set of display properties provides an efficient mechanism for a user to distinguish between types of components, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the third set of display properties is based (1008) at least in part on the first set of display properties. In some embodiments, a second type of component within the first display region is displayed with a third set of display properties based on but different from the first set of display properties (e.g., a lighter hue, a reduced saturation, a greater brightness value, greater luminance value, or the like). For example, the first component type corresponds to a background portion of an application window, a chrome sub-region, an icon bar, a title bar, a scroll bar, or the like of the first display region. For example, the second component type corresponds to a background of a content sub-region, an input field, an icon, an affordance, a button, or the like of the first display region.

In some embodiments, the second component type corresponds to (1010) one of a selectable affordance, an application icon, a content region, or an input field of the first display region. As one example, with reference to FIG. 5B, the electronic device displays the second type of component—the inbox affordances 532, the conversation affordances 542, and the action affordances 522 (or the background thereof)—within the email application window 510. As another example, with reference to FIG. 5G, the electronic device displays the second type of component—the input field 594, the content region 596, and the action affordances 592 (or the background thereof)—within the web browser application window 590.

While displaying the first display region in the full-screen view, the device detects (1012), via the one or more input devices, a first user input, via the one or more input devices, to display a second display region. For example, the first user input corresponds to a voice command, sequence of one or more touch inputs, a touch input gesture, or the like. In some embodiments, the second display region corresponds to a display container such as an application window, a composition window, a share sheet/pane, a slide-over/up pane, a quick action window, a peek/preview window, or the like.

As one example, with reference to the sequence in FIGS. 5E-5G, the electronic device detects a touch input 527 that causes the web browser application window 590 (e.g., the second display region) to be displayed in a full-screen view. As another example, with reference to the sequence in FIGS. 5H-5K, the electronic device detects a touch input gesture 529 that causes the web browser application window 590 (e.g., the second display region) to be displayed in a partial-screen view. As another yet example, with reference to the sequence in FIGS. 5N-5Q, the electronic device detects a touch input gesture 539 that causes the web browser application window 590 (e.g., the second display region) to be displayed in a partial-screen view.

In response to detecting the first user input, and in accordance with a determination that the first user input corresponds to a request to display the second display region in a partial-screen view, the device displays (1014), via the display device, the second display region in the partial-screen view, wherein the first type of component in the second display region is displayed with a second set of display properties that is different from the first set of display properties. In some embodiments, while in the dark display mode, the second set of display properties is associated with a gray background with a lighter hue or increased brightness as compared to the first set of display properties associated with the black or pure black background. In some embodiments, the second set of display properties is associated a contrasting text color such as black. In some embodiments, while in the partial-screen view, the device displays the second display region on a second layer of the user interface.

As one example, FIGS. 5H-5K illustrate a sequence in which the web browser application window 590 in the partial-screen view is overlaid (as a slide-over pane) on the email application window 510 in the full-screen view. Continuing with this example, with reference to FIG. 5K, while displaying the web browser application window 590 in the partial-screen view, the electronic device displays the first type of component—the chrome regions 593 and 595—with the set of display properties 566 (e.g., the second set of display properties such as white text with a 75% black background fill). Continuing with this example, with reference to FIG. 5K, while displaying the web browser application window 590 in the partial-screen view, the electronic device displays the second type of component—the input field 594, the content region 596, and the action affordances 592 (or the background thereof)—with the set of display properties 568 (e.g., the fourth set of display properties such as white text with a 65% black background fill).

As another example, FIGS. 5N-5Q illustrate a sequence in which the email application window 510 transitions from the full-screen view to the partial-screen view such that the email application window 510 and the web browser application window 590 are concurrently displayed in the partial-screen view. Continuing with this example, with reference to FIG. 5Q, while displaying the web browser application window 590 in the partial-screen view, the electronic device displays the first type of component—the chrome regions 593 and 595—with the set of display properties 566 (e.g., the second set of display properties such as white text with a 75% black background fill). Continuing with this example, with reference to FIG. 5Q, while displaying the web browser application window 590 in the partial-screen view, the electronic device displays the second type of component—the input field 594, the content region 596, and the action affordances 592 (or the background thereof)—with the set of display properties 568 (e.g., the fourth set of display properties such as white text with a 65% black background fill).

In some embodiments, the second set of display properties is independent of the color or content of the first and second display regions. In some embodiments, the second set of display properties is dependent on the color or content of the first display region. In some embodiments, the second set of display properties is dependent on the color or content of the second display region. In some embodiments, a second type of component within the second display region is displayed with a fourth set of display properties based on but different from the second set of display properties (e.g., a lighter hue, a reduced saturation, a greater brightness value, or the like). For example, the first component type corresponds to a background portion of an application window, a chrome sub-region, an icon bar, a title bar, a scroll bar, or the like of the second display region. For example, the second component type corresponds to a background of a content sub-region, an input field, an icon, an affordance, a button, or the like of the second display region.

In some embodiments, while the second display region is overlaid on the first display region, the electronic device dims, blurs, or otherwise obscures the first display region. In some embodiments, a blurring/obscuring layer is optionally displayed over the first display region to slightly dim its appearance (e.g., an intermediate layer). In some embodiments, while the second display region is overlaid on the first display region, the electronic device displaying a shadow adjacent to at least a portion of the perimeter of the second display region in order to indicate a z-order depth hierarchy such that the second display region is above the first display region. In some embodiments, the second display region is accompanied by a drop shadow (e.g., a shadow with at least X-pixel thickness) while the second type of component in the second display region is displayed with the second set of display properties.

In some embodiments, the second set of display properties includes (1016) at least one of a different hue value, saturation value, luminance value, or brightness value relative to the first set of display properties. Displaying the first type of component within the second display region with the second set of display properties as opposed to displaying the first type of component within the first display region with the first set of display properties provides an efficient mechanism for a user to distinguish between the display regions and the respective layers thereof, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the device displays (1018), via the display device, a second type of component in the second display region with a fourth set of display properties while displaying the second display region in the partial-screen view. Displaying a first type of component within the second display region with a second set of display properties and a second type of component within the first display region with a fourth set of display properties provides an efficient mechanism for a user to distinguish types of components, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the fourth set of display properties is based (1020) at least in part on the second set of display properties. In some embodiments, a second type of component within the second display region is displayed with a fourth set of display properties based on but different from the second set of display properties (e.g., a lighter hue, a reduced saturation, a greater brightness value, greater luminance value, or the like). For example, the first component type corresponds to a background portion of an application window, a chrome sub-region, an icon bar, a title bar, a scroll bar, or the like of the second display region. For example, the second component type corresponds to a background of a content sub-region, an input field, an icon, an affordance, a button, or the like of the second display region.

In some embodiments, in response to detecting the first user input, and in accordance with a determination that the first user input corresponds to a request to display the second display region in the partial-screen view while displaying the first display region in the full-screen view, the device maintains (1022) display of the first display region in the full-screen view via the display device, wherein the first type of component in the first display region is displayed with the first set of display properties. For example, the second display region corresponds to a slide-over window in the partial-screen view associated with the second layer of the UI overlaid on the first display region in the full-screen view associated with the first layer of the UI.

Displaying a first type of component within the first display region in the full-screen view with a first set of display properties and the first type of component within the second display region in the partial-screen view with a second set of display properties provides an efficient mechanism for a user to distinguish between display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

As one example, FIGS. 5B and 5C illustrate a sequence in which an example composition interface 570 in a partial-screen view is overlaid (as a slide-over pane) on the email application window 510 in the full-screen view. As shown in FIG. 5C, while displaying the composition interface 570 in the partial-screen view according to the second display mode, the electronic device displays the chrome region 573 and the software keyboard 575 with a set of display properties 566 (e.g., the second set of display properties such as white text with a 75% black background fill). As shown in FIG. 5C, while displaying the composition interface 570 in the partial-screen view according to the second display mode, the electronic device displays the message input region 574 and the action affordances 572A and 572B (or the background thereof) with a set of display properties 568 (e.g., the fourth set of display properties such as white text with a 65% black background fill). As shown in FIG. 5C, while displaying the email application window 510 in the full-screen view according to the second display mode, the electronic device displays the chrome regions 513, 515, and 517 with a set of display properties 562 (e.g., the first set of display properties such as white text with a 100% black background fill). As shown in FIG. 5C, while displaying the email application window 510 in the full-screen view according to the second display mode, the electronic device displays the inbox affordances 532, the conversation affordances 542, and the action affordances 522 (or the background thereof) with a set of display properties 564 (e.g., the third set of display properties such as white text with an 85% black background fill).

As other example, FIGS. 5H-5K illustrate a sequence in which the web browser application window 590 in the partial-screen view is overlaid (as a slide-over pane) on the email application window 510 in the full-screen view. As shown in FIG. 5K, while displaying the web browser application window 590 in the partial-screen view according to the second display mode, the electronic device displays the chrome regions 593 and 595 with the set of display properties 566 (e.g., the second set of display properties such as white text with a 75% black background fill). As shown in FIG. 5K, while displaying the web browser application window 590 in the partial-screen view according to the second display mode, the electronic device displays the input field 594, the content region 596, and the action affordances 592 (or the background thereof) with the set of display properties 568 (e.g., the fourth set of display properties such as white text with a 65% black background fill). As shown in FIG. 5K, while displaying the email application window 510 in the full-screen view according to the second display mode, the electronic device displays the chrome regions 513, 515, and 517 with the set of display properties 562 (e.g., the first set of display properties such as white text with a 100% black background fill). As shown in FIG. 5K, while displaying the email application window 510 in the full-screen view according to the second display mode, the electronic device displays the inbox affordances 532, the conversation affordances 542, and the action affordances 522 (or the background thereof) with the set of display properties 564 (e.g., the third set of display properties such as white text with an 85% black background fill).

In some embodiments, the second display region in the partial-screen view is overlaid (1024) on the first display region in the full-screen view. As one example, FIGS. 5B and 5C illustrate a sequence in which an example composition interface 570 in a partial-screen view is overlaid (as a slide-over pane) on the email application window 510 in the full-screen view.

In some embodiments, while displaying the second display region in the partial-screen view overlaid on the first display region in the full-screen view, the device changes (1026) an appearance of the first type of component in the first display region displayed with the first set of display properties. For example, while the second display region is overlaid on the first display region, the electronic device blurs, dims, or otherwise obscures the first type of component within the first display region and/or the first display region.

Changing an appearance of the first type of component within the first display region while displaying the second display region overlaid on the first display region provides an efficient mechanism for a user to distinguish between display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, while displaying the second display region in the partial-screen view overlaid on the first display region in the full-screen view, the device displays (1028), via the display device, a drop shadow associated with the second display region that darkens a region near a boundary between the first display region and the second display region. In some embodiments, while the second display region is overlaid on the first display region, the electronic device displaying a shadow adjacent to at least a portion of the perimeter of the second display region in order to indicate a z-order depth hierarchy such that the second display region is above the first display region. In some embodiments, the second display region is accompanied by a drop shadow (e.g., a shadow with at least X-pixel thickness) while the second type of component in the second display region is displayed with the second set of display properties.

Displaying a drop shadow associated with the second display region while displaying the second display region overlaid on the first display region provides an efficient mechanism for a user to distinguish between display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the device (1038): detects a second user input, via the one or more input devices, to display a third display region in the partial-screen view; and, in response to detecting the second user input, displays, via the display device, the third display region in the partial-screen view, wherein the first type of component in the third display region is displayed with the second set of display properties that is different from the first set of display properties. For example, the second user input corresponds to opening an additional application window, a composition window, a share sheet/pane, a pop-up/over pane, a quick action window, a peek/preview window, or the like. In some embodiments, the third display region is accompanied by a drop shadow that is greater in size than the drop shadow associated with the second display region in order to show the z-order (depth) of the display regions.

As one example, FIGS. 5Q and 5R illustrate a sequence in which the composition interface 570 in the partial-screen view is overlaid on the email application window 510 in the partial-screen view while the email application window 510 and the web browser application window 590 are concurrently displayed in the partial-screen view. Continuing with this example, with reference to FIG. 5R, while displaying the composition interface 570 in the partial-screen view, the electronic device displays the first type of component—the chrome region 573 and the software keyboard 575—with the set of display properties 566 (e.g., the second set of display properties such as white text with a 75% black background fill). Continuing with this example, with reference to FIG. 5R, while displaying the composition interface 570 in the partial-screen view, the electronic device displays the second type of component—the message input region 574 and the action affordances 572A and 572B (or the background thereof) with—the set of display properties 568 (e.g., the fourth set of display properties such as white text with a 65% black background fill).

In some embodiments, the device (1040): detects a second user input, via the one or more input devices, to display the first display region in the partial-screen view; and, in response to detecting the second user input, displays, via the display device, the first display region in the partial-screen view, wherein the first type of component in the first display region is displayed with the second set of display properties that is different from the first set of display properties while maintaining display of the second display region in the partial-screen view via the display device. For example, the second user input corresponds to a pull-up gesture on the second display region. In one example, as a result of the second user input, the first and second regions are displayed side-by-side in a non-overlapping manner. In another example, as a result of the second user input, the first and second regions are displayed top-to-bottom in a non-overlapping manner. According to some embodiments, while the first and second display regions are displayed in the partial-screen view, the first and second regions are separated by a divider region that is displayed with the first set of display properties As one example, FIGS. 5K and 5L illustrate a sequence in which the email application window 510 transitions from the full-screen view to the partial-screen view such that the email application window 510 and the web browser application window 590 are concurrently displayed in the partial-screen view. In response to detecting the touch input gesture 531 in FIG. 5K, the electronic device displays the email application window 510 in the partial-screen view and the web browser application window 590 in the partial-screen view in FIG. 5L. According to some embodiments, as shown in FIG. 5L, the electronic device displays the email application window 510 and the web browser application window 590 in a side-by-side split-screen manner while displaying the email application window 510 in the partial-screen view and the web browser application window 590 in the partial-screen view.

As shown in FIG. 5L, while displaying the email application window 510 in the partial-screen view according to the second display mode, the electronic device displays the chrome regions 513, 515, and 517 with the set of display properties 566 (e.g., the second set of display properties such as white text with a 75% black background fill). As shown in FIG. 5L, while displaying the email application window 510 in the partial-screen view according to the second display mode, the electronic device displays the inbox affordances 532, the conversation affordances 542, and the action affordances 522 (or the background thereof) with the set of display properties 568 (e.g., the fourth set of display properties such as white text with a 65% black background fill). As shown in FIG. 5L, while displaying the web browser application window 590 in the partial-screen view according to the second display mode, the electronic device displays the chrome regions 593 and 595 with the set of display properties 566 (e.g., the second set of display properties such as white text with a 75% black background fill). As shown in FIG. 5L, while displaying the web browser application window 590 in the partial-screen view according to the second display mode, the electronic device displays the input field 594, the content region 596, and the action affordances 592 (or the background thereof) with the set of display properties 568 (e.g., the fourth set of display properties such as white text with a 65% black background fill).

In some embodiments, in response to detecting the first user input, and in accordance with a determination that the first user input corresponds to a request to display the second display region in the partial-screen view while displaying the first display region in the partial-screen view, the device displays (1030), via the display device, the first display region in the partial-screen view, wherein the first type of component in the first display region is displayed with the second set of display properties that is different from the first set of display properties. For example, while the first and second regions are both displayed in the partial-screen view associated with the second layer of the UI, the first and second regions are displayed in a side-by-side split-screen manner.

Displaying a first type of component within the first display region in the partial-screen view with a first set of display properties and the first type of component within the second display region in the partial-screen view with a second set of display properties provides an efficient mechanism for a user to distinguish between display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

As another example, FIGS. 5N-5Q illustrate a sequence in which the email application window 510 transitions from the full-screen view to the partial-screen view such that the email application window 510 and the web browser application window 590 are concurrently displayed in the partial-screen view. As shown in FIG. 5Q, while displaying the email application window 510 in the partial-screen view according to the second display mode, the electronic device displays the chrome regions 513, 515, and 517 with the set of display properties 566 (e.g., the second set of display properties such as white text with a 75% black background fill). As shown in FIG. 5Q, while displaying the email application window 510 in the partial-screen view according to the second display mode, the electronic device displays the inbox affordances 532, the conversation affordances 542, and the action affordances 522 (or the background thereof) with the set of display properties 568 (e.g., the fourth set of display properties such as white text with a 65% black background fill). As shown in FIG. 5Q, while displaying the web browser application window 590 in the partial-screen view according to the second display mode, the electronic device displays the chrome regions 593 and 595 with the set of display properties 566 (e.g., the second set of display properties such as white text with a 75% black background fill). As shown in FIG. 5Q, while displaying the web browser application window 590 in the partial-screen view according to the second display mode, the electronic device displays the input field 594, the content region 596, and the action affordances 592 (or the background thereof) with the set of display properties 568 (e.g., the fourth set of display properties such as white text with a 65% black background fill).

In some embodiments, an edge of the second display region in the partial-screen view is (1032) adjacent to an edge of the first display region in the partial-screen view. In one example, while the first and second regions are both displayed in the partial-screen view associated with the second layer of the UI, the first and second regions are displayed side-by-side in a non-overlapping manner. In one example, while the first and second regions are both displayed in the partial-screen view associated with the second layer of the UI, the first and second regions are displayed top-to-bottom in a non-overlapping manner. For example, as shown in FIG. 5L, the electronic device displays the email application window 510 and the web browser application window 590 in the side-by-side split-screen manner, In some embodiments, the device displays (1034), via the display device, a divider region separating the first display region and the second display region, wherein the divider region is displayed with the first set of display properties. Displaying a divider region between the first and second display regions provides an efficient mechanism for a user to distinguish between display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

For example, as shown in FIG. 5L, while displaying the email application window 510 and the web browser application window 590 in the side-by-side split-screen manner, the electronic device displays a divider 598 with a divider affordance 599 between the email application window 510 and the web browser application window 590. As shown in FIG. 5L, the electronic device displays the background of the divider 598 with the set of display properties 562 (e.g., the first set of display properties such as white text with a 100% black background fill) and the divider affordance 599 with the set of display properties 564 (e.g., the third set of display properties such as white text with an 85% black background fill).

In some embodiments, the device (1036): detects a second user input, via the one or more input devices, to display the first display region in the full-screen view; and, in response to detecting the second user input: displays, via the display device, the first display region in the full-screen view, wherein the first type of component in the first display region is displayed with the first set of display properties; and displays, via the display device, the second display region in the partial-screen view overlaid on the first display region, wherein the first type of component in the second display region is displayed with the second set of display properties. For example, the second user input corresponds to a pull-down gesture on the second display region. In some embodiments, in response to detecting the second user input, a transition occurs from the split-screen view with the first and second display regions displayed in the partial-screen view associated with the second layer of the UI to a full-screen with a concurrently displayed slide-over view where the first display region is displayed in the full-screen view associated with the first layer of the UI and the second display region is displayed in the partial-screen view associated with the second layer of the UI.

As one example, FIGS. 5L and 5M illustrate a sequence in which the email application window 510 transitions from the partial-screen view to the full-screen view such that the web browser application window 590 in the partial-screen view is overlaid (as a slide-over pane) on the email application window 510 in the full-screen view. In response to detecting the touch input gesture 537 in FIG. 5L, the electronic device displays the web browser application window 590 in the partial-screen view (as a slide-over pane) overlaid on the email application window 510 in the full-screen view in FIG. 5M. As shown in FIG. 5M, while displaying the email application window 510 in the full-screen view according to the second display mode, the electronic device displays the chrome regions 513, 515, and 517 with the set of display properties 562 (e.g., the first set of display properties such as white text with a 100% black background fill). As shown in FIG. 5M, while displaying the email application window 510 in the full-screen view according to the second display mode, the electronic device displays the inbox affordances 532, the conversation affordances 542, and the action affordances 522 (or the background thereof) with the set of display properties 564 (e.g., the third set of display properties such as white text with an 85% black background fill). As shown in FIG. 5M, while displaying the web browser application window 590 in the partial-screen view according to the second display mode, the electronic device displays the chrome regions 593 and 595 with the set of display properties 566 (e.g., the second set of display properties such as white text with a 75% black background fill). As shown in FIG. 5M, while displaying the web browser application window 590 in the partial-screen view according to the second display mode, the electronic device displays the input field 594, the content region 596, and the action affordances 592 (or the background thereof) with the set of display properties 568 (e.g., the fourth set of display properties such as white text with a 65% black background fill).

In some embodiments, the device (1042): detects a second user input, via the one or more input devices, to display the first display region in the full-screen view; and, in response to detecting the second user input: displays, via the display device, the first display region in the full-screen view, wherein the first type of component in the first display region is displayed with the first set of display properties; and ceases display of the second display region via the display device. For example, the second user input corresponds to a swipe gesture on the divider region. In some embodiments, in response to detecting the second user input, a transition occurs from the split-screen view with the first and second display regions displayed in the partial-screen view associated with the second layer of the UI to a full-screen view that includes the first display region and not the second display region.

As one example, FIGS. 5S and 5T illustrate a sequence in which the email application window 510 transitions from the partial-screen view to the full-screen view such that the web browser application window 590 ceases to be displayed. In response to detecting the touch input gesture 543 in FIG. 5S, the electronic device displays the email application window 510 in the full-screen view according to the second display mode in FIG. 5T (without displaying the web browser application window 590 in the partial-screen view). As shown in FIG. 5T, while displaying the email application window 510 in the full-screen view according to the second display mode, the electronic device displays the chrome regions 513, 515, and 517 with the set of display properties 562 (e.g., the first set of display properties such as white text with a 100% black background fill). As shown in FIG. 5T, while displaying the email application window 510 in the full-screen view according to the second display mode, the electronic device displays the inbox affordances 532, the conversation affordances 542, and the action affordances 522 (or the background thereof) with the set of display properties 564 (e.g., the third set of display properties such as white text with an 85% black background fill).

In response to detecting the first user input, and in accordance with a determination that the first user input corresponds to a request to display the second display region in the full-screen view, the device displays (1044), via the display device, the second display region in the full-screen view, wherein the first type of component in the second display region is displayed with the first set of display properties. In some embodiments, while in the full-screen view, the device displays the second display region on a first layer of the user interface.

As one example, FIGS. 5E-5G illustrate a sequence in which the email application window 510 in the full-screen view is replaced by an example web browser application window 590 in the full-screen view. In response to detecting the touch input 527 in FIG. 5E, the electronic device displays a transition (e.g., a slide in animation) in FIG. 5F where a web browser application window 590 slides up from a bottom edge of the electronic device. Furthermore, in response to detecting the touch input 527 in FIG. 5E and after the transition in FIG. 5F, the electronic device displays the web browser application window 590 in the full-screen view according to the second display mode in FIG. 5G (without displaying the email application window 510 in the full-screen view).

As shown in FIG. 5F, while displaying a portion of the web browser application window 590 during the transition according to the second display mode, the electronic device displays the chrome region 593 with the set of display properties 566 (e.g., the second set of display properties such as white text with a 75% black background fill). As shown in FIG. 5F, while displaying the portion of the web browser application window 590 during the transition according to the second display mode, the electronic device displays the input field 594, the content region 596, and the action affordances 592 (or the background thereof) with the set of display properties 568 (e.g., the fourth set of display properties such as white text with a 65% black background fill).

As shown in FIG. 5G, while displaying the web browser application window 590 after the transition in the full-screen view according to the second display mode, the electronic device displays the chrome region 593 with the set of display properties 562 (e.g., the first set of display properties such as white text with a 100% black background fill). As shown in FIG. 5G, while displaying the web browser application window 590 after the transition in the full-screen view according to the second display mode, the electronic device displays the input field 594, the content region 596, and the action affordances 592 (or the background thereof) with the set of display properties 564 (e.g., the third set of display properties such as white text with an 85% black background fill).

In some embodiments, in response to detecting the first user input, and in accordance with a determination that the first user input corresponds to a request to display the second display region in the full-screen view, the device ceases (1046) display of the first display region via the display device. As one example, FIGS. 5E-5G illustrate a sequence in which the email application window 510 in the full-screen view is replaced by an example web browser application window 590 in the full-screen view. As another example, FIGS. 6B-6E illustrate a sequence in which a first email application window (e.g., the mailboxes pane 610) in the full-screen view is replaced by a second email application window (e.g., the inbox pane 640) in the full-screen view.

In some embodiments, the device displays (1048), via the display device, displaying, via the display device, a transition from displaying the first display region in the full-screen view to displaying the second display region in the full-screen view includes an animation where the first component of the second display region transitions from the second set of display properties to the first set of display properties. In some embodiments, the transition is associated with a fade-in animation where the second display region fades in over the first display region. In some embodiments, the transition is associated with a fade-out animation where the first region fades-out to reveal the second display region. In some embodiments, the transition is associated with a slide up/over animation where the second display region slides up/over the first display region. (e.g., the slide up/over animation follows a touch contact associated with a swipe gesture).

Displaying a transition or animation between displaying the first display region in the full-screen view and the second display region in the full-screen view provides an efficient mechanism for a user to distinguish between the display regions, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

As one example, in response to detecting the touch input 527 in FIG. 5E, the electronic device displays a transition (e.g., a slide in animation) in FIG. 5F where a web browser application window 590 slides up from a bottom edge of the electronic device. As another example, in response to detecting the touch input 621 in FIG. 6B, the electronic device displays a transition (e.g., a slide over animation) in FIGS.

6C and 6D where an inbox pane 640 slides over the mailboxes pane 610 in a right-to-left direction from a right edge of the electronic device.

It should be understood that the particular order in which the operations in FIGS. 10A-10E have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 1100 and 1300) are also applicable in an analogous manner to the method 1000 described above with respect to FIGS. 10A-10E. For example, the user inputs, display regions, sets of display properties, and user interface components described above with reference to the method 1000 optionally have one or more of the characteristics of the user inputs, display regions, sets of display properties, and user interface components described herein with reference to other methods described herein (e.g., the methods 1100 and 1300). For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 10A-10E, optionally, implemented by components depicted in FIGS. 1A and 1B. For example, the user inputs, display regions, sets of display properties, and user interface components are, optionally, implemented by the event sorter 170, the event recognizer 180, and the event handler 190. The event monitor 171 in the event sorter 170 detects a contact on touch-sensitive surface 451, and the event dispatcher module 174 delivers the event information to application 136-1. A respective event recognizer 180 of application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

FIGS. 11A-11C illustrate a flow diagram of a method 1100 of changing the appearance of user interface overlay elements based at least in part on underlying background content in accordance with some embodiments. The method 1100 is performed at an electronic device (e.g., the portable multifunction device 100 in FIG. 1A, or the device 300 in FIG. 3) with one or more processors, non-transitory memory, a display device, and one or more optional input devices. In some embodiments, the display is a touchscreen display and the input device is on or integrated with the display. In some embodiments, the display is separate from the input device. Some operations in method 1100 are, optionally, combined and/or the order of some operations is, optionally, changed.

As described below, the method 1100 provides an intuitive way to change the appearance of user interface overlay elements based at least in part on underlying content. The method reduces the cognitive burden on a user when navigating and manipulating user interfaces, thereby creating a more efficient human-machine interface. For battery-operated electronic devices, enabling a user to navigate and manipulate user interfaces faster and more efficiently conserves power and increases the time between battery charges.

The device displays (1102), via the display device, background content. As one example, the background content corresponds to a webpage displayed within a web browser application. In this example, the background content includes a text portion and an image portion. With reference to FIGS. 9A-9D, for example, the electronic device displays a web browser application window 900 that includes text content 902 and image content 904 and 906 associated with a web page or the like. As another example, the background content corresponds to an email displayed within an email application. In this example, the background content includes a text portion and an image portion.

The device displays (1104), via the display device, a user interface overlay element that is overlaid on the background content, wherein an appearance of the user interface overlay element is based at least in part on a portion of the background content under the overlay element. For example, the user interface (UI) overlay element corresponds to a composition window, a share sheet/pane, a slide-over/up pane, a quick action window, a peek/preview window, or the like. In another example, the UI overlay element corresponds to an icon bar, a title bar, a scroll bar, or other chrome region. With reference to FIGS. 9A-9D, for example, the electronic device displays a first UI overlay element 910 (e.g., a non-chrome type UI overlay element such as a movable magnification region, a preview window, a second application window, or the like) and a second UI overlay element 920 (e.g., a chrome type UI overlay element such as an icon bar, title bar, tool bar, or the like).

The device detects (1106) an input that changes the background content underlying the user interface overlay element. For example, the input corresponds to a scrolling input that scrolls or otherwise moves the background content. Continuing with this example, FIGS. 9A and 9B show a sequence in which a scroll gesture associated with the user input gesture 925 changes background content underlying first and second UI overlay elements. As another example, the input corresponds to a movement input that moves the UI overlay element. Continuing with this example, FIGS. 9C and 9D show a sequence in which a user input gesture 935 moves the first UI overlay element from a first location overlaid on text content to a second location overlaid on image content.

In response to detecting the input that changes the portion of the background content underlying the user interface overlay element, the device updates (1108) the appearance of the user interface overlay element based on background visual property values of the portion of the background content that is under the user interface overlay element. In some embodiments, the electronic device updates the appearance of the UI overlay element on a pixel-by-pixel basis relative to background visual property values for pixels in the portion of the background content under the user interface overlay element. In some embodiments, the electronic device updates the appearance of the UI overlay element based on an average of the background visual property values for pixels in the portion of the background content under the user interface overlay element.

Updating the visual property values of the user interface overlay element with visual property values based on background visual property values of the portion of the background content that is under the user interface overlay element provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In accordance with a determination that the portion of the background content under the user interface overlay element has background visual property values in a first range of background visual property values, the device displays (1110) the user interface overlay element with visual property values in a first range of overlay visual property values that are selected so as to maintain at least a threshold amount of difference between the visual property values of the user interface overlay element and the visual property values of the background content under the user interface overlay element. As one example, with reference to FIG. 7, the appearance function 710 for UI overlay elements corresponds to a non-linear curve that includes a first range of values 712, wherein there is a threshold amount of difference 716 between the first range of values 712 associated with the appearance function 710 for UI overlay elements and corresponding values associated with the appearance function 720 for background content. As another example, with continued reference to FIG. 7, the appearance function 760 for UI overlay elements corresponds to a non-linear curve that includes a first range of values 762, wherein there is a threshold amount of difference 766 between the first range of values 762 associated with the appearance function 760 for UI overlay elements and corresponding values associated with the appearance function 720 for background content. As such, according to some embodiments, the luminance value, brightness value, or the like of the user interface overlay element is set based on the color or hue of the underlying background content.

Displaying the user interface overlay element with visual property values in a first range of overlay visual property values that are selected so as to maintain at least a threshold amount of difference between the visual property values of the user interface overlay element and the visual property values of the background content under the user interface overlay element provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In accordance with a determination that the portion of the background content under the user interface overlay element has background visual property values in a second range of background visual property values that is different from the first range of background visual property values, the device displays (1112) the user interface overlay element with visual property values in a second range of overlay visual property values that is outside of the first range of overlay visual property values. As one example, with reference to FIG. 7, the appearance function 710 for UI overlay elements corresponds to a non-linear curve that includes a second range of values 714. As another example, with continued reference to FIG. 7, the appearance function 760 for UI overlay elements corresponds to a non-linear curve that includes a second range of values 764. As such, according to some embodiments, the luminance value, brightness value, or the like of the user interface overlay element is set based on the color or hue of the underlying background content.

Displaying the user interface overlay element with visual property values in a second range of overlay visual property values that is outside of the first range of overlay visual property values provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the first range of overlay visual property values is (1114) darker than the first range of background visual property values, and the second range of overlay visual property values is lighter than the second range of background visual property values. For example, the appearance of the UI overlay element is darker than the portion of the display container until a crossover point on a non-linear dynamic appearance curve. As one example, with reference to FIG. 7, the first range of values 762 of the appearance function 760 is darker than a corresponding first range of corresponding values associated with the appearance function 720 for background content, and the second range of values 764 is lighter than a second range of corresponding values associated with the appearance function 720 for background content.

Displaying the user interface overlay element with a dynamic contrast (e.g., darker-to-lighter) as compared to the underlying background content provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the first range of overlay visual property values is (1116) lighter than the first range of background visual property values, and the second range of overlay visual property values is darker than the second range of background visual property values. For example, the appearance of the UI overlay element is brighter than the portion of the display container until a crossover point on a non-linear dynamic appearance curve. As one example, with reference to FIG. 7, the first range of values 712 of the appearance function 710 is lighter than a corresponding first range of corresponding values associated with the appearance function 720 for background content, and the second range of values 714 is darker than a second range of corresponding values associated with the appearance function 720 for background content.

Displaying the user interface overlay element with a dynamic contrast (e.g. lighter-to-darker) as compared to the underlying background content provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the first range of overlay visual property values is selected (1118) in order to be lighter than a range of visual property values reserved for system user interface elements. For example, the system user interface elements correspond to display regions or components thereof in a second layer (e.g., gray/white) and a first layer (e.g., black/gray). For example, at least one of the system user interface elements correspond to a status bar or status icons therein associated with the operating system including, for example, a Wi-Fi indicator, mobile access network indicator, BLUETOOTH indicator, the current time, and/or the like. For example, at least one of the system user interface elements correspond to an application dock or application icons therein. For example, at least one of the system user interface elements correspond to a control panel or control center and icons or affordances therein. For example, at least one of the system user interface elements correspond to notification banners, pop-ups, pop-overs, slide-overs, or the like.

In some embodiments, the background visual property values correspond to (1120) at least one of a hue value, a saturation value, and a brightness value for the portion of the background content under the user interface overlay element.

In some embodiments, updating the appearance of the user interface overlay element includes (1122) updating the appearance of the user interface overlay based on background visual property values of the portion of the background content that is under the user interface overlay element and an overlay type associated with the user interface overlay element. As described above with reference to the method 800 in FIGS. 8A-8C (and specifically block 804), the electronic device selects an appearance function for the UI overlay element based on the overlay type associated with the UI overlay element (e.g., chrome or non-chrome overlay type).

Updating the visual property values of the user interface overlay element based on the underlying background content and the overlay type associated with the user interface overlay element provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the user interface overlay element corresponds to (1124) a first overlay element type associated with one of a composition window, a share sheet, a slide-over pane, a slide-up pane, a quick action window, or a preview window. With reference to FIGS. 9A-9D, for example, the electronic device displays a first UI overlay element 910 (e.g., a non-chrome type UI overlay element such as a movable magnification region, a preview window, a second application window, or the like).

In some embodiments, the user interface overlay element corresponds to (1126) a second overlay element type associated with one of an icon bar, a title bar, a scroll bar, or chrome region. With reference to FIGS. 9A-9D, for example, the electronic device displays a second UI overlay element 920 (e.g., a chrome type UI overlay element such as an icon bar, title bar, tool bar, or the like).

In some embodiments, updating the appearance of the user interface overlay element includes (1128) updating the appearance of the user interface overlay based on background visual property values of the portion of the background content that is under the user interface overlay element and a thickness value associated with the user interface overlay element. For example, the thickness value represents or emulates the material associated with the UI overlay element. As described above with reference to the method 800 in FIGS. 8A-8C (and specifically blocks 810 and 812), the electronic device selects an appearance function for the UI overlay element based on the thickness value associated with the UI overlay element (e.g., thick, regular, or thin).

Updating the visual property values of the user interface overlay element based on the underlying background content and a thickness value associated with the user interface overlay element provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, updating the appearance of the user interface overlay element includes (1130) updating the appearance of the user interface overlay based on background visual property values of the portion of the background content that is under the user interface overlay element and a current display mode. For example, the current display mode corresponds to one of a light display mode or a dark display mode. As described above with reference to the method 800 in FIGS. 8A-8C (and specifically blocks 806 and 808), the electronic device selects an appearance function for the UI overlay element based on the current display mode of the electronic device (e.g., light display mode or dark display mode).

Updating the visual property values of the user interface overlay element based on the underlying background content and the current display mode provides an efficient mechanism for a user to distinguish between the user interface overlay element and the background content, thus reducing the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

It should be understood that the particular order in which the operations in FIGS. 11A-11C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 1000 and 1300) are also applicable in an analogous manner to method 1100 described above with respect to FIGS. 11A-11C. For example, the inputs, user interface elements, visual property values, and appearances described above with reference to method 1100 optionally have one or more of the characteristics of the inputs, user interface elements, visual property values, and appearances described herein with reference to other methods described herein (e.g., the methods 1000 and 1300). For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 11A-11C, optionally, implemented by components depicted in FIGS. 1A and 1B. For example, the inputs, user interface elements, visual property values, and appearances are, optionally, implemented by the event sorter 170, the event recognizer 180, and the event handler 190. The event monitor 171 in the event sorter 170 detects a contact on touch-sensitive surface 451, and the event dispatcher module 174 delivers the event information to application 136-1. A respective event recognizer 180 of application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

FIGS. 12A-12I illustrate example user interfaces for changing an appearance of a first user interface element in order to change a relative degree of contrast between the first user interface element and a second user interface element in response to detecting a change in ambient light detected by an electronic device in accordance with some embodiments. The user interfaces in these figures are used to illustrate the processes described below, including the processes in FIGS. 13A-13D. Although some of the examples which follow will be given with reference to inputs on a touchscreen display (where the touch-sensitive surface and the display are combined), in some embodiments, the device detects inputs on a touch-sensitive surface 451 that is separate from the display 450, as shown in FIG. 4B.

Figure 12A:
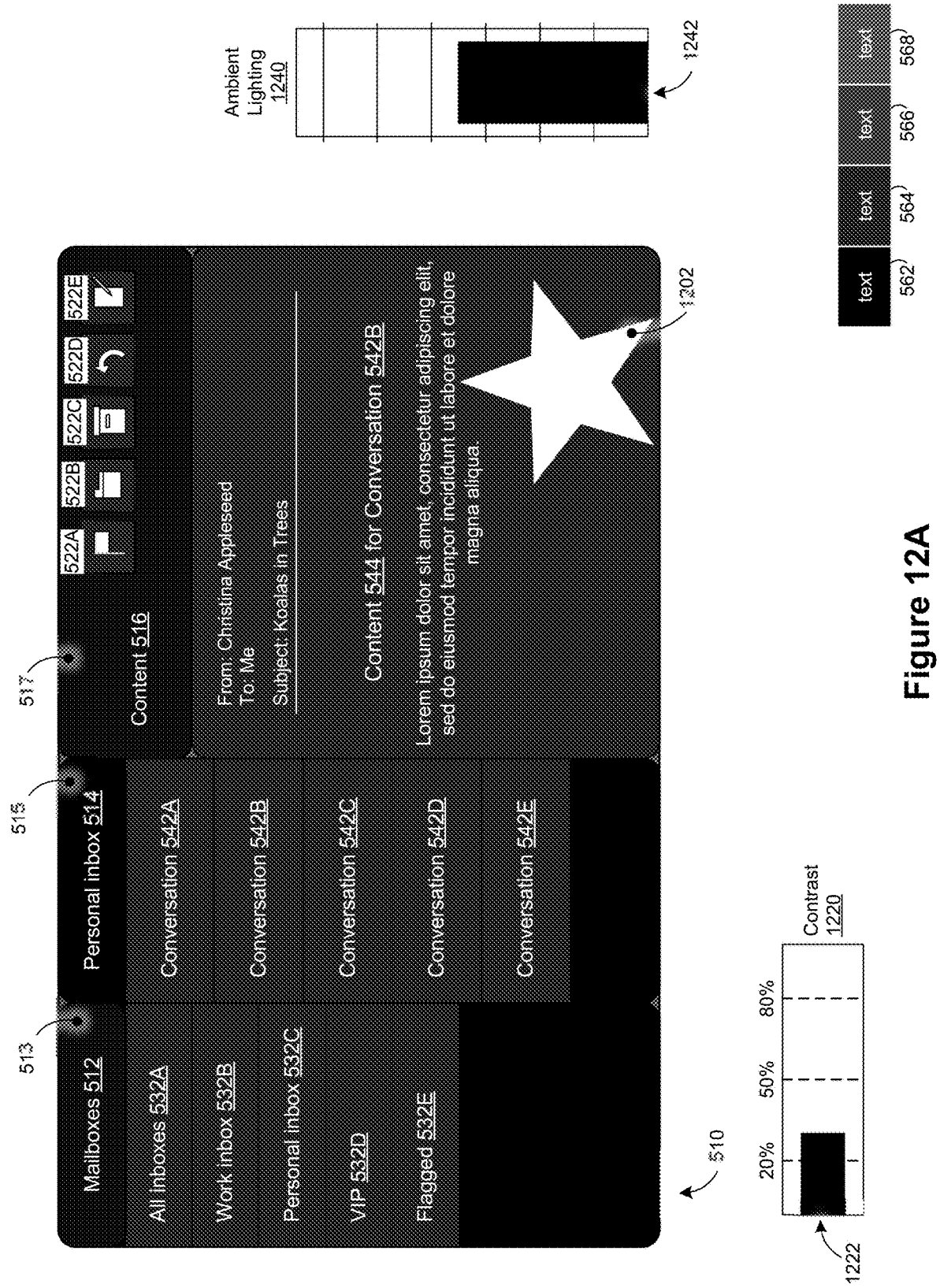
FIGS. 12A-12I illustrate example user interfaces for changing an appearance of a first user interface element in order to change a relative degree of contrast between the first user interface element and a second user interface element in response to detecting a change in ambient light detected by an electronic device in accordance with some embodiments.
Figure 12B:
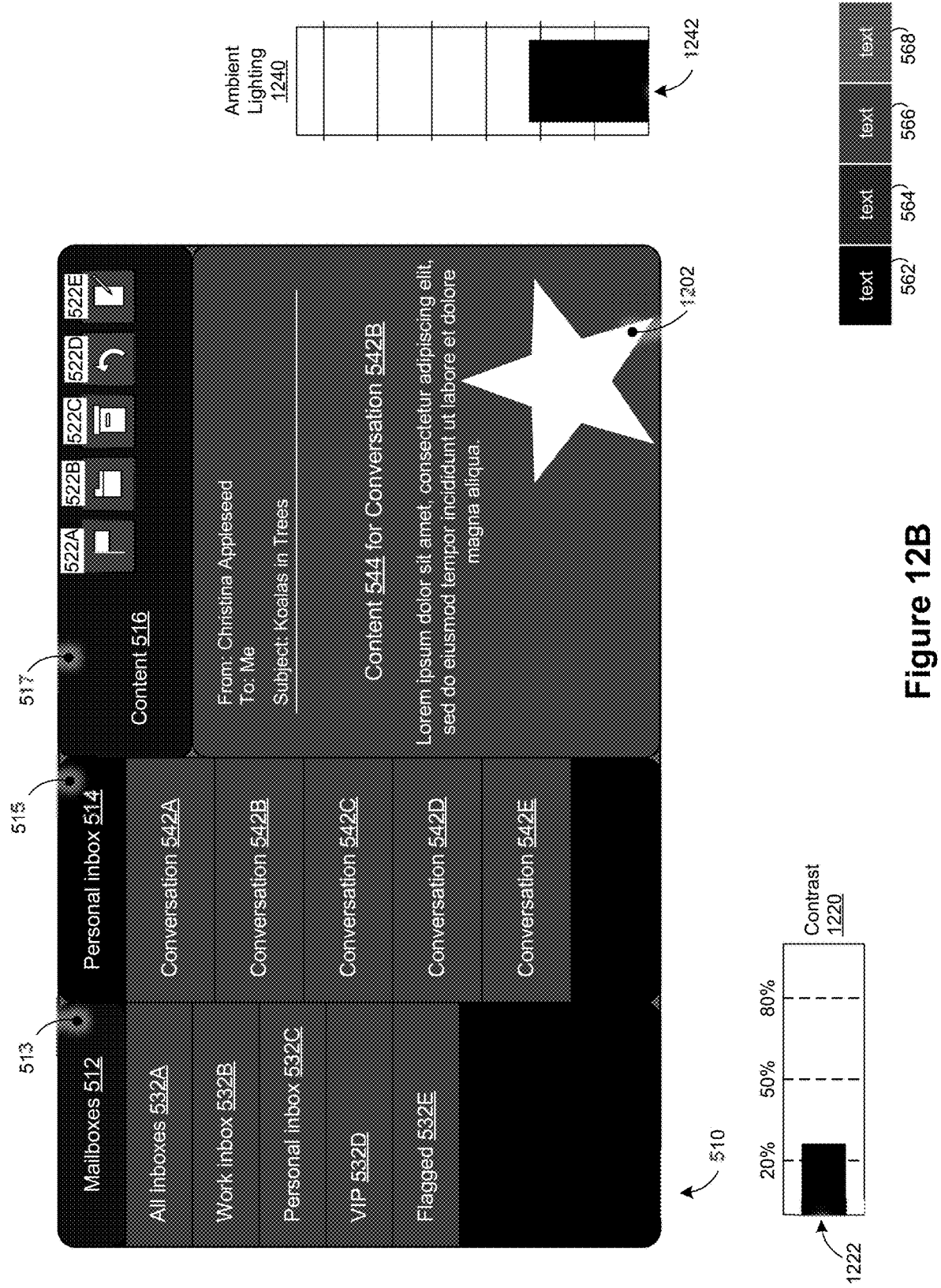
Figure 12C:
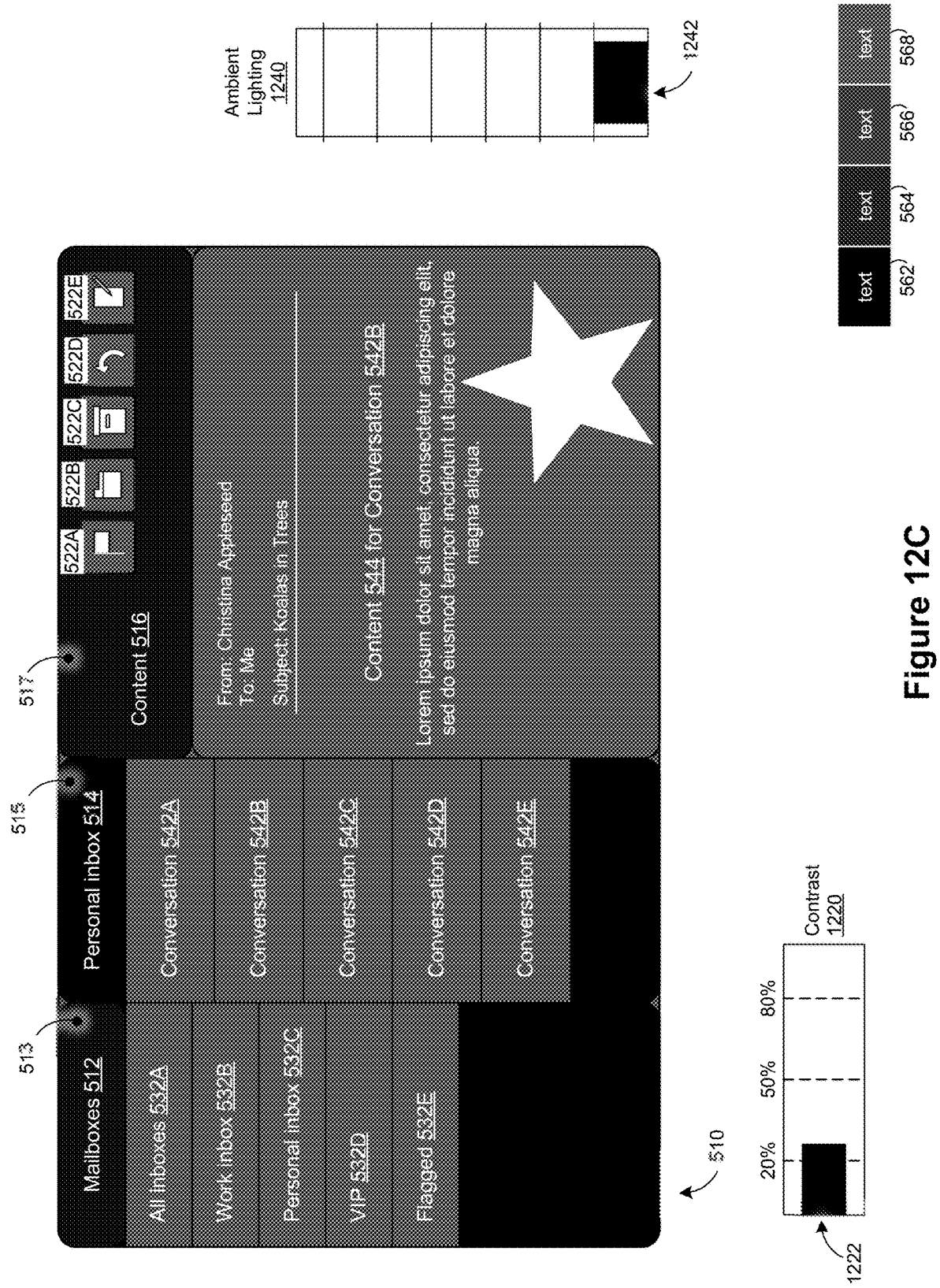

FIGS. 12A-12C illustrate a sequence in which an appearance of a foreground user interface element is changed in order to change a relative degree of contrast between the foreground user interface elements and background user interface elements in response to detecting a change in ambient light detected by the electronic device in accordance with some embodiments. As shown in FIG. 12A, while displaying the email application window 510 in the full-screen view according to the second display mode (e.g., the dark display mode), the electronic device displays the chrome regions 513, 515, and 517 (e.g., the background user interface elements) with a set of display properties 562 (e.g., white text with a 100% black background fill). As shown in FIG. 12A, while displaying the email application window 510 in the full-screen view according to the second display mode, the electronic device displays the content region 544, the inbox affordances 532, the conversation affordances 542, and the action affordances 522 (or the background thereof) (e.g., the foreground user interface elements) with a set of display properties 564 (e.g., white text with an 85% black background fill). For example, the content region 544 includes an image 1202 with a substantially white appearance.

As shown in FIG. 12A, a contrast indicator 1220 includes a contrast value 1222 that corresponds to a relative degree of contrast between the dark foreground user interface elements (e.g., the content region 544, the inbox affordances 532, the conversation affordances 542, and the action affordances 522) and the darker background user interface elements (e.g., the chrome regions 513, 515, and 517). According to some embodiments, the electronic device is configured to change a respective display property associated with the foreground user interface elements when the contrast value 1222 falls below a first threshold contrast value (e.g., 20%) or exceeds a second threshold contrast value (80%) in order to maintain the contrast value 1222 within a predefined contrast window (e.g., 20% to 80%). As shown in FIG. 12A, an ambient lighting indicator 1240 includes an illumination value 1242 detected by the electronic device.

For example, the electronic device detects a first decrease of the illumination value 1242 between FIGS. 12A and 12B, which causes the contrast value 1222 to fall below the first threshold contrast value (e.g., 20%). In response to the first decrease of the illumination value 1242 that causes the contrast value 1222 to fall below the first threshold contrast value, the electronic device changes an appearance of the foreground user interface elements (e.g., the content region 544, the inbox affordances 532, the conversation affordances 542, and the action affordances 522) in FIG. 12B. For example, the electronic device lightens the appearance of the foreground user interface elements in FIG. 12B in order to set the contrast value 1222 above the first threshold contrast value (e.g., 20%). According to some embodiments, the foreground user interface elements may appear unchanging between FIGS. 12A and 12B to the user due to the change in ambient lighting or screen brightness.

As shown in FIG. 12B, the electronic device changes the appearance of the content region 544, the inbox affordances 532, the conversation affordances 542, and the action affordances 522 to be displayed with the set of display properties 566 (e.g., white text with a 75% black background fill). As such, in FIG. 12B, the contrast value 1222 is within the predefined contrast window (e.g., 20% to 80%). As shown in FIG. 12B, the electronic device maintains the appearance of the image 1202.

For example, the electronic device detects a second decrease of the illumination value 1242 between FIGS. 12B and 12C, which causes the contrast value 1222 to fall below the first threshold contrast value (e.g., 20%) again. As shown in FIG. 12C, the illumination value 1242 is lower than in FIGS. 12A and 12B. In response to the second decrease of the illumination value 1242 that causes the contrast value 1222 to fall below the first threshold contrast value, the electronic device changes the appearance of the foreground user interface elements (e.g., the content region 544, the inbox affordances 532, the conversation affordances 542, and the action affordances 522) in FIG. 12C. For example, the electronic device further lightens the appearance of the foreground user interface elements in FIG. 12C in order to set the contrast value 1222 above the first threshold contrast value (e.g., 20%). According to some embodiments, the foreground user interface elements may appear unchanging between FIGS. 12B and 12C to the user due to the change in ambient lighting or screen brightness.

As shown in FIG. 12C, the electronic device changes the appearance of the content region 544, the inbox affordances 532, the conversation affordances 542, and the action affordances 522 to be displayed with the set of display properties 568 (e.g., white text with a 65% black background fill). As such, in FIG. 12C, the contrast value 1222 is within the predefined contrast window (e.g., 20% to 80%). As shown in FIG. 12C, the electronic device maintains the appearance of the image 1202.

Figure 12D:
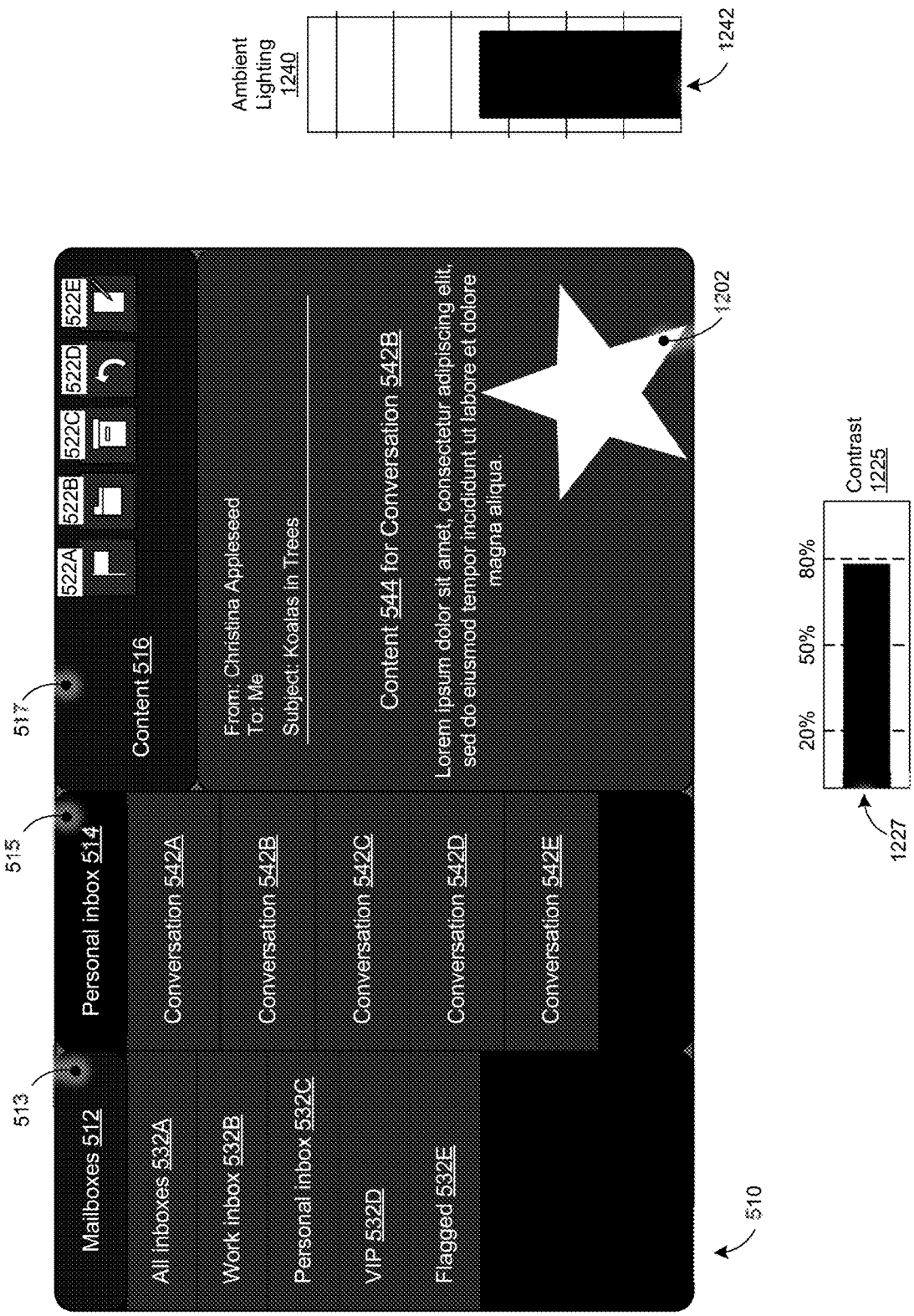
Figure 12E:
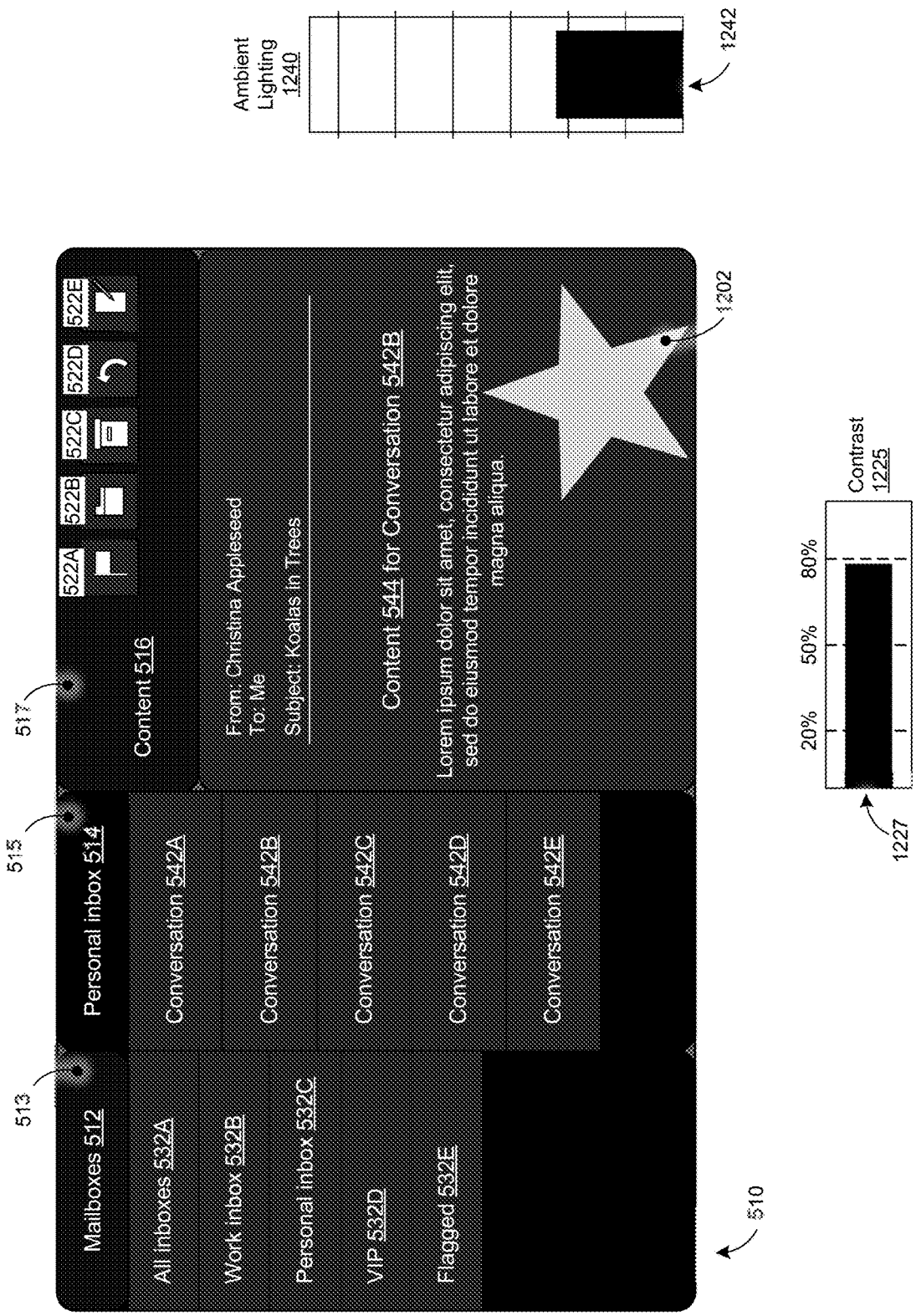
Figure 12F:
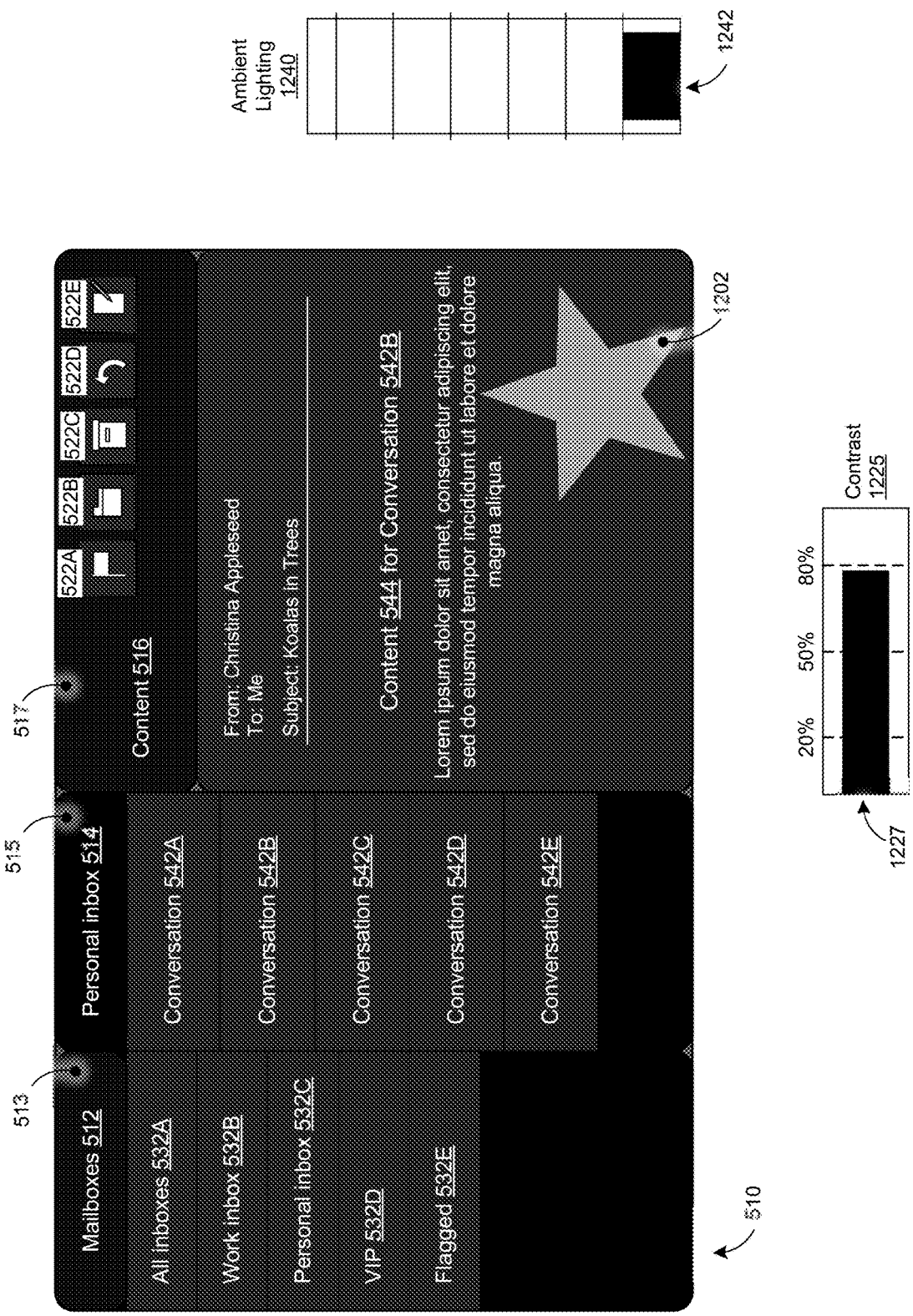

FIGS. 12D-12F illustrate a sequence in which an appearance of a foreground user interface element is changed in order to change a relative degree of contrast between the foreground user interface elements and background user interface elements in response to detecting a change in ambient light detected by the electronic device in accordance with some embodiments. As shown in FIG. 12D, while displaying the email application window 510 in the full-screen view according to the second display mode (e.g., the dark display mode), the electronic device displays the chrome regions 513, 515, and 517 (e.g., the background user interface elements) with a set of display properties 562 (e.g., white text with a 100% black background fill). As shown in FIG. 12D, while displaying the email application window 510 in the full-screen view according to the second display mode, the electronic device displays the image 1202 (e.g., the foreground user interface element) with a first appearance (e.g., 100% white or unaltered) within the content region 544.

As shown in FIG. 12D, a contrast indicator 1225 includes a contrast value 1227 that corresponds to a relative degree of contrast between the white foreground user interface element (e.g., the image 1202) and the darker background user interface elements (e.g., the chrome regions 513, 515, and 517). According to some embodiments, the electronic device is configured to change a respective display property associated with the white foreground user interface element when the contrast value 1227 falls below a first threshold contrast value (e.g., 10%, 15%, 20%, etc.) or exceeds a second threshold contrast value (80%, 85%, 90%, etc.) in order to maintain the contrast value 1227 within a predefined contrast window (e.g., 20% to 80%, 15% to 85%, 10% to 90%, etc.). As shown in FIG. 12D, an ambient lighting indicator 1240 includes an illumination value 1242 detected by the electronic device.

For example, the electronic device detects a first decrease of the illumination value 1242 between FIGS. 12D and 12E, which causes the contrast value 1227 to exceed the second threshold contrast value (e.g., 80%). In response to the first decrease of the illumination value 1242 that causes the contrast value 1227 to exceed the second threshold contrast value, the electronic device changes an appearance of the white foreground user interface element (e.g., the image 1202) in FIG. 12E. For example, the electronic device darkens the appearance of the image 1202 in FIG. 12E in order to set the contrast value 1227 below the second threshold contrast value (e.g., 80%). According to some embodiments, the foreground user interface element may appear unchanging between FIGS. 12D and 12E to the user due to the change in ambient lighting or screen brightness.

As shown in FIG. 12E, the electronic device changes the appearance of the image 1202 to a second appearance (e.g., 85% white or a light gray color). As such, in FIG. 12E, the contrast value 1227 is within the predefined contrast window (e.g., 20% to 80%). As shown in FIG. 12E, the electronic device maintains the appearance of the content region 544, the inbox affordances 532, the conversation affordances 542, and the action affordances 522 (e.g., with the set of display properties 564).

For example, the electronic device detects a second decrease of the illumination value 1242 between FIGS. 12E and 12F, which causes the contrast value 1227 to exceed the second threshold contrast value (e.g., 80%) again. As shown in FIG. 12F, the illumination value 1242 is lower than in FIGS. 12D and 12E. In response to the second decrease of the illumination value 1242 that causes the contrast value 1227 to exceed the second threshold contrast value, the electronic device changes an appearance of the white foreground user interface element (e.g., the image 1202) in FIG. 12F. For example, the electronic device further darkens the appearance of the image 1202 in FIG. 12F in order to set the contrast value 1227 below the second threshold contrast value (e.g., 80%). According to some embodiments, the foreground user interface element may appear unchanging between FIGS. 12E and 12F to the user due to the change in ambient lighting or screen brightness.

As shown in FIG. 12F, the electronic device changes the appearance of the image 1202 to a third appearance (e.g., 75% white or a medium gray color). As such, in FIG. 12F, the contrast value 1227 is within the predefined contrast window (e.g., 20% to 80%). As shown in FIG. 12F, the electronic device maintains the appearance of the content region 544, the inbox affordances 532, the conversation affordances 542, and the action affordances 522 (e.g., with the set of display properties 564).

Figure 12G:
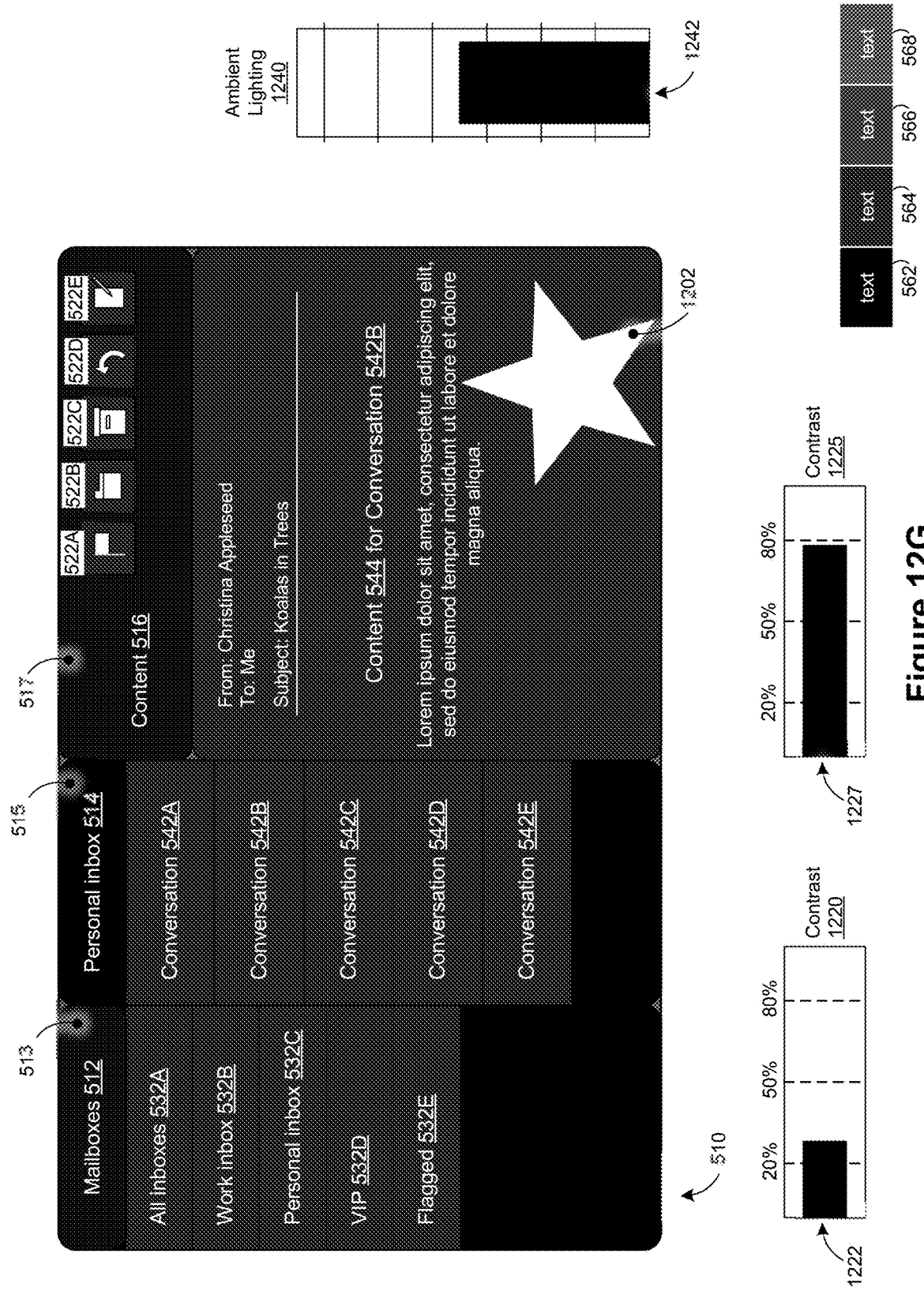
Figure 12H:
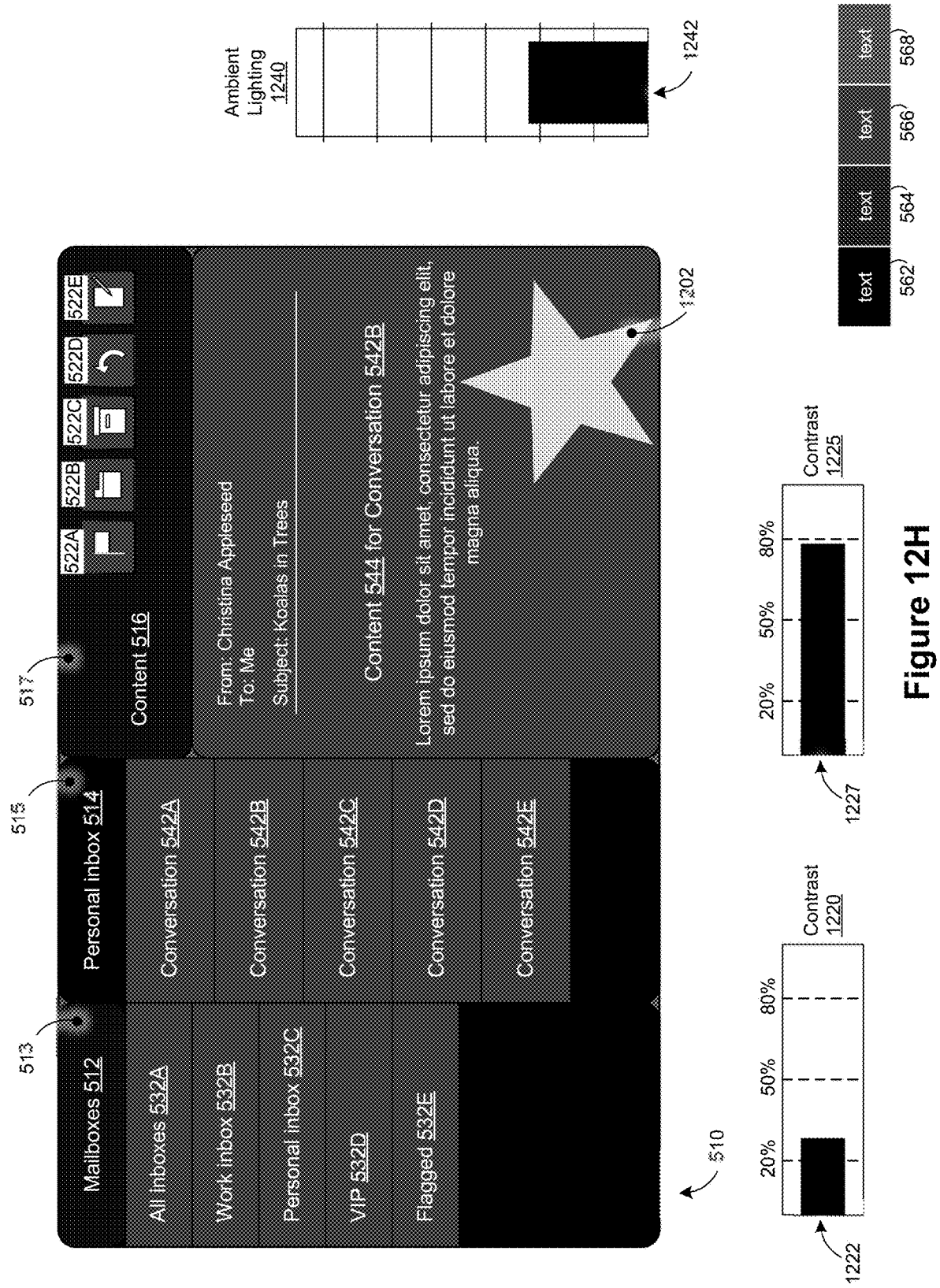
Figure 12I:
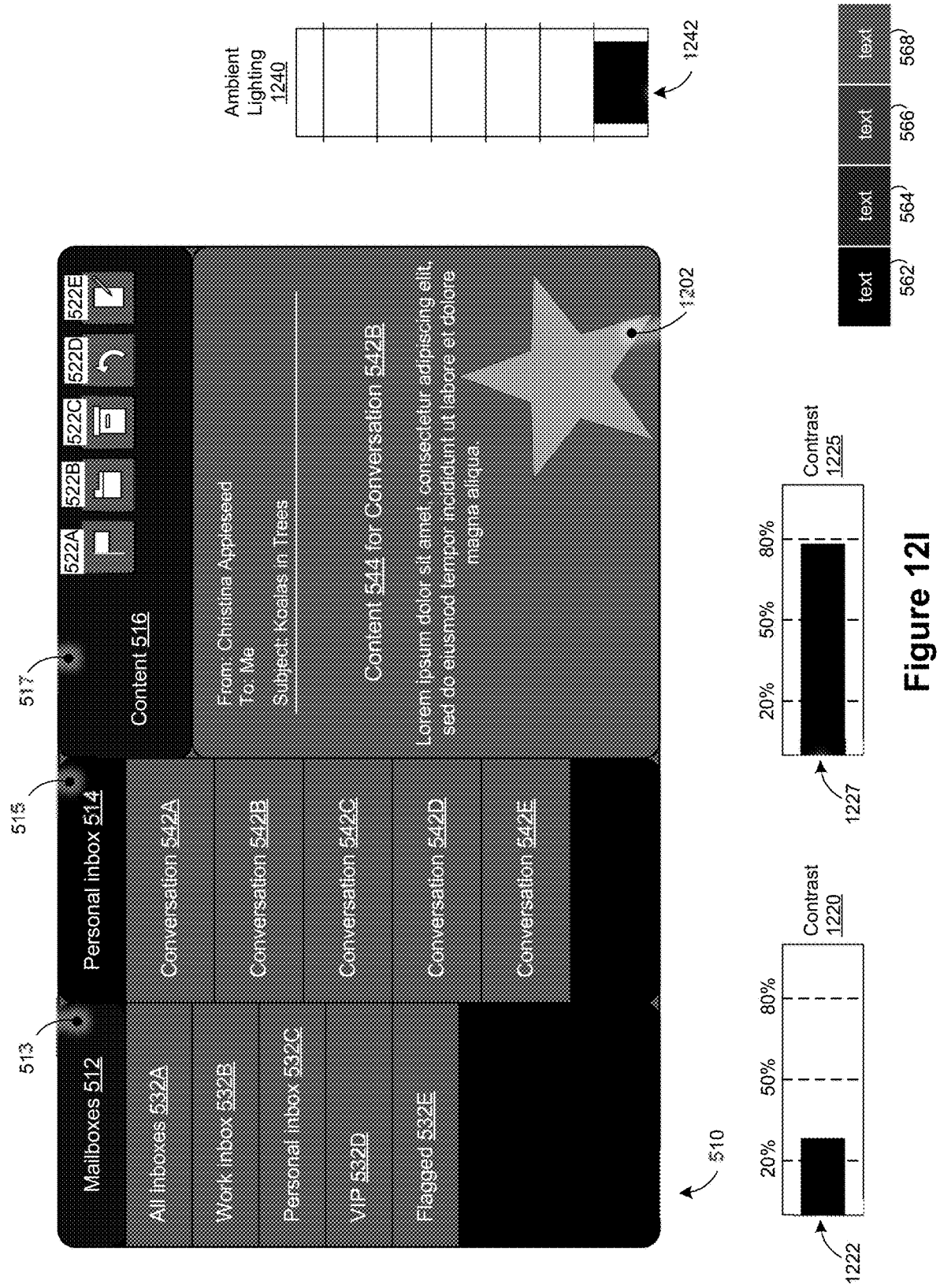
Figure 13A:
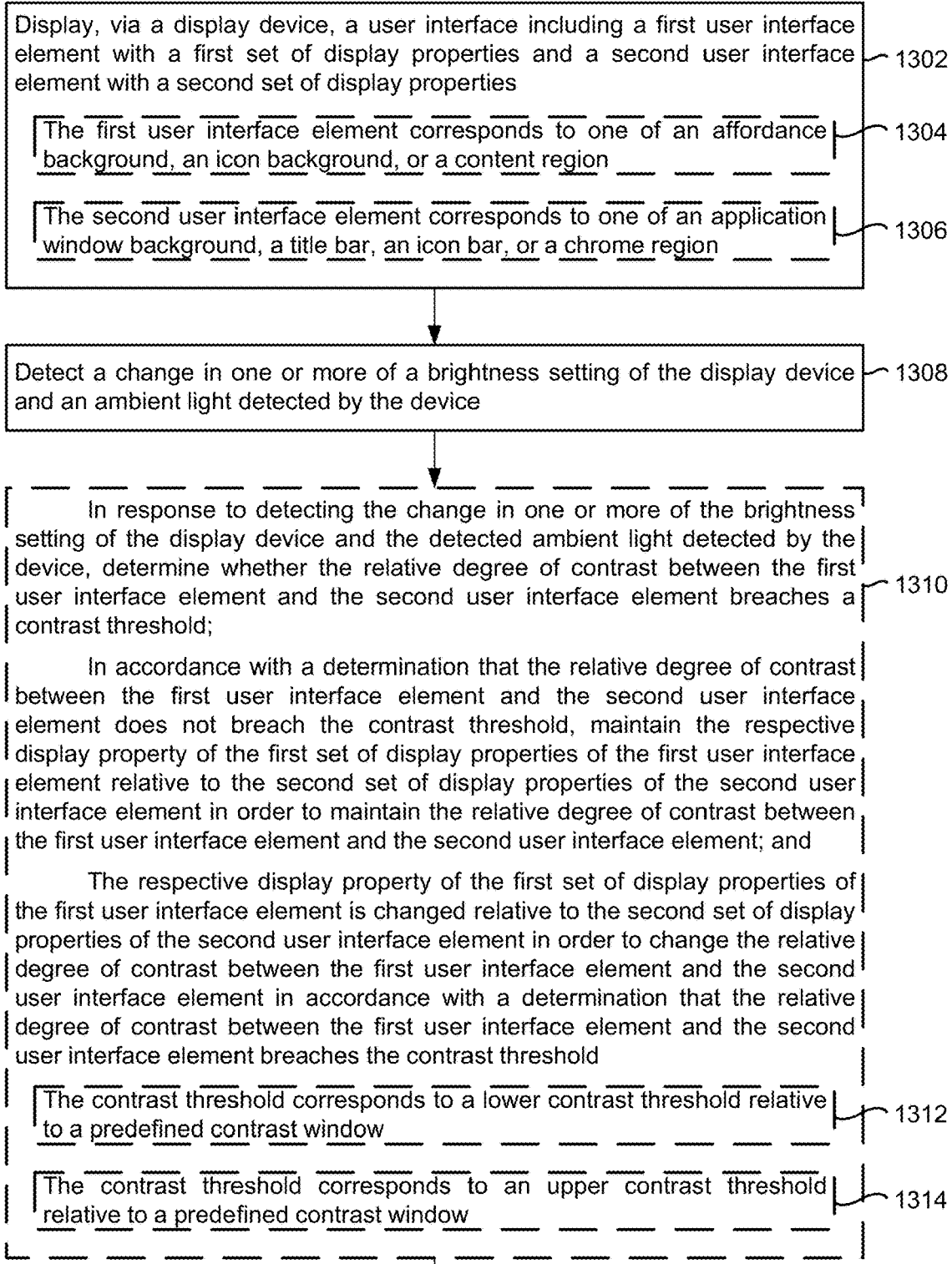
Figure 13D:
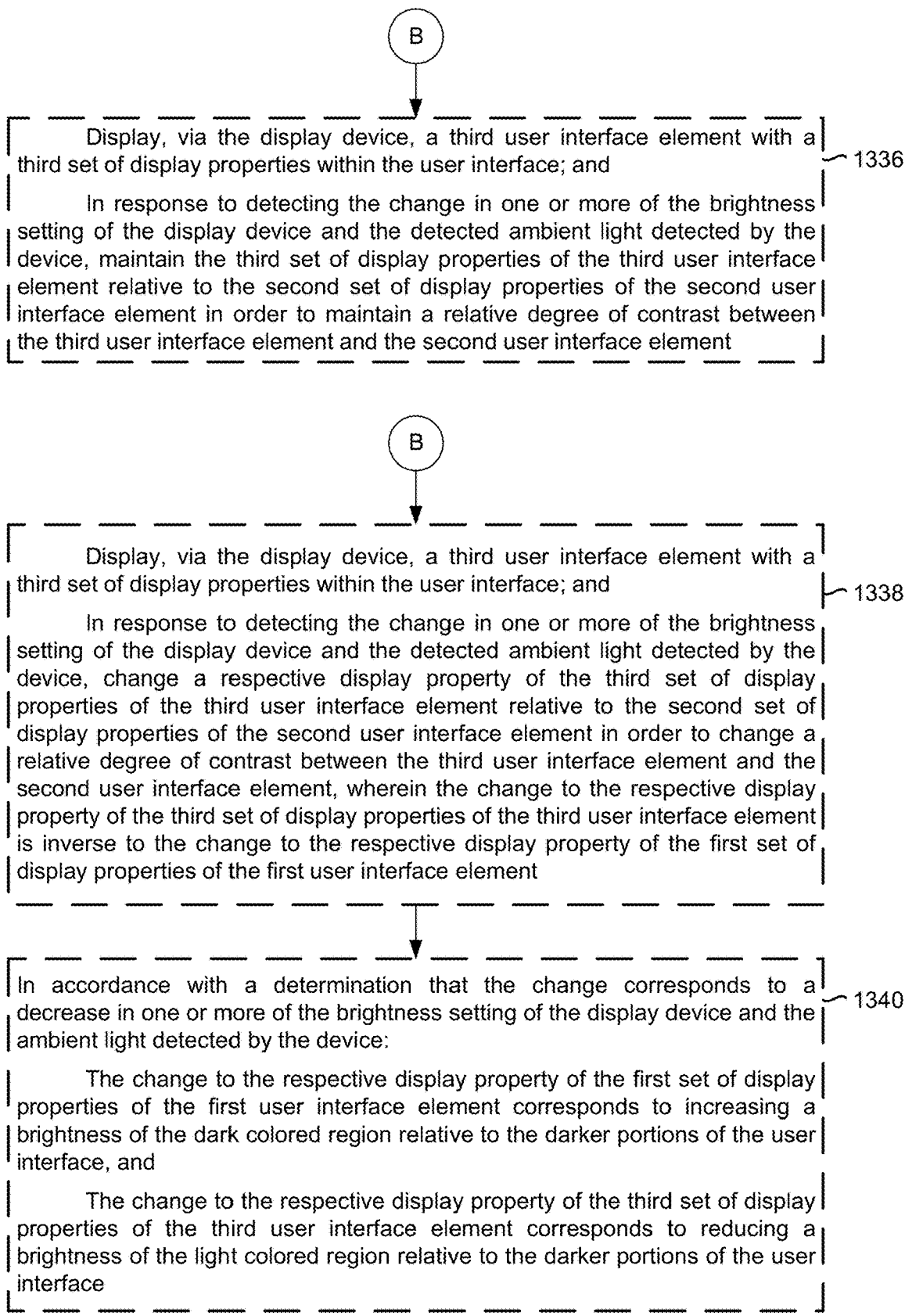

FIGS. 12G-12I illustrate a sequence in which the appearances of a first set of foreground user interface elements and a second foreground user interface element are changed in a divergent fashion in order to change a first relative degree of contrast between the first set of dark foreground user interface elements and darker background user interface elements and a second relative degree of contrast between the second foreground user interface elements and the darker background user interface elements in response to detecting a change in ambient light detected by the electronic device in accordance with some embodiments.

As shown in FIG. 12G, while displaying the email application window 510 in the full-screen view according to the second display mode (e.g., the dark display mode), the electronic device displays the chrome regions 513, 515, and 517 (e.g., the background user interface elements) with a set of display properties 562 (e.g., white text with a 100% black background fill). As shown in FIG. 12G, while displaying the email application window 510 in the full-screen view according to the second display mode, the electronic device displays the content region 544, the inbox affordances 532, the conversation affordances 542, and the action affordances 522 (or the background thereof) (e.g., the first set of foreground user interface elements) with a set of display properties 564 (e.g., white text with an 85% black background fill). As shown in FIG. 12G, while displaying the email application window 510 in the full-screen view according to the second display mode, the electronic device displays the image 1202 (e.g., the second foreground user interface element) with a first appearance (e.g., 100% white or unaltered) within the content region 544.

As shown in FIG. 12G, the contrast indicator 1220 includes the contrast value 1222 that corresponds to the relative degree of contrast between the first set of foreground user interface elements (e.g., the content region 544, the inbox affordances 532, the conversation affordances 542, and the action affordances 522) and the background user interface elements (e.g., the chrome regions 513, 515, and 517). According to some embodiments, the electronic device is configured to change a respective display property associated with the first set of foreground user interface elements when the contrast value 1222 falls below a first threshold contrast value (e.g., 20%) or exceeds a second threshold contrast value (80%) in order to maintain the contrast value 1222 within a predefined contrast window (e.g., 20% to 80%).

As shown in FIG. 12G, the contrast indicator 1225 includes the contrast value 1227 that corresponds to the relative degree of contrast between the second foreground user interface element (e.g., the image 1202) and the background user interface elements (e.g., the chrome regions 513, 515, and 517). According to some embodiments, the electronic device is configured to change a respective display property associated with the second foreground user interface element when the contrast value 1227 falls below a first threshold contrast value (e.g., 20%) or exceeds a second threshold contrast value (80%) in order to maintain the contrast value 1227 within a predefined contrast window (e.g., 20% to 80%). As shown in FIG. 12G, an ambient lighting indicator 1240 includes an illumination value 1242 detected by the electronic device.

For example, the electronic device detects a first decrease of the illumination value 1242 between FIGS. 12G and 12H, which causes the contrast value 1222 to fall below the first threshold contrast value (e.g., 20%) and also causes the contrast value 1227 to exceed the second threshold contrast value (e.g., 80%). In response to the first decrease of the illumination value 1242 that causes the contrast value 1222 to fall below the first threshold contrast value, the electronic device changes an appearance of the first set of foreground user interface elements (e.g., the content region 544, the inbox affordances 532, the conversation affordances 542, and the action affordances 522) in FIG. 12H. For example, the electronic device lightens the appearance of the first set of foreground user interface elements in FIG. 12H in order to set the contrast value 1222 above the first threshold contrast value (e.g., 20%). According to some embodiments, the magnitude of the change in the appearance of the first set of foreground user interface elements is based on the size or surface area of the first set of foreground user interface elements. In some embodiments, the In response to the first decrease of the illumination value 1242 that causes the contrast value 1227 to exceed the second threshold contrast value, the electronic device changes an appearance of the second foreground user interface element (e.g., the image 1202) in FIG. 12H. For example, the electronic device darkens the appearance of the second foreground user interface element in FIG. 12H in order to set the contrast value 1227 below the second threshold contrast value (e.g., 80%). According to some embodiments, the magnitude of the change in the appearance of the second foreground user interface element is based on the size or surface area of the second foreground user interface element. In some embodiments, the first set of foreground user interface elements are lightened more slowly than the second foreground user interface element is darkened. In some embodiments, the first set of foreground user interface elements are lightened more quickly than the second foreground user interface element is darkened.

As shown in FIG. 12H, the electronic device changes the appearance of the content region 544, the inbox affordances 532, the conversation affordances 542, and the action affordances 522 to be displayed with the set of display properties 566 (e.g., white text with a 75% black background fill). As such, in FIG. 12H, the contrast value 1222 is within the predefined contrast window (e.g., 20% to 80%). Also, as shown in FIG. 12H, the electronic device changes the appearance of the image 1202 to a second appearance (e.g., 85% white or a light gray color). As such, in FIG. 12H, the contrast value 1227 is within the predefined contrast window (e.g., 20% to 80%).

For example, the electronic device detects a second decrease of the illumination value 1242 between FIGS. 12H and 12I, which causes the contrast value 1222 to again fall below the first threshold contrast value (e.g., 20%) and also causes the contrast value 1227 to again exceed the second threshold contrast value (e.g., 80%). As shown in FIG. 12I, the illumination value 1242 is lower than in FIGS. 12G and 12H. In response to the second decrease of the illumination value 1242 that causes the contrast value 1222 to fall below the first threshold contrast value, the electronic device changes an appearance of the first set of foreground user interface elements (e.g., the content region 544, the inbox affordances 532, the conversation affordances 542, and the action affordances 522) in FIG. 12I. For example, the electronic device further lightens the appearance of the first set of foreground user interface elements in FIG. 12I in order to set the contrast value 1222 above the first threshold contrast value (e.g., 20%).

In response to the second decrease of the illumination value 1242 that causes the contrast value 1227 to again exceed the second threshold contrast value, the electronic device changes an appearance of the second foreground user interface element (e.g., the image 1202) in FIG. 12I. For example, the electronic device further darkens the appearance of the image 1202 in FIG. 12I in order to set the contrast value 1227 below the second threshold contrast value (e.g., 80%).

As shown in FIG. 12I, the electronic device changes the appearance of the content region 544, the inbox affordances 532, the conversation affordances 542, and the action affordances 522 to be displayed with the set of display properties 568 (e.g., white text with a 65% black background fill). As such, in FIG. 12I, the contrast value 1222 is within the predefined contrast window (e.g., 20% to 80%). Also, as shown in FIG. 12I, the electronic device changes the appearance of the image 1202 to a third appearance (e.g., 75% white or a medium gray color). As such, in FIG. 12I, the contrast value 1227 is within the predefined contrast window (e.g., 20% to 80%).

FIGS. 13A-13D illustrate a flow diagram of a method 1300 of changing an appearance of a first user interface element in order to change a relative degree of contrast between the first user interface element and a second user interface element in response to detecting a change in lighting conditions in accordance with some embodiments. The method 1300 is performed at an electronic device (e.g., the portable multifunction device 100 in FIG. 1A, or the device 300 in FIG. 3) with one or more processors, non-transitory memory, a display device, and one or more optional input devices. In some embodiments, the display is a touchscreen display and the input device is on or integrated with the display. In some embodiments, the display is separate from the input device. Some operations in method 1300 are, optionally, combined and/or the order of some operations is, optionally, changed.

As described below, the method 1300 reduces eye strain when navigating and manipulating user interfaces under poor or otherwise unsatisfactory lighting conditions, which creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

The device displays (1302), via the display device, a user interface including a first user interface element with a first set of display properties and a second user interface element with a second set of display properties. In some embodiments, the first user interface element corresponds to a foreground user interface element, and the second user interface element corresponds to a background user interface element. As one example, while operating in the dark display mode, the user interface corresponds to an application window (e.g., email, messaging, web browser, etc.). Continuing with this example, the second user interface element corresponds to a background, an icon bar, a title bar, a chrome bar, and/or the like of the application window with the second set of display properties. Continuing with this example, the first user interface element corresponds to an affordance/button background/platter, an icon background/platter, content region, and/or the like of the application window with the first set of display properties. In some embodiments, the first user interface element is accompanied by a drop shadow.

For example, as shown in FIG. 12A, while displaying an email application window 510 in the full-screen view according to the second display mode (e.g., the dark display mode), the electronic device displays the chrome regions 513, 515, and 517 (e.g., the background user interface elements or second user interface element) with a second set of display properties 562 (e.g., white text with a 100% black background fill) and the content region 544, the inbox affordances 532, the conversation affordances 542, and the action affordances 522 (or the background thereof) (e.g., the foreground user interface elements or first user interface element) with a first set of display properties 564 (e.g., white text with an 85% black background fill).

In some embodiments, the first set of display properties is associated with an appearance of a background, text, content, icon, and/or the like within the first user interface element. In some embodiments, the second set of display properties is associated with an appearance of a background, text, content, icon, and/or the like within the second user interface element. In some embodiments, the second set of display properties is associated with a black or pure black background that blends the second user interface element into the device hardware/bezel. In some embodiments, the second set of display properties is associated with a contrasting text color such as white or gray. In some embodiments, the first set of display properties is associated with a gray background with a lighter hue or increased brightness as compared to the second set of display properties associated with the black or pure black background. In some embodiments, the first set of display properties is associated a contrasting text color such as white or gray. In some embodiments, the first set of display properties is independent of the color or content of the first and second user interface elements. In some embodiments, the first set of display properties is dependent on the color or content of the second user interface element. In some embodiments, the first set of display properties is dependent on the color or content of the first user interface element.

In some embodiments, the first user interface element corresponds to one of (1304) an affordance background, an icon background, or a content region. As shown in FIG. 12A, for example, the first user interface element corresponds to one of the content region 544, the inbox affordances 532, the conversation affordances 542, and the action affordances 522 (or the background thereof) (e.g., the foreground user interface elements) with a first set of display properties 564 (e.g., white text with an 85% black background fill).

In some embodiments, the second user interface element corresponds to one of (1306) an application window background, a title bar, an icon bar, or a chrome region. As shown in FIG. 12A, for example, the second user interface element corresponds to one of the chrome regions 513, 515, and 517 (e.g., the background user interface elements) with a second set of display properties 562 (e.g., white text with a 100% black background fill).

The device detects (1308) a change in one or more of a brightness setting of the display device and an ambient light detected by the device. For example, a user of the electronic device adjusts the screen brightness using the screen brightness slider 6130 shown within the controls user interface 6120 in FIG. 6H. For example, the electronic device includes an ambient light sensor that detects ambient light proximate to the display device and/or the displayed user interface.

In some embodiments, the device (1310): determines whether the relative degree of contrast between the first user interface element and the second user interface element breaches a contrast threshold in response to detecting the change in one or more of the brightness setting of the display device and the detected ambient light detected by the device; in accordance with a determination that the relative degree of contrast between the first user interface element and the second user interface element does not breach the contrast threshold, maintains the respective display property of the first set of display properties of the first user interface element relative to the second set of display properties of the second user interface element in order to maintain the relative degree of contrast between the first user interface element and the second user interface element; and in accordance with a determination that the relative degree of contrast between the first user interface element and the second user interface element breaches the contrast threshold, changes the respective display property of the first set of display properties of the first user interface element relative to the second set of display properties of the second user interface element in order to change the relative degree of contrast between the first user interface element and the second user interface element in accordance with a determination that the relative degree of contrast between the first user interface element and the second user interface element breaches the contrast threshold (as described below with reference to block 1316). Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, in response to detecting the change, the device determines whether a contrast value associated with the relative degree of contrast between the first user interface element and the second user interface element breaches a predefined contrast threshold (e.g., an upper or lower bound of a contrast window). In some embodiments, the relative degree of contrast between the first user interface element and the second user interface element breaches the predefined threshold when a value associated with the relative degree of contrast is lower than or equal to a lower contrast threshold. In some embodiments, the relative degree of contrast between the first user interface element and the second user interface element breaches the predefined threshold when a value associated with the relative degree of contrast is higher than or equal to an upper contrast threshold.

In accordance with a determination that the change causes the contrast value between the first user interface element and the second user interface element to breach the predefined contrast threshold, the device changes the respective display property of the first set of display properties of the first user interface element relative to the second set of display properties of the second user interface element in order to set the contrast value between the first user interface element and the second user interface element within a contrast window. In accordance with a determination that the change does not cause the contrast value between the first user interface element and the second user interface element to breach the predefined contrast threshold, the device maintains the first user interface element with the first set of display properties. As such, for example, the device compresses the relative contrast between the first and second user interface elements within a 20-80% range. In this example, if the contrast is below the 20% lower contrast threshold, the mitigation process is triggered. Also, in this example, if the contrast is above the 80% upper contrast threshold, the mitigation process is triggered.

In some embodiments, the contrast threshold corresponds to (1312) a lower contrast threshold relative to a predefined contrast window. For example, the device compresses the contrast between the first and second regions within a 20-80% range. In this example, if the contrast is below the 20% threshold, the mitigation process is triggered. As one example, the electronic device detects a first decrease of the illumination value 1242 between FIGS. 12A and 12B, which causes the contrast value 1222 to fall below the first threshold contrast value (e.g., 20%). In response to the first decrease of the illumination value 1242 that causes the contrast value 1222 to fall below the first threshold contrast value, the electronic device changes an appearance of the foreground user interface elements (e.g., the content region 544, the inbox affordances 532, the conversation affordances 542, and the action affordances 522) in FIG. 12B. For example, the electronic device lightens the appearance of the foreground user interface elements in FIG. 12B in order to set the contrast value 1222 above the first threshold contrast value (e.g., 20%).

In some embodiments, the contrast threshold corresponds to (1314) an upper contrast threshold relative to a predefined contrast window. For example, the device compresses the contrast between the first and second regions within a 20-80% range. In this example, if the contrast is above the 80% threshold, the mitigation process is triggered. As another example, the electronic device detects a first decrease of the illumination value 1242 between FIGS. 12D and 12E, which causes the contrast value 1227 to exceed the second threshold contrast value (e.g., 80%). In response to the first decrease of the illumination value 1242 that causes the contrast value 1227 to exceed the second threshold contrast value, the electronic device changes an appearance of the white foreground user interface element (e.g., the image 1202) in FIG. 12E. For example, the electronic device darkens the appearance of the image 1202 in FIG. 12E in order to set the contrast value 1227 below the second threshold contrast value (e.g., 80%).

In response to detecting the change in one or more of the brightness setting of the display device and the detected ambient light detected by the device, the device changes (1316) a respective display property of the first set of display properties of the first user interface element relative to the second set of display properties of the second user interface element in order to change a relative degree of contrast between the first user interface element and the second user interface element. In some embodiments, changing the respective display property of the first set of display properties of the first user interface element includes introducing a dimming or brightening filter overlaid on the first user interface element. In some embodiments, changing the respective display property of the first set of display properties of the first user interface element includes re-rendering the first user interface according to the change to the respective display property of the first set of display properties. In some embodiments, changing the respective display property of the first set of display properties of the first user interface element includes changing a gray level of pixels associated with a predefined color (e.g., white or black pixels within some threshold variance). In some embodiments, changing the respective display property of the first set of display properties of the first user interface element includes changing a white point of pixels associated with a predefined color (e.g., white or black pixels within some threshold variance). In some embodiments, changing the respective display property of the first set of display properties of the first user interface element includes changing a brightness or luminosity of pixels associated with a predefined color (e.g., white or black pixels within some threshold variance).

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

For example, the electronic device detects a first decrease of the illumination value 1242 between FIGS. 12A and 12B, which causes the contrast value 1222 to fall below the first threshold contrast value (e.g., 20%). In response to the first decrease of the illumination value 1242 that causes the contrast value 1222 to fall below the first threshold contrast value, the electronic device changes an appearance of the foreground user interface elements (e.g., the content region 544, the inbox affordances 532, the conversation affordances 542, and the action affordances 522) in FIG. 12B. For example, the electronic device lightens the appearance of the foreground user interface elements in FIG. 12B in order to set the contrast value 1222 above the first threshold contrast value (e.g., 20%).

Continuing with the above example, the electronic device detects a second decrease of the illumination value 1242 between FIGS. 12B and 12C, which causes the contrast value 1222 to fall below the first threshold contrast value (e.g., 20%) again. As shown in FIG. 12C, the illumination value 1242 is lower than in FIGS. 12A and 12B. In response to the second decrease of the illumination value 1242 that causes the contrast value 1222 to fall below the first threshold contrast value, the electronic device changes the appearance of the foreground user interface elements (e.g., the content region 544, the inbox affordances 532, the conversation affordances 542, and the action affordances 522) in FIG. 12C. For example, the electronic device further lightens the appearance of the foreground user interface elements in FIG. 12C in order to set the contrast value 1222 above the first threshold contrast value (e.g., 20%).

In some embodiments, the change to the respective display property of the first set of display properties of the first user interface element causes (1318) the relative degree of contrast between the first user interface element and the second user interface element to decrease in accordance with a determination that the change corresponds to a decrease in one or more of the brightness setting of the display device and the ambient light detected by the device. For example, the first user interface element corresponds to a light-colored foreground user interface element and the second user interface element corresponds to a darker background user interface element. Continuing with this example, in some embodiments, changing the respective display property of the first user interface element corresponds to decreasing its perceived luminosity by changing the brightness value, luminosity value, gray value, white point, hue value, or saturation value associated with the background, text, or another area of bright content.

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

As one example, the electronic device detects a first decrease of the illumination value 1242 between FIGS. 12D and 12E, which causes the contrast value 1227 to exceed the second threshold contrast value (e.g., 80%). In response to the first decrease of the illumination value 1242 that causes the contrast value 1227 to exceed the second threshold contrast value, the electronic device changes an appearance of the white foreground user interface element (e.g., the image 1202) in FIG. 12E. For example, the electronic device darkens the appearance of the image 1202 in FIG. 12E in order to set the contrast value 1227 below the second threshold contrast value (e.g., 80%).

In some embodiments, the change to the respective display property of the first set of display properties of the first user interface element causes (1320) the relative degree of contrast between the first user interface element and the second user interface element to increase in accordance with a determination that the change corresponds to a decrease in one or more of the brightness setting of the display device and the ambient light detected by the device. For example, the first user interface element corresponds to a dark-colored foreground user interface element and the second user interface element corresponds to a darker background user interface element. Continuing with this example, in some embodiments, changing the respective display property of the first user interface element corresponds to increasing its perceived luminosity by changing the brightness value, luminosity value, gray value, white point, hue value, or saturation value associated with the background, text, or another area of dark content.

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

As one example, the electronic device detects a first decrease of the illumination value 1242 between FIGS. 12A and 12B, which causes the contrast value 1222 to fall below the first threshold contrast value (e.g., 20%). In response to the first decrease of the illumination value 1242 that causes the contrast value 1222 to fall below the first threshold contrast value, the electronic device changes an appearance of the foreground user interface elements (e.g., the content region 544, the inbox affordances 532, the conversation affordances 542, and the action affordances 522) in FIG. 12B. For example, the electronic device lightens the appearance of the foreground user interface elements in FIG. 12B in order to set the contrast value 1222 above the first threshold contrast value (e.g., 20%).

In some embodiments, the change to the respective display property of the first set of display properties of the first user interface element causes (1322) the relative degree of contrast between the first user interface element and the second user interface element to decrease in accordance with a determination that the change corresponds to an increase in one or more of the brightness setting of the display device and the ambient light detected by the device. For example, the first user interface element corresponds to a dark-colored foreground user interface element and the second user interface element corresponds to a darker background user interface element. Continuing with this example, in some embodiments, changing the respective display property of the first user interface element corresponds to decreasing its perceived luminosity by changing the brightness value, luminosity value, gray value, white point, hue value, or saturation value associated with the background, text, or another area of dark content. As one example, this scenario corresponds to the inverse of the sequence shown in FIGS. 12A and 12B.

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the change to the respective display property of the first set of display properties of the first user interface element causes (1324) the relative degree of contrast between the first user interface element and the second user interface element to increase in accordance with a determination that the change corresponds to an increase in one or more of the brightness setting of the display device and the ambient light detected by the device. For example, the first user interface element corresponds to a light-colored foreground user interface element and the second user interface element corresponds to a darker background user interface element. Continuing with this example, in some embodiments, changing the respective display property of the first user interface element corresponds to increasing its perceived luminosity by changing the brightness value, luminosity value, gray value, white point, hue value, or saturation value associated with the background, text, or another area of dark content. As one example, this scenario corresponds to the inverse of the sequence shown in FIGS. 12D and 12E.

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the change to the respective display property of the first set of display properties of the first user interface element causes (1326) the relative degree of contrast of a light-colored region to decrease relative to darker portions of the user interface by reducing a brightness of the light-colored region relative to the darker portions of the user interface. For example, the first user interface element corresponds to chunks/blocks of white content, such as an image, text, or a text background, relative to the second user interface element corresponding to a dark background. For example, the sequence shown in FIGS. 12D-12F shows the contrast value 1227 of the white image 1202 decreasing relative to the darker portions of the user interface (e.g., the chrome regions 513, 515, and 517) by reducing a brightness of the image 1202 (or darkening the image 1202).

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, the change to the respective display property of the first set of display properties of the first user interface element causes (1328) the relative degree of contrast of a dark-colored region to increase relative to darker portions of the user interface by increasing a brightness of the dark-colored region relative to the darker portions of the user interface. For example, the first user interface element corresponds to chunks/blocks of dark content, such as an image, text, or a text background, relative to the second user interface element corresponding to a darker background. As one example, this scenario corresponds to the inverse of the sequence shown in FIGS. 12D-12F assuming the image 1202 is dark instead of white as shown therein.

Changing the respective display property of the first user interface element in order to change a relative degree of contrast between the first user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, a magnitude of the change (e.g., increase or decrease) to the relative degree of contrast between the first user interface element and the second user interface element is based at least in part on (1330) a size of the first user interface element. For example, a greater decrease/increase in the brightness of the first user interface element occurs when the first user interface element is bigger and a smaller decrease/increase in the brightness of the first user interface element occurs when the first user interface element is smaller. As one example, with reference to FIGS. 12A-12C, a rate of change or magnitude of change in relative contrast between the first user interface element (e.g., the foreground user interface elements such as the inbox affordances 532, the conversation affordances 542, and the action affordances 522 (or the background thereof)) and the second user interface element (e.g., the background user interface element such as the chrome regions 513, 515, and 517 is based on a size or other dimensional characteristic of the first user interface element (e.g., the foreground user interface elements such as the inbox affordances 532, the conversation affordances 542, and the action affordances 522 (or the background thereof)).

In some embodiments, a magnitude of the change (e.g., increase or decrease) to the relative degree of contrast between the first user interface element and the second user interface element is based at least in part on (1332) a magnitude of change in the respective display property. For example, a greater decrease/increase in the brightness of the first user interface element occurs when the relative contrast increases/decreases by a larger amount and a smaller decrease/increase in the brightness of the first user interface element when the relative contrast increases/decreases by a smaller amount. As one example, with reference to FIGS. 12A-12C, a rate of change or magnitude of change in relative contrast between the first user interface element (e.g., the foreground user interface elements such as the inbox affordances 532, the conversation affordances 542, and the action affordances 522 (or the background thereof)) and the second user interface element (e.g., the background user interface element such as the chrome regions 513, 515, and 517 is based on a rate of change or magnitude of change of the appearance of the first user interface element (e.g., the foreground user interface elements such as the inbox affordances 532, the conversation affordances 542, and the action affordances 522 (or the background thereof)).

In some embodiments, a magnitude of the change (e.g., increase or decrease) to the relative degree of contrast between the first user interface element and the second user interface element is based at least in part on (1334) a type of content associated with the first user interface element. For example, a greater decrease/increase in the brightness of the first user interface element occurs when the first user interface element includes a first type of content (e.g., light-colored background) and a smaller decrease/increase in the brightness of the first user interface element when the first user interface element includes a second type of content (e.g., a large block of light-colored text). As one example, with reference to FIGS. 12A-12C, a rate of change or magnitude of change in relative contrast between the first user interface element (e.g., the foreground user interface elements such as the inbox affordances 532, the conversation affordances 542, and the action affordances 522 (or the background thereof)) and the second user interface element (e.g., the background user interface element such as the chrome regions 513, 515, and 517 is based on a content type, window type, or the like associated with the first user interface element (e.g., the foreground user interface elements such as the inbox affordances 532, the conversation affordances 542, and the action affordances 522 (or the background thereof)).

In some embodiments, the device (1336): displays, via the display device, a third user interface element with a third set of display properties within the user interface; and, in response to detecting the change in one or more of the brightness setting of the display device and the detected ambient light detected by the device, maintains the third set of display properties of the third user interface element relative to the second set of display properties of the second user interface element in order to maintain a relative degree of contrast between the third user interface element and the second user interface element. In some embodiments, while the relative degree of contrast between the third and second user interface objects remains the same, the relative degree of contrast between the first and second user interface objects changes and the absolute degree of contrast within the user interface also changes. In some embodiments, the third user interface element corresponds to a foreground user interface element, and the second user interface element corresponds to a background user interface element. For example, the third user interface element corresponds to a button background/platter, an icon background/platter, content region, and/or the like of the application window with the third set of display properties). In some embodiments, the third set of display properties is associated with an appearance of a background, text, content, icon, and/or the like within the third user interface element. As one example, with reference to FIGS. 12G-12I, the first user interface element corresponds to the content region 544, the inbox affordances 532, the conversation affordances 542, and the action affordances 522 (or the background thereof), the second user interface element corresponds to the chrome regions 513, 515, and 517 (or the background thereof), and the third user interface element corresponds to the image 1202.

In some embodiments, the device (1338): displays, via the display device, a third user interface element with a third set of display properties within the user interface; and, in response to detecting the change in one or more of the brightness setting of the display device and the detected ambient light detected by the device, changes a respective display property of the third set of display properties of the third user interface element relative to the second set of display properties of the second user interface element in order to change a relative degree of contrast between the third user interface element and the second user interface element, wherein the change to the respective display property of the third set of display properties of the third user interface element is inverse to the change to the respective display property of the first set of display properties of the first user interface element. In some embodiments, the third user interface element corresponds to a foreground user interface element, and the second user interface element corresponds to a background user interface element. For example, the third user interface element corresponds to a button background/platter, an icon background/platter, content region, and/or the like of the application window with the third set of display properties). In some embodiments, the third set of display properties is associated with an appearance of a background, text, content, icon, and/or the like within the third user interface element. As one example, with reference to FIG. 12G-12I, the first user interface element corresponds to the content region 544, the inbox affordances 532, the conversation affordances 542, and the action affordances 522 (or the background thereof) (e.g., the first set of foreground user interface elements), the second user interface element corresponds to the chrome regions 513, 515, and 517 (e.g., the background user interface elements), and the third user interface element corresponds to the image 1202 (e.g., the second foreground user interface element).

As one example, the electronic device detects a first decrease of the illumination value 1242 between FIGS. 12G and 12H, which causes the contrast value 1222 to fall below the first threshold contrast value (e.g., 20%) and also causes the contrast value 1227 to exceed the second threshold contrast value (e.g., 80%). In response to the first decrease of the illumination value 1242 that causes the contrast value 1222 to fall below the first threshold contrast value, the electronic device changes an appearance of the first set of foreground user interface elements (e.g., the content region 544, the inbox affordances 532, the conversation affordances 542, and the action affordances 522) in FIG. 12H. For example, the electronic device lightens the appearance of the first set of foreground user interface elements in FIG. 12H in order to set the contrast value 1222 above the first threshold contrast value (e.g., 20%). In response to the first decrease of the illumination value 1242 that causes the contrast value 1227 to exceed the second threshold contrast value, the electronic device changes an appearance of the second foreground user interface element (e.g., the image 1202) in FIG. 12H. For example, the electronic device darkens the appearance of the second foreground user interface element in FIG. 12H in order to set the contrast value 1227 below the second threshold contrast value (e.g., 80%).

Changing the respective display property of the first user interface element in order to change a relative degree of contrast between the first user interface element (e.g., foreground user interface element(s)) and the second user interface element (e.g., background user interface element(s)) and also changing the respective display property of the third user interface element in order to change a relative degree of contrast between the third user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

In some embodiments, in accordance with a determination that the change corresponds to (1340) a decrease in one or more of the brightness setting of the display device and the ambient light detected by the device: the change to the respective display property of the first set of display properties of the first user interface element corresponds to increasing a brightness of the dark-colored region relative to the darker portions of the user interface, and the change to the respective display property of the third set of display properties of the third user interface element corresponds to reducing a brightness of the light-colored region relative to the darker portions of the user interface. For example, white regions get darker and dark regions get lighter relative to the background in parallel. In some embodiments, the inverse occurs when the change corresponds to an increase in one or more of the brightness setting of the display device and the ambient light detected by the device. As one example, in the sequence shown in FIGS. 12G and 12H, the electronic lightens the appearance of first set of foreground user interface elements (e.g., the content region 544, the inbox affordances 532, the conversation affordances 542, and the action affordances 522) and darkens the appearance of the second foreground user interface element (e.g., the image 1202) relative to the background user interface elements (e.g., the chrome regions 513, 515, and 517).

Changing the respective display property of the first user interface element in order to change a relative degree of contrast between the first user interface element (e.g., foreground user interface element(s)) and the second user interface element (e.g., background user interface element(s)) and also changing the respective display property of the third user interface element in order to change a relative degree of contrast between the third user interface element (e.g., foreground user interface element(s)) and the second user interface element (e.g., background user interface element(s)) reduces eye strain and also creates a more efficient human-machine interface when navigating and manipulating user interfaces. As such, the more efficient human-machine interface reduces the amount of user interaction to perform navigation and manipulation operations within the user interface. The reduction in user interaction reduces wear-and-tear of the device. The reduction in user interaction also results in faster navigation and manipulation operations within the user interface and, thus, reduces power drain, which increases battery life of the device.

It should be understood that the particular order in which the operations in FIGS. 13A-13D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 1000 and 1100) are also applicable in an analogous manner to method 1300 described above with respect to FIGS. 13A-13D. For example, user interfaces, user interface elements, display properties, and appearances described above with reference to method 1300 optionally have one or more of the characteristics of user interface elements, display properties, and appearances described herein with reference to other methods described herein (e.g., the methods 1000 and 1100). For brevity, these details are not repeated here.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 13A-13D, optionally, implemented by components depicted in FIGS. 1A and 1B. For example, the user interface elements, display properties, and appearances are, optionally, implemented by the event sorter 170, the event recognizer 180, and the event handler 190. The event monitor 171 in the event sorter 170 detects a contact on touch-sensitive surface 451, and the event dispatcher module 174 delivers the event information to application 136-1. A respective event recognizer 180 of application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device including a display device, non-transitory memory, and one or more processors coupled with the non-transitory memory:
displaying, via the display device, a graphical user interface including a first user interface element with a first set of display properties, a second user interface element with a second set of display properties and a third user interface element with a third set of display properties, wherein the first user interface element and the third user interface element are foreground user interface elements associated with first and third regions of the graphical user interface and the second user interface element is a background user interface element associated with a second region of the graphical user interface, and wherein the first, second, and third regions of the graphical user interface correspond to distinct portions of the graphical user interface;
detecting a change in one or more of a brightness setting of the display device and an ambient light detected by the device; and
in response to detecting the change in one or more of the brightness setting of the display device and the detected ambient light detected by the device:
changing a respective display property of the first set of display properties of the first user interface element while maintaining the second set of display properties of the second user interface element in order to change a relative degree of contrast between the first user interface element and the second user interface element; and
changing a respective display property of the third set of display properties of the third user interface element while maintaining the second set of display properties of the second user interface element in order to change a relative degree of contrast between the third user interface element and the second user interface element, wherein the change to the respective display property of the third set of display properties of the third user interface element is inverse to the change to the respective display property of the first set of display properties of the first user interface element.

2. The method of claim 1, wherein the change to the respective display property of the first set of display properties of the first user interface element causes the relative degree of contrast between the first user interface element and the second user interface element to decrease in accordance with a determination that the change corresponds to a decrease in one or more of the brightness setting of the display device and the ambient light detected by the device.

3. The method of claim 1, wherein the change to the respective display property of the first set of display properties of the first user interface element causes the relative degree of contrast between the first user interface element and the second user interface element to increase in accordance with a determination that the change corresponds to a decrease in one or more of the brightness setting of the display device and the ambient light detected by the device.

4. The method of claim 1, wherein the change to the respective display property of the first set of display properties of the first user interface element causes the relative degree of contrast between the first user interface element and the second user interface element to decrease in accordance with a determination that the change corresponds to an increase in one or more of the brightness setting of the display device and the ambient light detected by the device.

5. The method of claim 1, wherein the change to the respective display property of the first set of display properties of the first user interface element causes the relative degree of contrast between the first user interface element and the second user interface element to increase in accordance with a determination that the change corresponds to an increase in one or more of the brightness setting of the display device and the ambient light detected by the device.

6. The method of claim 1, wherein the change to the respective display property of the first set of display properties of the first user interface element causes the relative degree of contrast of a light-colored region to decrease relative to darker portions of the graphical user interface by reducing a brightness of the light-colored region relative to the darker portions of the graphical user interface.

7. The method of claim 1, wherein the change to the respective display property of the first set of display properties of the first user interface element causes the relative degree of contrast of a dark-colored region to increase relative to darker portions of the graphical user interface by increasing a brightness of the dark-colored region relative to the darker portions of the graphical user interface.

8. The method of claim 1, wherein a magnitude of the change to the relative degree of contrast between the first user interface element and the second user interface element is based at least in part on a size of the first user interface element.

9. The method of claim 1, wherein a magnitude of the change to the relative degree of contrast between the first user interface element and the second user interface element is based at least in part on a magnitude of change in the respective display property.

10. The method of claim 1, wherein a magnitude of the change to the relative degree of contrast between the first user interface element and the second user interface element is based at least in part on a type of content associated with the first user interface element.

11. The method of claim 1, further comprising:
displaying, via the display device, a fourth user interface element with a fourth set of display properties within the graphical user interface; and
in response to detecting the change in one or more of the brightness setting of the display device and the detected ambient light detected by the device, maintaining the fourth set of display properties of the fourth user interface element relative to the second set of display properties of the second user interface element in order to maintain a relative degree of contrast between the fourth user interface element and the second user interface element.

12. The method of claim 1, wherein, in accordance with a determination that the change corresponds to a decrease in one or more of the brightness setting of the display device and the ambient light detected by the device:
the change to the respective display property of the first set of display properties of the first user interface element corresponds to increasing a brightness of a dark-colored region relative to darker portions of the graphical user interface, and the change to the respective display property of the third set of display properties of the third user interface element corresponds to reducing a brightness of a light-colored region relative to the darker portions of the graphical user interface.

13. The method of claim 1, wherein the first user interface element corresponds to one of an affordance background, an icon background, or a content region.

14. The method of claim 1, wherein the second user interface element corresponds to one of an application window background, a title bar, an icon bar, or a chrome region.

15. The method of claim 1, further comprising:
in response to detecting the change in one or more of the brightness setting of the display device and the detected ambient light detected by the device, determining whether the relative degree of contrast between the first user interface element and the second user interface element breaches a contrast threshold;
in accordance with a determination that the relative degree of contrast between the first user interface element and the second user interface element does not breach the contrast threshold, maintaining the respective display property of the first set of display properties of the first user interface element relative to the second set of display properties of the second user interface element in order to maintain the relative degree of contrast between the first user interface element and the second user interface element; and
wherein the respective display property of the first set of display properties of the first user interface element is changed relative to the second set of display properties of the second user interface element in order to change the relative degree of contrast between the first user interface element and the second user interface element in accordance with a determination that the relative degree of contrast between the first user interface element and the second user interface element breaches the contrast threshold.

16. The method of claim 15, wherein the contrast threshold corresponds to a lower contrast threshold relative to a predefined contrast window.

17. The method of claim 15, wherein the contrast threshold corresponds to an upper contrast threshold relative to a predefined contrast window.

18. An electronic device, comprising:
a display device;
one or more processors;
non-transitory memory; and
one or more programs, wherein the one or more programs are stored in the non-transitory memory and configured to be executed by the one or more processors, the one or more programs including instructions for:
displaying, via the display device, a graphical user interface including a first user interface element with a first set of display properties, a second user interface element with a second set of display properties and a third user interface element with a third set of display properties, wherein the first user interface element and the third user interface element are foreground user interface elements associated with first and third regions of the graphical user interface and the second user interface element is a background user interface element associated with a second region of the graphical user interface, and wherein the first, second, and third regions of the graphical user interface correspond to distinct portions of the graphical user interface;
detecting a change in one or more of a brightness setting of the display device and an ambient light detected by the device; and
in response to detecting the change in one or more of the brightness setting of the display device and the detected ambient light detected by the device:
changing a respective display property of the first set of display properties of the first user interface element while maintaining the second set of display properties of the second user interface element in order to change a relative degree of contrast between the first user interface element and the second user interface element; and
changing a respective display property of the third set of display properties of the third user interface element while maintaining the second set of display properties of the second user interface element in order to change a relative degree of contrast between the third user interface element and the second user interface element, wherein the change to the respective display property of the third set of display properties of the third user interface element is inverse to the change to the respective display property of the first set of display properties of the first user interface element.

19. A non-transitory computer readable storage medium storing one or more programs, the one or more programs comprising instructions, which, when executed by an electronic device with a display device, cause the electronic device to:
display, via the display device, a graphical user interface including a first user interface element with a first set of display properties, a second user interface element with a second set of display properties and a third user interface element with a third set of display properties, wherein the first user interface element and the third user interface element are foreground user interface elements associated with first and third regions of the graphical user interface and the second user interface element is a background user interface element associated with a second region of the graphical user interface, and wherein the first, second, and third regions of the graphical user interface correspond to distinct portions of the graphical user interface;
detect a change in one or more of a brightness setting of the display device and an ambient light detected by the device; and
in response to detecting the change in one or more of the brightness setting of the display device and the detected ambient light detected by the device:
change a respective display property of the first set of display properties of the first user interface element while maintaining the second set of display properties of the second user interface element in order to change a relative degree of contrast between the first user interface element and the second user interface element; and
change a respective display property of the third set of display properties of the third user interface element while maintaining the second set of display properties of the second user interface element in order to change a relative degree of contrast between the third user interface element and the second user interface element, wherein the change to the respective display property of the third set of display properties of the third user interface element is inverse to the change to the respective display property of the first set of display properties of the first user interface element.

* * * * *